US011283909B2

(12) United States Patent
Moon

(10) Patent No.: US 11,283,909 B2
(45) Date of Patent: Mar. 22, 2022

(54) ELECTRONIC DEVICE SUPPORTING MULTIPLE SIMS AND OPERATION METHOD THEREOF

(71) Applicant: SAMSUNG ELECTRONICS CO., LTD., Suwon-si (KR)

(72) Inventor: Youcheol Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/159,642

(22) Filed: Jan. 27, 2021

(65) Prior Publication Data

US 2021/0250430 A1 Aug. 12, 2021

(30) Foreign Application Priority Data

Feb. 10, 2020 (KR) ........................ 10-2020-0015920

(51) Int. Cl.
*H04M 1/02* (2006.01)
*H04W 88/06* (2009.01)

(52) U.S. Cl.
CPC ............ *H04M 1/026* (2013.01); *H04W 88/06* (2013.01)

(58) Field of Classification Search
CPC .............................. H04M 1/026; H04W 88/06
USPC ...................................................... 455/550.1
See application file for complete search history.

(56) References Cited

U.S. PATENT DOCUMENTS

| 8,849,350 | B1 | 9/2014 | Batchu et al. |
| 2009/0088211 | A1 | 4/2009 | Kim |
| 2018/0109291 | A1 | 4/2018 | Peng et al. |
| 2018/0109942 | A1 | 4/2018 | Lipovkov |
| 2018/0375541 | A1 | 12/2018 | Yoo et al. |
| 2019/0208405 | A1 | 7/2019 | Park et al. |
| 2020/0267533 | A1* | 8/2020 | Zhang ................. H04W 68/005 |

FOREIGN PATENT DOCUMENTS

| KR | 10-2009-0032678 | 4/2009 |
| WO | 99/27731 | 6/1999 |
| WO | 2016/003142 | 1/2016 |

OTHER PUBLICATIONS

Search Report and Written Opinion dated Apr. 27, 2021 in counterpart International Patent Application No. PCT/KR2021/000981.

\* cited by examiner

*Primary Examiner* — Lee Nguyen
(74) *Attorney, Agent, or Firm* — Nixon & Vanderhye, P.C.

(57) ABSTRACT

An electronic device according to an embodiment may include: at least one processor; a first slot connected to the at least one processor and configured to receive a first SIM which is detachable; a second slot selectively connectable to the at least one processor and configured to receive a second SIM which is detachable; an eSIM selectively connectable to the at least one processor and included in the electronic device; and a switch configured to connect at least one of the second slot or the eSIM to the at least one processor, wherein the at least one processor is configured to: detect an event for using the eSIM while the at least one processor is connected to the second slot based on the switch being in a first state; and based on detecting the event for using the eSIM, control the switch to change from the first state to a second state, wherein the at least one processor may be connected to the eSIM the switch being in the second state.

20 Claims, 63 Drawing Sheets

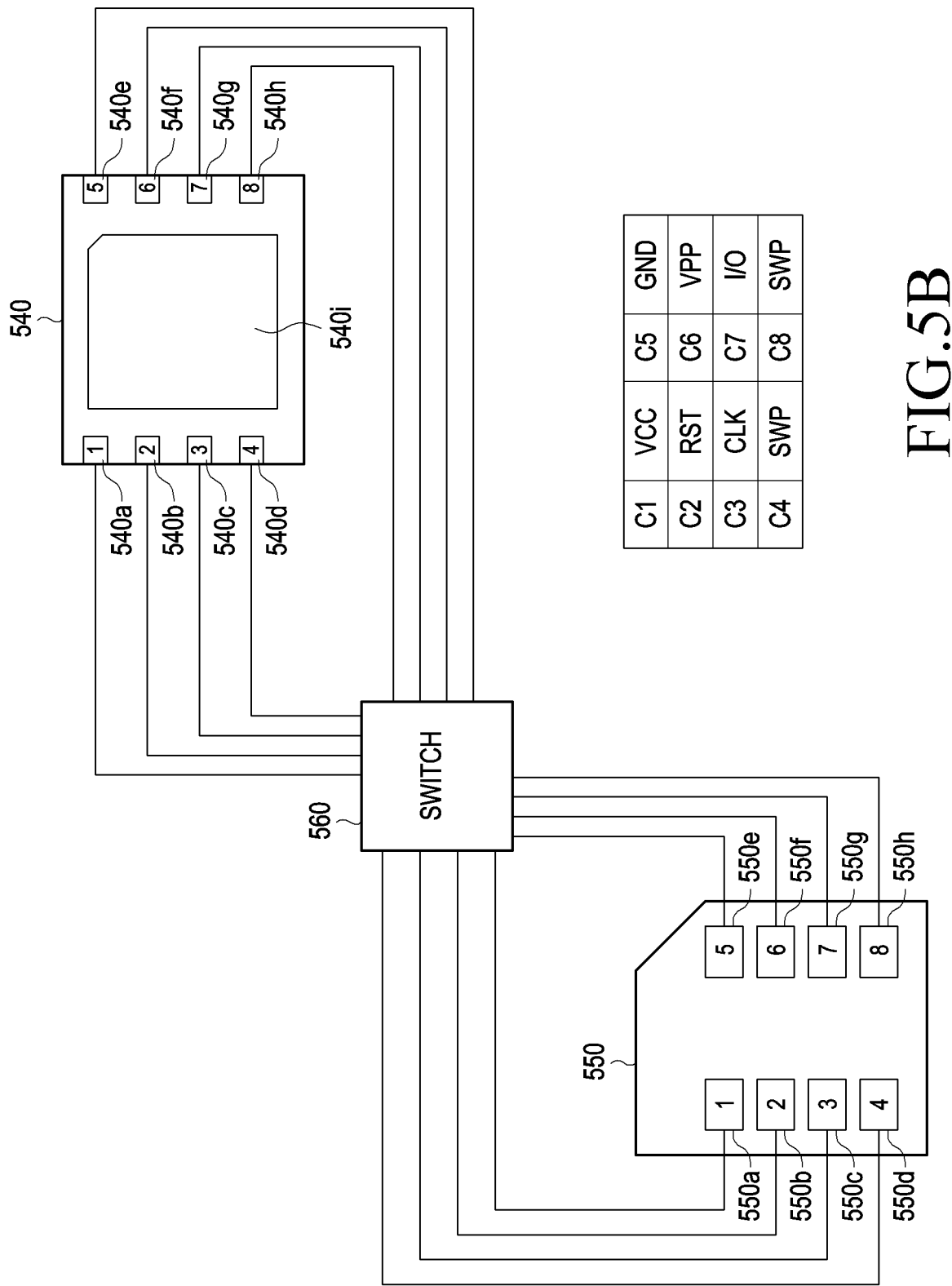

Status

< SIM card manager — 820e

SIM cards

| 1 | _SIM 1_<br>_PLMN_<br>_Own number_ | 5G/4G/3G/2G | — 821 |

| 2 | _SIM 2_<br>_PLMN_<br>_Own number_ | 5G/4G/3G/2G | — 822 | eSIMs

| 2 | _eSIM 1_<br>_PLMN_<br>_Own number_ | off | — 823 |

| 2 | _eSIM 2_<br>_PLMN_<br>_Own number_ | off | — 1380 |

+ Add mobile plan — 824

Preferred SIM card

Calls
_SIM card name_ — 825

Text messages
_SIM card name_ — 826

Mobile data
_SIM card name_ — 827

Call settings

Confirm SIM card for calls 🔑
Ask which SIM to use the next time you call someone you've talked to using a non-preferred SIM — 828

Dual SIM always on
Receive calls from both SIM cards. — 829

Lock mobile plan settings
Use your screen lock to protect your mobile plan settings. — 830

Remove all mobile plans — 831

| | |
|---|---|
| Status 1 | |
| < SIM card manager | — 820i |
| SIM cards | |
| [1] _SIM 1_ _PLMN_ _Own number_   5G/4G/3G/2G | — 821 |
| [2] _eSIM 1_ _PLMN_ _Own number_   Off | — 823 |
| (+) Add mobile plan | — 824 |
| Preferred SIM card | |
| Calls _SIM card name_ | — 825 |
| Text messages _SIM card name_ | — 826 |
| Mobile data _SIM card name_ | — 827 |
| Call settings | |
| Confirm SIM card for calls 🔑 Ask which SIM to use the next time you call someone you've talked to using a non-preferred SIM | — 828 |
| Dual SIM always on Receive calls from both SIM cards. | — 829 |
| Lock mobile plan settings Use your screen lock to protect your mobile plan settings. | — 830 |
| Remove all mobile plans | — 831 |

FIG.26A

FIG.28D

ELECTRONIC DEVICE SUPPORTING MULTIPLE SIMS AND OPERATION METHOD THEREOF

CROSS-REFERENCE TO RELATED APPLICATION

This application is based on and claims priority under 35 U.S.C. § 119 to Korean Patent Application No. 10-2020-0015920, filed on Feb. 10, 2020, in the Korean Intellectual Property Office, the disclosure of which is incorporated by reference herein in its entirety.

BACKGROUND

Field

The disclosure relates to an electronic device supporting multiple subscriber identity modules (SIMs) and an operation method thereof.

Description of Related Art

In a wireless communication system, an electronic device (for example, user equipment (UE)) may access a wireless communication network and may use a voice communication or data communication service in a predetermined position or on the move. An appropriate authentication process is necessary to provide the electronic device with a communication service. In general, a universal integrated circuit card (UICC) is inserted into the electronic device, and authentication proceeds between the electronic device and a server of a mobile network operator (MNO) through a universal subscriber identity module (USIM) installed on the UICC. The UICC may be referred to as a subscriber identity module (SIM) card in the case of a global system for mobile communications (GSM) type, and may be referred to as a universal subscriber identity module (USIM) card in the case of a wideband code division multiple access (WCDMA), long term evolution (LTE), or new radio (NR) type.

If the user of the electronic device subscribes to a wireless communication service provided by the MNO, the MNO may provide the user with a UICC (for example, a SIM card or a USIM card), and the user may insert the received UICC into the electronic device. After the UICC is inserted into the electronic device, a USIM application installed in the UICC may be executed. As a result, an appropriate authentication process may proceed, using an international mobile subscriber identity (IMSI) value stored in the UICC and an encryption key value for authentication, with the server of the MNO, in which identical values are stored. The wireless communication service may be available after the appropriate authentication process is performed.

The electronic device may support two SIMs or more. An electronic device supporting two SIMs may be referred to as a dual-SIM electronic device, and an electronic device supporting multiple SIMs may be referred to as a multi-SIM electronic device. A dual-SIM or multi-SIM electronic device may support multiple SIMs, each of which may be associated with a different subscription. A device having a single transceiver configured to transmit/receive signals associated with multiple SIMs may be referred to as a dual SIM dual standby (DSDS) device. In this case, when one of the SIMs transmits or receives signals, another SIM may remain in a standby mode. Alternatively, a device configured such that both SIMs can be simultaneously activated may be referred to as a dual SIM dual active (DSDA) device.

A dual-SIM electronic device is implemented to support two removable (e.g., detachable) subscriber identify modules or is implemented to support a single removable subscriber identity module and an embedded subscriber identity module (eSIM). The removable subscriber identity module may be hereinafter referred to as a removable SIM (rSIM), and the embedded subscriber identity module may be referred to as an eSIM. The rSIM may also be referred to as a physical SIM (pSIM). An electronic device supporting two rSIMs may be implemented to include two slots capable of containing respective SIMs. An electronic device supporting a single rSIM and an eSIM may include a slot capable of containing a single SIM, and an eSIM. However, there has been disclosed no electronic device capable of switching so as to use two rSIMs or to use a single rSIM and an eSIM. If the MNO supports the eSIM and then stops supporting the eSIM, an electronic device including a single slot and an eSIM may not be able to support the dual-SIM function. Alternatively, if the MNO changes policies so as to support the eSIM, an electronic device including two slots may not be able to support the eSIM function.

SUMMARY

Embodiments of the disclosure provide an electronic device that may include multiple slots and one or more eSIMs. An electronic device and a method for operating the same may switch connection to the eSIM or connection to the rSIM.

According to various example embodiments, an electronic device may include: at least one processor; a first slot connected to the at least one processor and configured to receive a first SIM which is detachable; a second slot selectively connectable to the at least one processor and configured to receive a second SIM which is detachable; an eSIM selectively connectable to the at least one processor and included in the electronic device; and a switch configured to connect one of the second slot or the eSIM to the at least one processor. The at least one processor may be configured to: detect an event for using the eSIM while the at least one processor is connected to the second slot based on the switch being in a first state; and based on detecting the event for using the eSIM, control the switch to change from the first state to a second state. The at least one processor may be connected to the eSIM, based on the switch being in the second state.

According to various example embodiments, an electronic device may include: a display; at least one processor connected to the display; a first slot connected to the at least one processor and configured to receive a first SIM which is detachable; a second slot selectively connectable to the at least one processor and configured to receive a second SIM which is detachable; an eSIM selectively connectable to the at least one processor and included in the electronic device; and a switch configured to connect one of the second slot or the eSIM to the at least one processor. The at least one processor may be configured to: control the display to display a first screen indicating that the first SIM and the second SIM are enabled while the at least one processor is connected to the second slot based on the switch being in a first state; detect a first input for using the eSIM associated with the first screen; based on the first input, control the switch to change from the first state to a second state; and control the display to display a second screen indicating that the first SIM and the eSIM are enabled, while the at least one processor is connected to the eSIM based on the switch being in the second state.

According to various example embodiments, a method of operating an electronic device including at least one processor, a first slot configured to receive a first SIM which is detachable, a second slot configured to receive a second SIM which is detachable, an eSIM included in the electronic device, and a switch configured to connect one of the second slot or the eSIM to the at least one processor, may include: controlling a state of the switch to be a first state, the at least one processor being connected to the second slot based on the switch being in the first state; detecting an event for using the eSIM while the at least one processor is connected to the second slot; and based on detecting the event for using the eSIM, controlling the switch to change from the first state to a second state. The at least one processor may be connected to the eSIM based on the switch being in the second state.

Various example embodiments may provide an electronic device including multiple slots and one or more eSIMs. Various example embodiments may provide an electronic device and a method for operating the same, which can switch connection to the eSIM or connection to the rSIM. Accordingly, a dual-SIM function based on an eSIM and a single rSIM, or a dual-SIM function based on two rSIMs, may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5B is a diagram illustrating an example switch according to various embodiments;

FIG. 8B is a diagram illustrating an example screen displayed in an electronic device according to various embodiments;

FIG. 13D is a diagram illustrating an example screen displayed in an electronic device according to various embodiments;

FIG. 15B is a diagram illustrating an example screen displayed in an electronic device according to various embodiments;

FIG. 15D is a diagram illustrating an example screen displayed in an electronic device according to various embodiments;

FIG. 26A is a diagram illustrating an example screen displayed in an electronic device according to various embodiments;

FIG. 28D is a diagram illustrating an example screen displayed in an electronic device according to various embodiments;

DETAILED DESCRIPTION

Figure 1A:
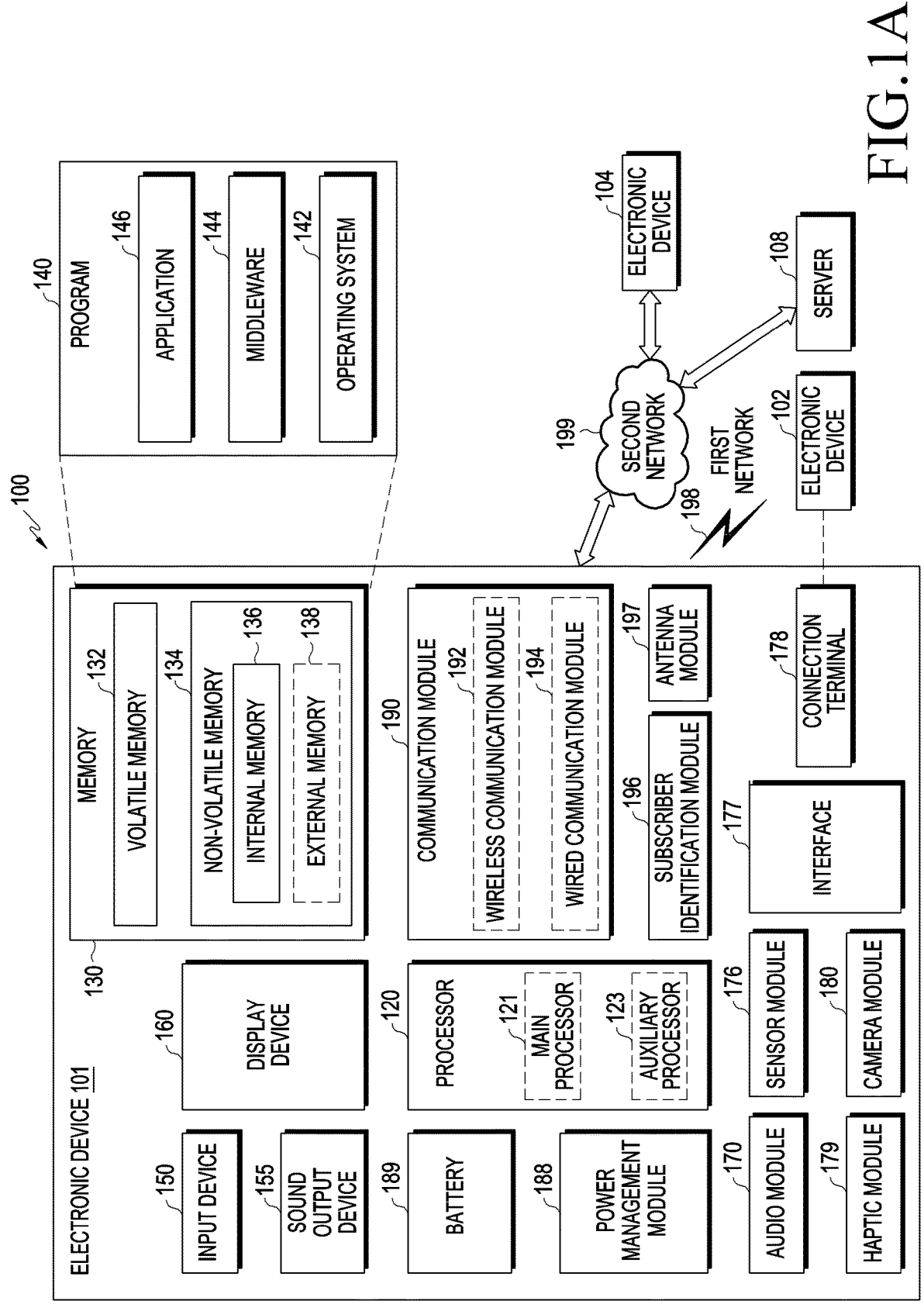
FIG. 1A is a block diagram illustrating an example electronic device in a network environment according to various embodiments.

FIG. 1A is a block diagram illustrating an example electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
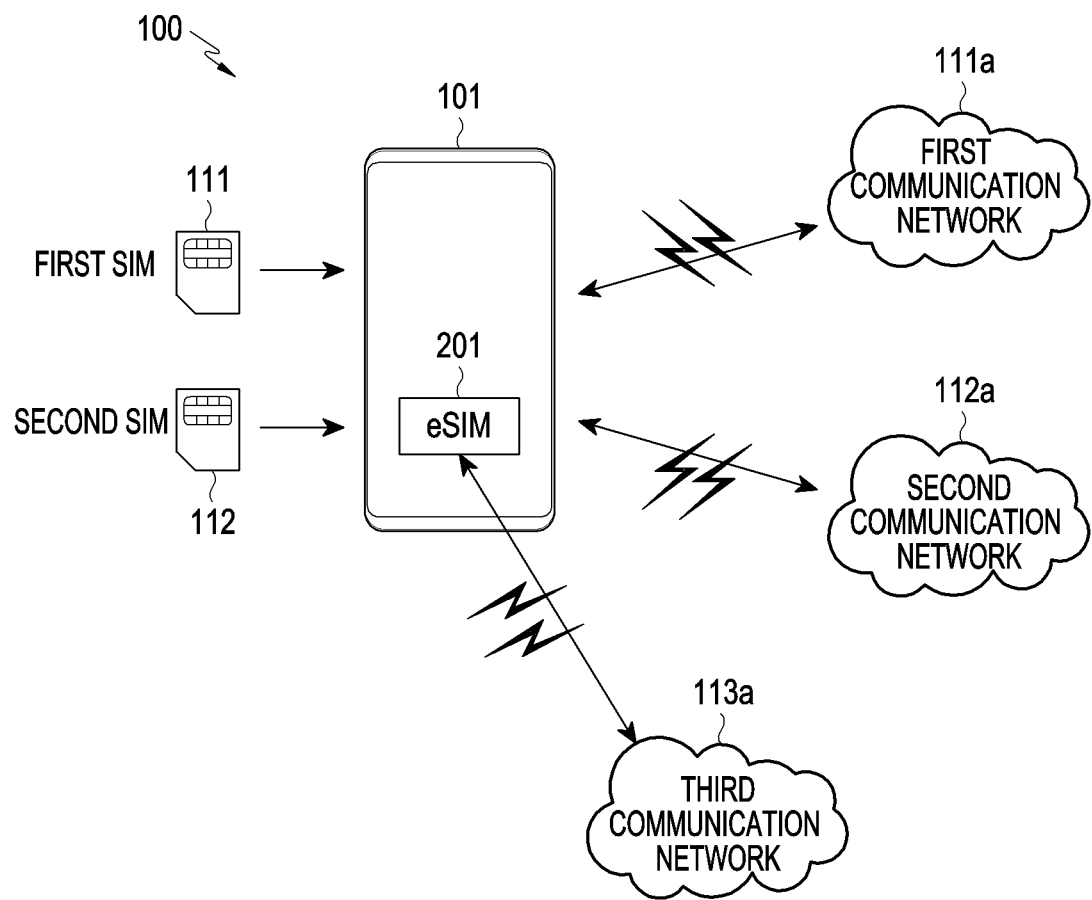
FIG. 1B is a diagram illustrating an example network environment including an electronic device according to various embodiments.

FIG. 1B is a diagram illustrating an example network environment 100 including an electronic device according to various embodiments. Referring to FIG. 1B, a network according to various embodiments may include an electronic device 101, a first communication network 111a, a second communication network 112a, and/or a third communication network 113a.

According to various embodiments, the electronic device 101 may operate as a dual SIM dual standby (DSDS) or dual SIM dual active (DSDA) electronic device supporting two SIMs in a single device. For example, two SIMs, namely a first SIM 111 and a second SIM 112, may be mounted in the electronic device 101. The first SIM 111 and the second SIM 112 may be removable (e.g., detachable) rSIMs. For example, two SIM cards may be mounted in the electronic device 101 in order to support the two SIMs. Hereinafter, for convenience of description, the term "SIM card" will be referred to as "SIM". As illustrated in FIG. 1B, two SIM cards, namely the first SIM 111 and the second SIM 112 may be mounted in the electronic device 101. The electronic device 101 may include, therein, a first slot (not shown), which is a first structure, and a second slot (not shown) in order to receive the first SIM 111 and the second SIM 112, respectively.

For example, the first SIM 111 may be a SIM which has subscribed to a mobile network operator of a first communication network 111a, and the electronic device 101 may access the first communication network 111a via the first SIM 111 to be provided with a wireless communication service. The second SIM 112 may be a SIM which has subscribed to a mobile network operator of a second communication network 112a, and the electronic device 101 may access the second communication network 112a via the second SIM 112 to be provided with wireless communication service. According to various embodiments, the electronic device 101 may include an embedded subscriber identity module (eSIM) 201. An eSIM may also be called an eUICC. The electronic device 101 may access a third communication network 113a via the eSIM 201 to be provided with a wireless communication service. At least some of the first communication network 111a, the second communication network 112a, or the third communication network 113a may be provided by the same mobile network operator, or may be provided by different respective mobile network operators.

Figure 2:
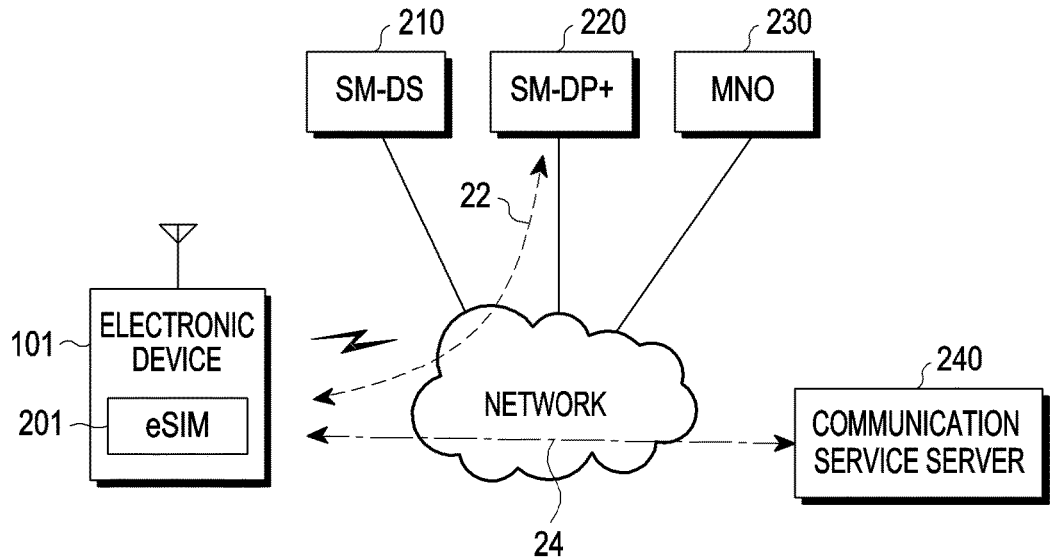
FIG. 2 is a diagram illustrating an example system for providing profile-based communication connection to an electronic device according to various embodiments.

FIG. 2 is a diagram illustrating an example system for providing a profile-based communication connection to an electronic device according to various embodiments.

Referring to FIG. 2, a system 200 according to various embodiments may include an electronic device 101, a subscription manager discovery service (SM-DS) server 210, a subscription manager data preparation plus (SM-DP+)

server 220, a mobile network operator (MNO) server 230, and a communication service server 240.

According to various embodiments, the electronic device 101 (e.g., the electronic device 100 in FIG. 1) may include an eSIM 201. Although not illustrated for convenience of description, the electronic device 101 may include two or more slots capable of receiving two or more rSIMs. The electronic device 101 may be implemented to include two eSIMs and one slot capable of receiving one rSIM. According to various embodiments, the electronic device 101 may include or receive N (N is a natural number) SIMs (eSIMs or rSIMs), and may perform switching to use some thereof. The combination of N SIMs is not limited, and the number thereof is not limited either.

According to various embodiments, the eSIM 201 may be implemented to: be inserted into the electronic device 101; be integrated with the electronic device 101, or be accessible by the electronic device 101. According to various embodiments, the eSIM 201 may cause the electronic device 101 to perform authentication with a server of mobile network operator (MNO) using information in the eSIM 201 (e.g., a profile including universal subscriber identity module (USIM) information. According to an embodiment, the eSIM 201 may be called a subscriber identity module (SIM) card in the case of global system for mobile communications (GSM), or may be called a universal subscriber identity module (USIM) card in the case of or a wideband code division multiple access (WCDMA), long-term-evolution (LTE), or new-radio (NR) scheme. In addition, the eSIM 201 may be called by various names depending on the communication scheme. For example, when a user of the electronic device 101 subscribes to a wireless communication service provided by a mobile network operator, the electronic device 101 may use information in the eSIM 201 (e.g., an international mobile subscriber identity (IMSI) value and a K value, serving as an encryption key for authentication) to perform an appropriate authentication process with the server of the mobile network operator, which stores the same values, and may then use the wireless communication service. For example, the appropriate authentication process may be authentication and key agreement (AKA), but other authentication schemes may also be used.

According to various embodiments, the eSIM 201 may be manufactured as a dedicated card for a specific mobile network operator at the request of the corresponding mobile network operator, and may include authentication information necessary for access to the corresponding mobile network operator (e.g., a USIM application and a subscriber identification ID (e.g., IMSI)) or an encryption key (e.g., a well-known K value or Ki value) in advance. An application (or information) in the eSIM 201 may be installed, modified, deleted, or updated using technology such as an over-the-air (OTA) scheme as necessary.

According to various embodiments, the eSIM 201 may download or/and store information necessary for communication service provision in the form of a profile. According to an embodiment, the profile may be installed or stored in the process of manufacturing the eSIM 201, or may be downloaded by a terminal in an over-the-air (OTA) scheme and installed or stored in the eSIM 201. For example, a profile may include a provisioning profile and an operational profile. Those skilled in the art will understand that even when a provisioning profile is not installed, the electronic device 101 may download an operational profile through near-field connection or Internet connection using Wi-Fi, and thus a provisioning profile does not necessarily need to be installed in the electronic device 101. For example, an operational profile may be a profile including subscriber identity information of a user of an electronic device, and a provisioning profile may include subscriber identify information or information (hereinafter, referred to as "first information") necessary for downloading a profile (referred to as "a first operational profile") including subscriber identify information (hereinafter, referred to as "first subscriber identify information") in an electronic device. The electronic device may download the first operational profile, based on the first information which is included in a provisioning profile stored in the eSIM 201.

According to various embodiments, the electronic device 101 may be provided with a communication service using subscriber identify information (hereinafter, referred to as "second subscriber identify information") of an operational profile (hereinafter, referred to as a "second operational profile") installed or stored in the eSIM 201. For example, a profile including subscriber identify information may be a subscriber identity module (SIM) profile.

According to an embodiment, an operational profile may further include, in addition to the subscriber identity information, subscriber network access authentication information, subscriber's contacts, subscriber personal information (e.g., SMS), the name of a mobile network operator in which a subscriber is registered, a useable service, a useable data amount, a price, a service provision speed, or information necessary for authenticating a subscriber and generating a traffic security key at the time of access to a wireless communication network such as GSM, WCDMA, LTE, or NR to enable the subscriber to safely use wireless communication.

According to various embodiments, the first information necessary for downloading data including the first subscriber identify information (e.g., the first operational profile) may include communication session information necessary for a first communication connection designated for downloading the first operational profile. For example, the communication session information may include subscription manager discovery service (SM-DS) server 210 access information necessary for downloading the first operational profile or mobile network operator network information usable for access to the SM-DS server 210.

According to various embodiments, the SM-DS server 210 may provide, to the electronic device 101, the address of the SM-DP+ server 220 from which the first operational profile can be downloaded based on a provisioning profile.

According to various embodiments, the SM-DP+ server 220 may be a profile-providing server, an off-card entity of profile domain, a profile encryption server, a profile generation server, a profile provisioner, or a profile provider. The SM-DP+ server 220 may establish a first communication connection 22 with an electronic device 101 via a wireless communication network in response to a request from the electronic device 101 for the first communication connection based on a provisioning profile, and may provide the first operational profile to the electronic device 101 through the first communication connection. According to various embodiments, the wireless communication network may be a specific node in the wireless communication network. For example, the wireless communication network may be a base station, a subscriber information management node, a mobility management node, etc. in the wireless communication network. According to an embodiment, the wireless communication network may include a home location register (HLR) and/or an authentication center (AuC) server that the electronic device 101 accesses to perform a subscriber authentication function, and, after authentication, may access and be connected to the communication service server 240, which is capable of provide communication services such as voice communication or data communication.

According to various embodiments, the MNO server 230 may be a server associated with a mobile network operator. According to various embodiments, the MNO server 230 may request the SM-DP+ server 220 to prepare at least one profile (or a profile package) (e.g., the first operational profile) associated with at least one piece of subscriber identify information (e.g., the first subscriber identify information), and may transfer information associated with the first operational profile to the SM-DP+ server 220. According to an embodiment, the MNO server 230 may transfer a signal for updating and managing the first operational profile to the SM-DP+ server 220. The MNO server 230 may allow second communication 24 between the electronic device 101 and the communication service server 240 through a second operational profile installed in the eSIM 201 of the electronic device 101.

According to various embodiments, the communication service server 240 may be a server configured to provide a communication service. According to various embodiments, the communication service may be a service associated with transmission or reception via the wireless communication network. According to an embodiment, the communication service may include not only a service associated with download of an operational profile (e.g., the first operational profile including the first subscriber identify information) but also a service associated with transmission or reception of another profile (or data) that does not include subscriber identify information. For example, the communication service server 240 may include a service server associated with transmission and reception of various data, such as a server associated with each of various applications, a push server, a searching server, or a market server, and the communication service by the communication service server 240 may include various services such as data transmission/reception by an application, notification reception, push reception, link reception and connection, or a service request.

According to various embodiments, when a request is made for a service associated with transmission or reception of a profile (or data) that does not include subscriber identify information, the electronic device 101 may perform, based on the second operational profile, the second communication connection 24 with the communication service server 240.

According to various embodiments, the SM-DS server 210, the SM-DP+ server 220, the MNO server 230, and the communication service server 240 are merely examples of implementation of servers configured to perform respective functions, and may be referred to by other names. Each of the SM-DS server 210, the SM-DP+ server 220, the MNO server 230, or the communication service server 240 may be formed as a single server or as multiple servers. Some or all of the SM-DS server 210, the SM-DP+ server 220, the MNO server 230, or the communication service server 240 may be formed as a single integrated server.

According to various example embodiments, an electronic device (e.g., the electronic device 101 in FIG. 1A or 1B or the electronic device 101 in FIG. 2) may include: a display (e.g., the display device 160 in FIG. 1A); a communication module comprising a communication circuitry (e.g., the communication module 190 in FIG. 1A); an embedded subscriber identity module (e.g., the subscriber identity module 196 in the FIG. 1A or the eSIM 201 in FIG. 2) configured to store first information associated with a first communication connection for downloading data including first subscriber identify information for access to at least one communication service providing server; a memory (e.g., the memory 130 in FIG. 1A or the memory 211 in FIG. 2); and a processor (e.g., the processor 120 in FIG. 1A) electrically connected to the display, the communication module, and the memory, wherein the processor is configured to: establish, using the communication module and based on the first information, the first communication connection for downloading data including the first subscriber identify information; and, based on a request for transmission or reception of data that does not include the first subscriber identify information being made during the first communication connection, end the first communication connection and establish a second communication connection based on second subscriber identify information to perform the transmission or reception of the data.

According to various example embodiments, the first information may include a provisioning profile, and the data including the first subscriber identify information may include a first operational profile.

According to various example embodiments, the processor may be configured to, based on a request for transmission or reception of the data being made during the first communication connection, display the absence of a second operational profile corresponding to the second subscriber identify information through the display, provided that the second subscriber identify information is not present in the subscriber identity module.

According to various example embodiments, the processor may be further configured to display a purchase screen associated with the second operational profile based on the second operational profile not being present.

According to various example embodiments, the processor may be configured to establish a second communication connection, based on the previously used second operational profile.

According to various example embodiments, the processor may be configured to establish a second communication connection, based on a second operational profile selected by a user.

According to various example embodiments, the processor may be configured to display, via the display, at least one indicator indicating a first communication connection based on the provisioning profile.

According to various example embodiments, the at least one indicator may include the type of at least one among a service provider name (SPN), radio access technology (RAT), and a received signal strength indicator (RSSI).

According to various example embodiments, the processor may be configured to select the provisioning profile associated with a network connected through the communication module.

According to various example embodiments, the processor may be configured to select the provisioning profile associated with a network connected through the communication module, based on at least one of a PLMN identifier, an MCC, and area information of the connected network.

Figure 3:
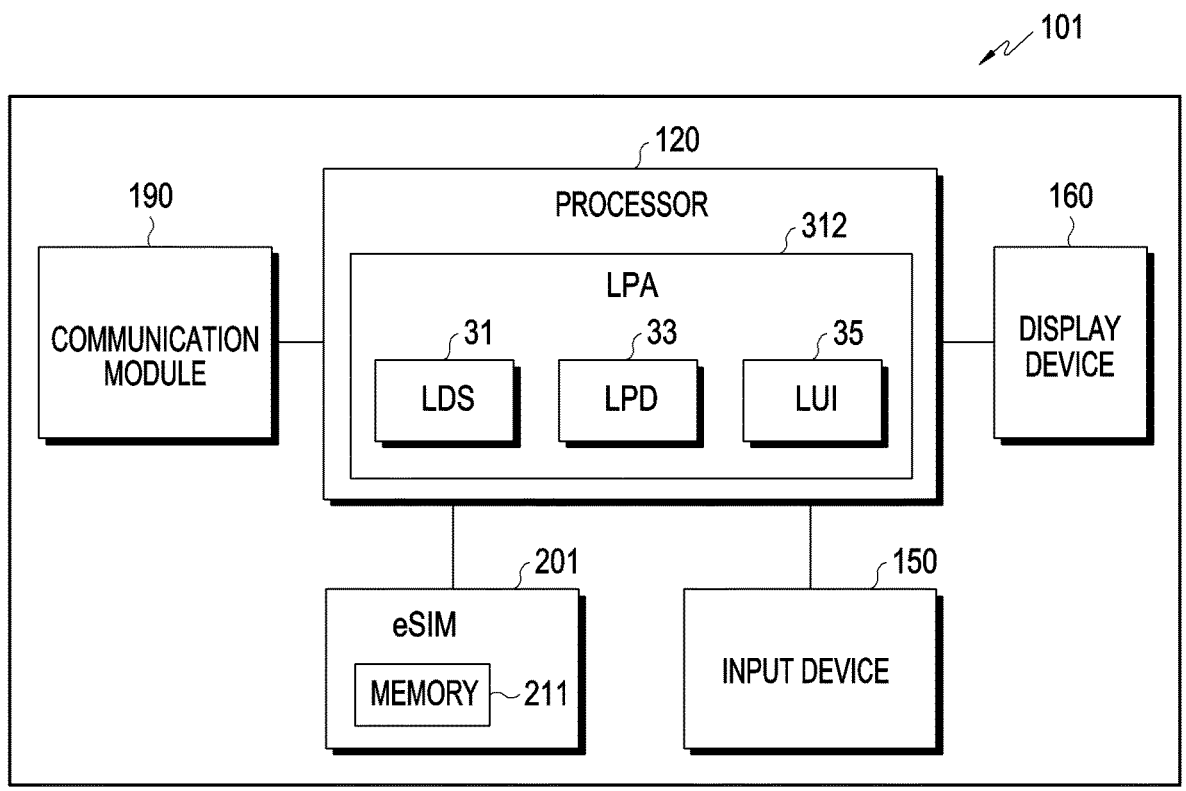
FIG. 3 is a block diagram illustrating an example configuration of an electronic device according to various embodiments.

FIG. 3 is a block diagram illustrating an example configuration of an electronic device according to various embodiments.

Referring to FIG. 3, the electronic device 101 in FIG. 1A or 1B or the electronic device 101 in FIG. 2 according to various embodiments may include a processor (e.g., including processing circuitry) 120, an eSIM 201, a communication module (e.g., including communication circuitry) 190, a display device (e.g., including a display) 160, and/or an input device (e.g., including input circuitry) 150. Although not illustrated for convenience of description, the electronic device 101 may include two or more slots capable of receiving two or more rSIMs.

According to various embodiments, the processor 120 (e.g., the processor 120 in FIG. 1A) may include one or more processors (e.g., the main processor 121 and the auxiliary processor 123 in FIG. 1A, or an application processor and a communication processor), and may include a local profile assistant (LPA) 312 (e.g., an LPAd (device)) according to an embodiment. According to various embodiments, when the processor 120 includes multiple processors, some of LPA 312 may be included in some of the multiple processors, and others of LPA 312 may be included in others of the multiple processors. According to various embodiments, the LPA 312 may be included in the eSIM 201, in which case the LPA 312 may be called an LPAe (eUICC).

According to various embodiments, the LPA 312 may communicate with a server in order to support downloading, installing, or managing a profile of the eSIM 201, or may provide a user interface necessary for downloading, installing, or managing the profile. The LPA 312 may include a module (e.g., including processing circuitry and/or executable program elements) for providing operations of a local discovery service (LDS) 31, local profile download (LPD) 33, and a local user interface (LUI) 35 in the electronic device 101.

According to various embodiments, the LDS 31 may communicate with the SM-DS server 210 and may receive, from the SM-DS server 210, an address of the SM-DP+ server 220 from which an operation profile can be downloaded based on a provisioning profile.

According to various embodiments, the LPD 33 may establish, based on the address of the SM-DP+ server 220, the first communication connection 22 with the SM-DP+ server 220 via a wireless communication network, and may receive a first operational profile from the SM-DP+ server 220 through the first communication connection 22. According to various embodiments, the LPD 33 may support downloading, enabling, disabling, or deleting of a profile or downloading of a profile policy rule (PPR), started by a network, or may support enabling, disabling, or deleting of a profile or resetting of an eUICC, performed by an electronic device.

According to various embodiments, the LUI 35 may provide various user interfaces when downloading the operational profile. According to an embodiment, the LUI 35 may support data exchange between the LDS 31 and a user and between the LPD 33 and the user, and may include a UI for transferring user input to the LDS 31 or the LPD 33.

According to an embodiment, the processor 120 may perform, based on information stored in the eSIM 201, a communication service using (or executing) the LPA 312. For example, the processor 120 may use the LPA 312 to establish a first communication connection with the SM-DP+ server 220 via the communication module 190 to download, based on a provisioning profile stored in the eSIM 201, a profile including first subscriber identity information (e.g., a first operational profile). When a request for transmission or reception of data or a profile, which does not include first subscriber identity information, is made during the first communication connection, the processor 120 may use the LPA 312 to end the first communication connection and then establish a second communication connection based on second subscriber identity information, thereby transmitting or receiving the data or the profile that does not include subscriber identify information.

According to various embodiments, the eSIM 201 (e.g., the subscriber identity module 196 in FIG. 1A or the eSIM 201 in FIG. 2) may include one profile or multiple profiles as information for receiving a communication service. The profile may refer to a profile which is obtained by packaging, in a software form, at least one of an application, a file system, and an authentication key value, stored in the eSIM 201. For example, the profile may include a provisioning profile and an operational profile. The operational profile may include subscriber identify information, and may further include, in addition to the subscriber identify information, subscriber network access authentication information, subscriber's contacts, subscriber personal information (e.g., SMS), the name of a mobile network operator in which a subscriber is registered, a useable service, a useable data amount, a price, a service provision speed, or information necessary for authenticating a subscriber or generating a traffic security key at the time of access to a wireless communication network, such as GSM, WCDMA, LTE, or NR, to allow the subscriber to safely use wireless communication. According to an embodiment, the operational profile may include a SIM profile. For example, the SIM may include a SIM file system (a master file (MF), a dedicated file (DF), an elementary file (EF)), and a subscriber identify information (IMSI) value may be stored in the elementary file.

According to various embodiments, the provisioning profile may include a profile including first information necessary for downloading a first operational profile in an electronic device. For example, the first information may include communication session information necessary for a first communication connection designated for downloading a first operational profile. For example, the communication session information may include SM-DS server (e.g., the SM-DS server 210 in FIG. 2) access information for downloading the first operational profile, and may include mobile network operator network information usable for SM-DS server access.

According to various embodiments, the communication module 190 (e.g., the communication module 190 in FIG. 1A) may include various communication circuitry and perform first communication based on a provisioning profile or second communication based on a second operational profile. At least one screen associated with the first communication based on the provisioning profile or the second communication based on the second operational profile may be displayed on the display device 160.

According to an embodiment, the LPA 312 has been described as an element included in the processor 120, but at least some functions of the LPA 312 may be performed by the processor 120, or a separate LPA 312 may operate in conjunction with the processor 120. For example, the LPA 312 may be included in a program (e.g., the program 140 in FIG. 1A), and may be loaded and executed by the processor 120. When the LPA 312 is loaded into and executed by the processor 120, the LPA 312 may be understood as an operation of the processor 120. According to various embodiments, the functional modules (e.g., the LDS 31, the LPD 33, or the LUI 35) included in the LPA 312 are elements classified for illustrative purposes, and may be expressed as other functional modules and thus may not be limited to the embodiments. According to various embodiments, the LPA 312 may be included in the eSIM 201.

Figure 4:
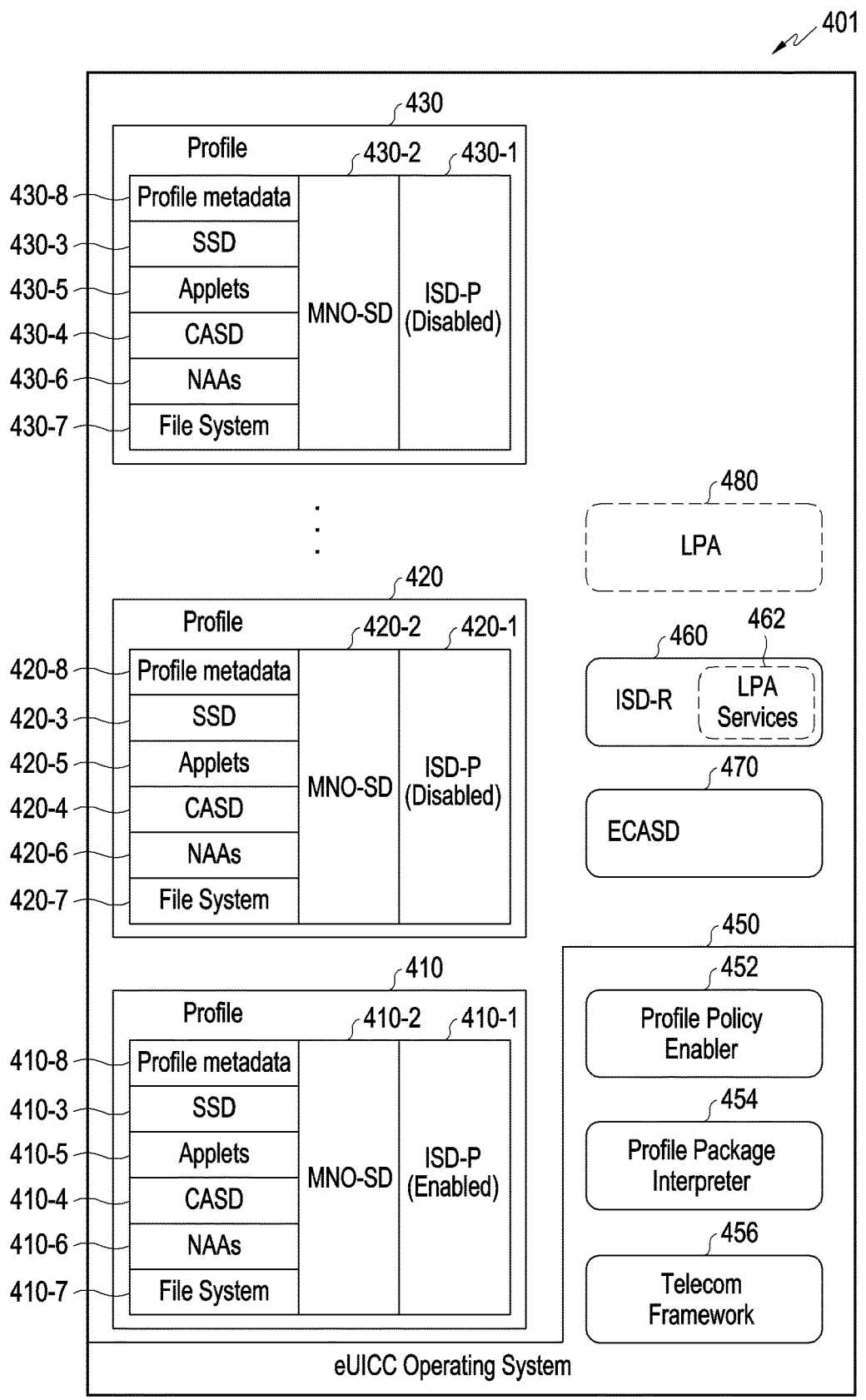
FIG. 4 is a diagram illustrating an example inner structure of an eUICC according to various embodiments.

FIG. 4 is a diagram illustrating an example inner structure of an eUICC according to various embodiments.

An eUICC 401 (e.g., the eSIM 201 in FIG. 2 or FIG. 3) according to an embodiment may have the shape of a card or a chip, and at least one software-type profile 410, 420, or 430 may be installed in the eUICC 401. According to various embodiments, each of the at least one profile 410, 420, or 430 may be a provisioning profile or an operational profile. The at least one profile 410, 420, or 430 may operate on an eUICC operating system (eUICC OS) 450. Each of the at least one profile 410, 420, or 430 may be enabled or disabled by a processor or an LPA (e.g., the LPA 312 in FIG. 3 or the LPA 480 in FIG. 4). In FIG. 4, one profile 410 according to an embodiment may be enabled, and the remaining profiles 420 and 430 may be disabled.

According to various embodiments, the eUICC operating system (eUICC OS) 450 of the eUICC 401 may include a profile policy enabler 452, a profile package interpreter 454, or a telecom framework 456. According to an embodiment, the profile policy enabler 452 may manage a profile policy rule (PPR) for the at least one profile 410, 420, or 430. According to an embodiment, the profile package interpreter 454 may unpackage a profile package, received from the SM-DP+ 220, in a form that is installable in the eUICC 401. According to an embodiment, the telecom framework 456 may perform a function associated with communication of applications in the eUICC 401. According to various embodiments, the eUICC 401 may include an issuer security domain root (ISD-R) 460 and an eUICC controlling authority security domain (ECASD) 470. According to an embodiment, the ISD-R 460 may manage the at least one profile 410, 420, or 430 installed in the eUICC 401. For example, the ISD-R 460 may include LPA services 462, and the LPA services 462 may manage the at least one profile 410, 420, or 430 installed in the eUICC 401 through a processor or an LPA (e.g., the LPA 312 in FIG. 3 or the LPA 480 in FIG. 4) and an interface. According to an embodiment, the ECASD 470 may perform security processing for the at least one profile 410, 420, or 430 installed in the eUICC 401.

According to various embodiments, the at least one profile 410, 420, or 430 may include an ISD-P 410-1, 420-1, or 430-1, an MNO-SD 410-2, 420-2, or 430-2, a supplementary security domain (SSD) 410-3, 420-3, or 430-3, a controlling authority security domain (CASD) 410-4, 420-4, or 430-4, applets 410-5, 420-5, or 430-5, network access applications (NAAs) 410-6, 420-6, or 430-6, a file system 410-7, 420-7, or 430-7, or a profile metadata 410-8, 420-8, or 430-8.

According to an embodiment, the ISD-P 410-1, 420-1, or 430-1 may include information necessary for decoding and interpreting a profile package, and may be used to unpackage and install the profile package received from the SM-DP+ 220 in cooperation with the profile package interpreter 454.

According to an embodiment, the MNO-SD 410-2, 420-2, or 430-2 may include an over-the-air (OTA) key of an MNO, and may include information necessary for providing a security OTA channel usable for communicating with the MNO.

According to an embodiment, the SSD 410-3, 420-3, or 430-3 and the CASD 410-4, 420-4, or 430-4 may include information necessary for securing a profile.

According to an embodiment, the applets 410-5, 420-5, or 430-5 may include various types of application information associated with a user of a profile.

According to an embodiment, the NAAs 410-6, 420-6, or 430-6 may include application information which allows a profile to access a network.

According to an embodiment, the file system 410-7, 420-7 or 430-7 may include a file system associated with each type of information about a profile.

According to an embodiment, profile metadata 410-8, 420-8, or 430-8 may be called a profile record, and may include metadata information about a profile in text form. The metadata information may include at least one among an integrated circuit card ID (ICCID) of a profile, a profile name, the name of a profile-providing MNO, a user's profile nickname, an icon, a profile class, notification configuration information, profile owner information, or a profile policy rule (PPR).

According to various embodiments, the ICCID of a profile, which is a profile identifier, may be the unique identifier of each profile. The profile name may include the name of each profile. The name of a profile-providing MNO may include the name of a mobile network operator that provides a profile. The user's profile nickname may include a profile nickname designated by the user. The icon may include an icon corresponding to a profile. The profile class may include information indicating whether a profile is a provisioning profile or an operational profile. The notification configuration information may include the address of a server (e.g., the SM-DP+ server 220) that is to receive a notification. The profile owner information may include a mobile country code (MCC), a mobile network code (MNC), or a group identifier (GID) 1 or 2, associated with a profile owner. For example, the mobile country code (MCC) may be a code for identifying a country, and the mobile network code (MNC) may be a code for identifying a mobile network operator. The group identifier (GID) 1 or 2 may be code area information for identifying the group or area to which a profile belongs. The area information may include a group including multiple countries. The profile policy rule (PPR) may include policy rule information necessary for managing a profile.

According to various embodiments, the electronic device 101 may determine whether the at least one profile 410, 420, or 430 installed in the eUICC 401 is a provisioning profile or an operational profile using profile class information of the profile metadata 410-8, 420-8, or 430-8 included in the at least one profile 410, 420, or 430, and may enable or disable a provisioning profile or an operational profile through an LPA (e.g., the LPA 312 in FIG. 3 or the LPA 480 in FIG. 4).

Figure 5A:
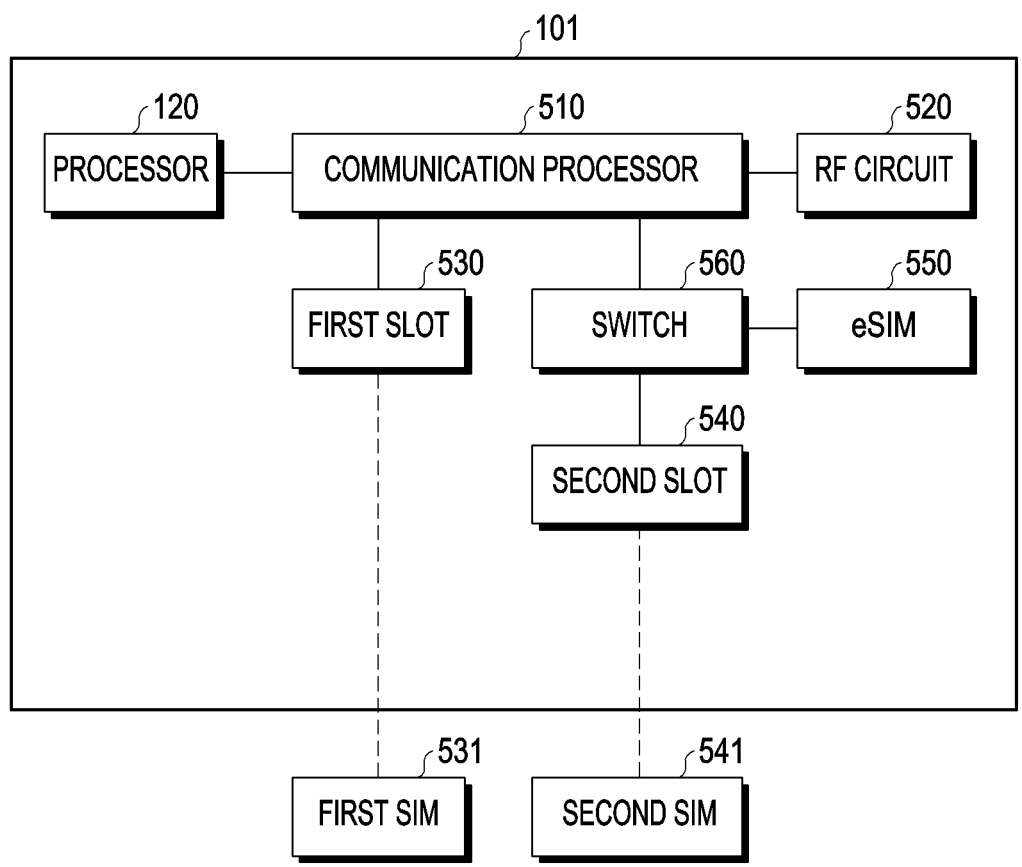
FIG. 5A is a block diagram illustrating an example electronic device according to various embodiments.

FIG. 5A is a block diagram illustrating an example configuration of an electronic device according to various embodiments.

According to various embodiments, the electronic device 101 may include at least one among a processor (e.g., including processing circuitry) 120, a communication processor (e.g., including processing circuitry) 510, an RF circuit 520, a first slot 530, a second slot 540, an eSIM 550, and/or a switch 560. The communication processor 510 may include various processing circuitry and establish a communication channel in a band to be used for wireless communication, and may support network communication via the established communication channel. For example, the communication processor 510 may support at least one of 2G network communication, 3G network communication, 4G network communication, or 5G network communications.

The RF circuit 520, for example, may include at least one among a radio-frequency integrated circuit (RFIC), a radio-frequency front end (RFFE), or an antenna module. The RF circuit 520 may process data (e.g., a baseband signal), output from the communication processor 510, into an RF signal, and may transmit the RF signal via the antenna module. The RF circuit 520 may convert an RF signal via the antenna module into a baseband signal, and may transmit the baseband signal to the communication processor 510. The RF circuit 520 may process an RF signal or a baseband signal according to the communication type supported by the communication processor 510, and the type of the RF circuit 520 is not limited. An interface between elements may be implemented as, for example, a general-purpose input/output (GPIO), universal asynchronous receiver/transmitter (UART) (e.g., high speed-UART (HS-UART)), or peripheral component interconnect bus express (PCIe) interface, but the type thereof is not limited. Alternatively, at least some elements may exchange control information or packet data information using, for example, shared memory. In the embodiment illustrated in FIG. 5A, the processor 120 and the communication processor 510 are different hardware, but this is for illustrative purposes. The processor 120 and the communication processor 510 may be implemented as different hardware, but, according to another implementation example, the processor 120 and the communication processor 510 may be implemented in a single chip.

The communication processor 510 according to various embodiments may perform the above-described authentication procedure based on information stored in a SIM. The communication processor 510 may be connected to a first SIM 531 via the first slot 530. For example, the first SIM 531 may be connected to a stack of the communication processor 510 (e.g., a stack according to ISO7816). In the embodiment in FIG. 5A, the communication processor 510 may include two stacks. For example, the first slot 530 may be a structure capable of receiving the first SIM 531, which is an rSIM, and may include at least one terminal capable of transferring information from the first SIM 531 to the communication processor 510 when the first SIM 531 is received therein. The second slot 540 may be a structure capable of receiving a second SIM 541, which is an rSIM, and may include at least one terminal capable of transferring information from the second SIM 541 to the communication processor 510 when the second SIM 541 is received therein. The first slot 530 and the second slot 540 may be the same type, but may be different types depending on the implementation thereof. The communication processor 510 may acquire information stored in the first SIM 531 from the first SIM 531, which is received in the first slot 530. For example, at least one among an integrated circuit card identifier (ICCID), an IMSI, information related to a home public land mobile network (HPLMN), or a mobile subscriber international ISDN number (MSISDN) may be stored in at least one among the first SIM 531, the second SIM 541, or the eSIM 550 (e.g., the eSIM 201 in FIG. 3). This may be called an elementary file (EF). The communication processor 510 may perform, based on the acquired information stored in the first SIM 531, an authentication procedure for network communication corresponding to the first SIM 531 via the RF circuit 520. When authentication is successful, the communication processor 510 may perform, via the RF circuit 520, network communication corresponding to the first SIM 531.

At least one of the processor 120 or the communication processor 510 according to various embodiments may control the state of the switch 560. The state of the switch 560 may be one of a first state, in which the switch 560 connects the communication processor 510 to the second slot 540, or a second state, in which the switch 560 connects the communication processor 510 to the eSIM 550. For example, at least one of the processor 120 or the communication processor 510 may control the switch 560 such that the second slot 540 is connected to the communication processor 510. In other words, at least one of the processor 120 or the communication processor 510 may provide the switch 560 with a control signal, which is capable of controlling the state of the switch 560 to be the first state. If a basic state, in which the switch 560 does not receive a specific signal, is the first state, at least one of the processor 120 or the communication processor 510 may not perform a particular operation of connecting the second slot 540 to the communication processor 510. The signal for controlling the switch 560 may be transferred through, for example, general purpose input/output (GPIO), but the interface therefor is not limited. Depending on the circumstances, the state of the switch 560 may be controlled to be a third state in which the communication processor 510 is not connected either to the second slot 540 or to the eSIM 550. The switch 560 may include, for example, at least one metal oxide semiconductor field effect transistor (MOSFET) or freewheeling switch, but those skilled in the art will understand that the type of thereof is not limited.

FIG. 5A illustrates that the communication processor 510 is selectively connected to the second slot 540 or the eSIM 550 according to control of the state of the switch 560, but this is only an example. According to various embodiments, the communication processor 510 may selectively use, instead of the eSIM 550, a soft SIM which is installed in the electronic device 101 and is dedicated to a mobile network operator. For example, when a soft SIM is installed in the electronic device 101 (e.g., in the processor 120 or in the communication processor 510), the communication processor 510 may use the second SIM 541 in the state of being connected to the second slot 540, or may selectively use the soft SIM. According to various embodiments, an eSIM in each of the embodiments described later may be replaced with a soft SIM, and may be identically or similarly applied.

For example, referring to FIG. 5B, according to various embodiments, the switch 560 may be selectively connected to one of the second slot 540 or the eSIM 550. The second slot 540 may include at least one among a voltage common collector (VCC) terminal 540a, a reset (RST) terminal 540b, a clock (CLK) terminal 540c, a single wire protocol (SWP) terminal 540d, a ground (GND) terminal 540e, a voltage programming power (VPP) terminal 540f, an input/output (I/O) terminal 540g, or a SWP terminal 540h. The second SIM 541 may include terminals connectable to the VCC terminal 540a, the RST terminal 540b, the CLK terminal 540c, the SWP terminal 540d, the GND terminal 540e, the VPP terminal 540f, the I/O terminal 540g, or the SWP terminal 540h. The second SIM 541 may be received in an opening 540i of the second slot 540. When the second SIM 541 is received in the second slot 540, the terminals 540a to 540h of the second slot 540 may be in contact with (or connected to) the terminals (not shown) of the second SIM 541, and thus the second SIM 541 may be connected to the communication processor 510. In various embodiments, the fact that the switch 560 is in the first state may signify that at least some of the multiple terminals 540a to 540h of the second slot 540 are connected to the communication processor 510. For example, the eSIM 550 may include at least one among a VCC terminal 550a, an RST terminal 550b, a CLK terminal 550c, an SWP terminal 550d, a GND terminal 550e, a VPP terminal 550f, an I/O terminal 550g, or an SWP terminal 550h. The second SIM 541 may include terminals connectable to the VCC terminal 550a, the RST terminal 550b, the CLK terminal 550c, the SWP terminal 550d, the GND terminal 550e, the VPP terminal 550f, the I/O terminal 550g, or the SWP terminal 550h. In various embodiments, the fact that the switch 560 is in the second state may signify that at least some of the multiple terminals 550*a* to 550*h* of the eSIM 550 are connected to the communication processor 510.

According to various embodiments, while the communication processor 510 is connected to the second slot 540, the communication processor 510 may acquire information stored in the second SIM 541 from the second SIM 541, which is received the second slot 540. For example, at least one of the processor 120 or the communication processor 510 may control the switch 560 such that the eSIM 550 is connected to the communication processor 510. In other words, at least one of the processor 120 or the communication processor 510 may provide a control signal, which is capable of controlling the state of the switch 560 to be the second state, to the switch 560. A basic state, in which the switch 560 does not receive a specific signal, may be the second state. In this case, at least one of the processor 120 or the communication processor 510 may not perform a particular operation of connecting the eSIM 550 to the communication processor 510. In various embodiments, the configuration in which the processor 120 or the communication processor 510 controls the switch 560 to be in a specific state may include not only outputting a signal causing the switch 560 to be in the corresponding state but also not outputting any particular signal causing the switch 560 to be in the corresponding state. As described above, the communication processor 510 may perform, based on the acquired information stored in the eSIM 550, an authentication procedure for network communication corresponding to the eSIM 550. If authentication is successful, the communication processor 510 may perform the network communication corresponding to the eSIM 550 via the RF circuit 520.

According to various embodiments, the communication processor 510 may perform network communication of a dual SIM according to the first SIM 531 and the second SIM 541, or may perform network communication of a dual SIM according to the first SIM 531 and the eSIM 550. Those skilled in the art will understand that the network communication of the dual SIM may be performed in one mode selected from among a DSDS mode or a DSDA mode depending on the implementation of the RF circuit 520.

According to various embodiments, the communication processor 510 may include two stacks (e.g., stacks according to ISO7816) for processing a SIM, and the first SIM 531 and the second SIM 541 may be connected to the two stacks, or the first SIM 531 and the eSIM 550 may be connected to the two stacks. For example, the first slot 530 may be fixedly connected to one stack, and the second slot 540 or the eSIM 550 may be selectively connected to the other stack. As described above, the disclosure provides an embodiment of a structure in which three or more SIMs can be processed even though no stack is added to the communication processor 510.

Figure 6A:
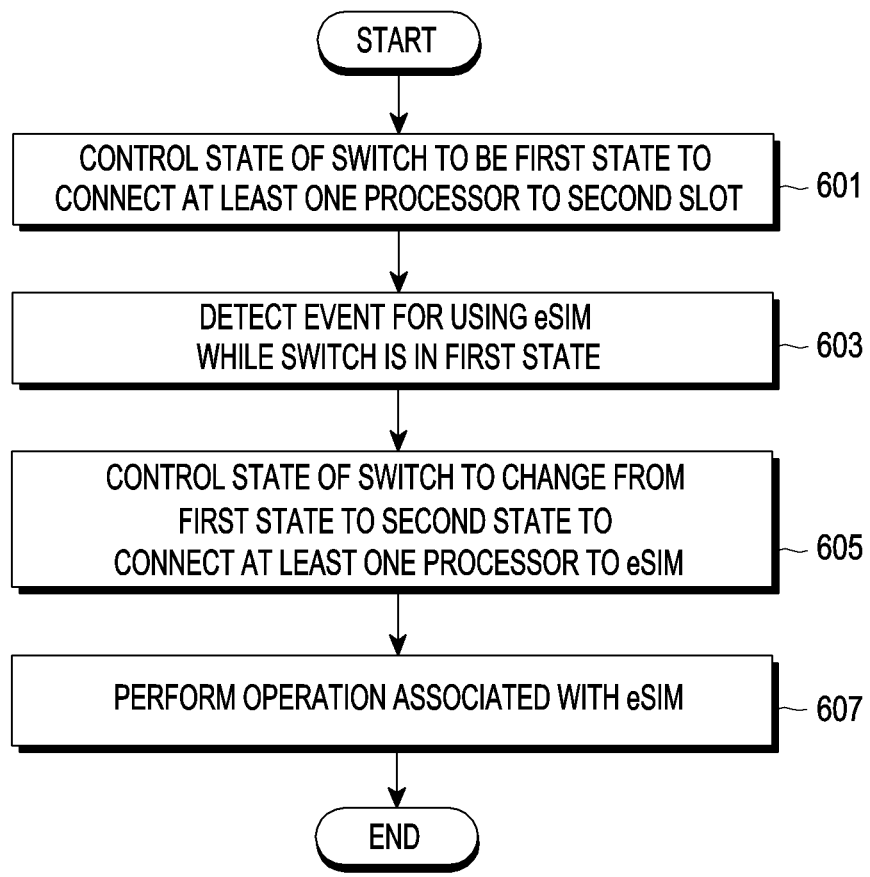
FIG. 6A is a flowchart illustrating an example method of operating an electronic device according to various embodiments.

FIG. 6A is a flowchart illustrating an example method of operating an electronic device according to various embodiments.

Operations in FIG. 6A according to various embodiments will be described, for convenience, with reference to the electronic device 101 in FIG. 1A or 5A.

According to various embodiments, in operation 601, the electronic device 101 (e.g., at least one of the processor 120 or the communication processor 510) may control the state of the switch 560 to be a first state, thereby connecting at least one processor (e.g., the communication processor 510) to the second slot 540. For example, the electronic device 101 may connect the communication processor 510 to the second slot 540, based on detection of an event for using the second SIM 541. The event for using the second SIM 541 may be, for example, detection of reception of the second SIM 541 in the second slot 540, or a user command to use the second SIM 541, but as long as the event is an event requiring data transmission/reception between the second SIM 541 and the communication processor 510, the type thereof is not limited. Alternatively, the first SIM 531 and the second SIM 541 may be configured as default SIMs for use. In this case, the communication processor 510 may be connected to the second slot 540 without any particular control by the electronic device 101.

According to various embodiments, in operation 603, the electronic device 101 may detect an event for using the eSIM 550 while the switch 560 is in the first state. The event for using the eSIM 550 may be, for example, enabling, deleting, or adding at least one profile configured in the eSIM 550, but as long as the event is an event requiring data transmission/reception between the eSIM 550 and the communication processor 510, the type thereof is not limited.

In operation 605, the electronic device 101 may control the state of the switch 560 to change from the first state to a second state, thereby connecting at least one processor (e.g., the communication processor 510) to the eSIM 550.

In operation 607, the electronic device 101 may perform an operation associated with the eSIM 550. For example, the electronic device 101 may perform network authentication using information stored in the eSIM 550. Alternatively, the electronic device 101 may control the eSIM 550 to delete or add a profile of the eSIM 550.

FIG. 6A illustrates a configuration in which the electronic device 101 may control, based on detection of the event for using the eSIM 550, the state of the switch 560 from the first state to the second state, but this is for an illustrative purpose. According to various embodiments, those skilled in the art will understand that the electronic device 101 may also control, based on the detection of the event for using the second SIM 541, the state of the switch 560 from the second state to the first state while the eSIM 550 is connected to the communication processor 510.

Figure 6B:
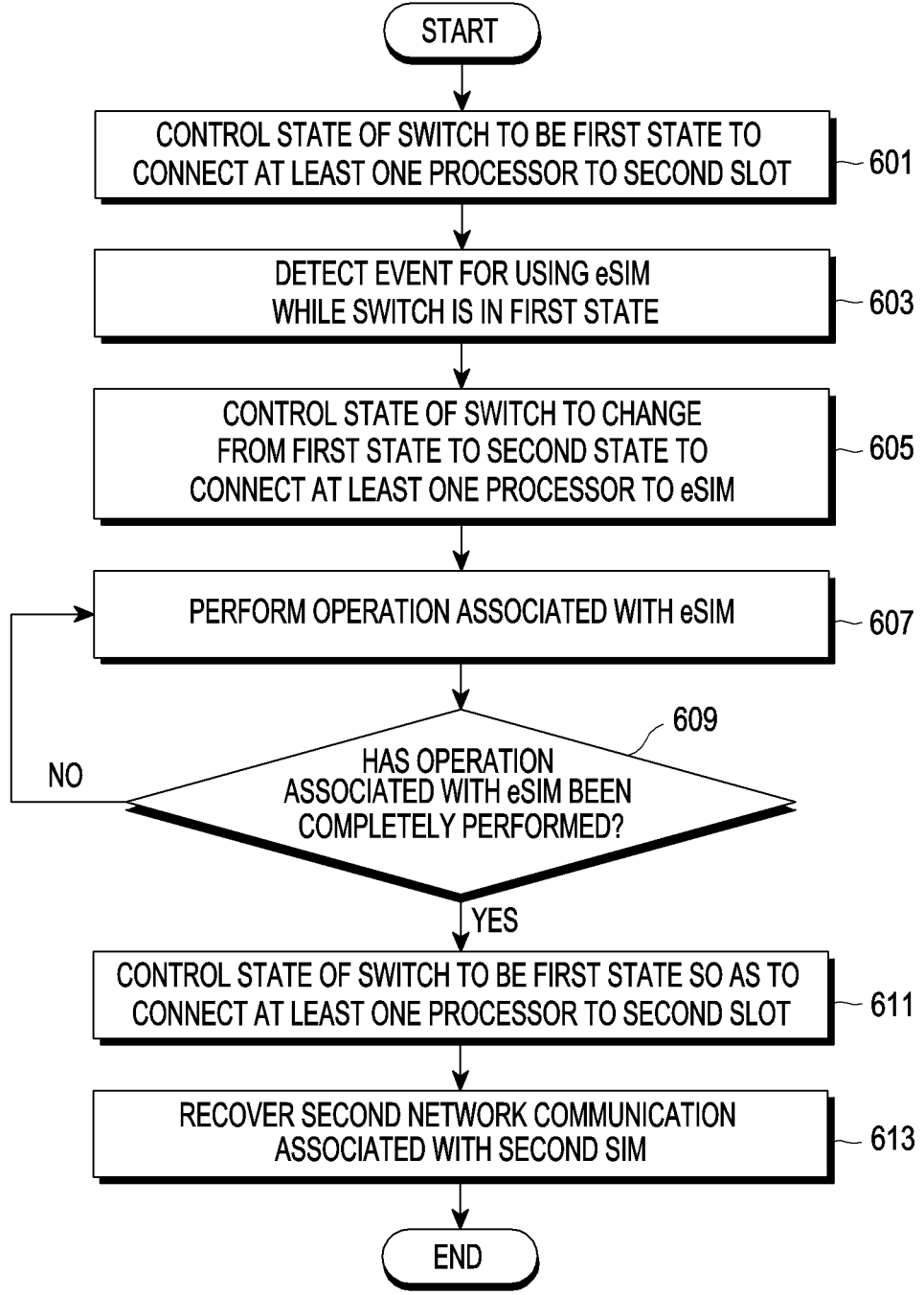
FIG. 6B is a flowchart illustrating an example method of operating an electronic device according to various embodiments.

FIG. 6B is a flowchart illustrating an example method of operating an electronic device according to various embodiments. The above-described operations, among the operations in FIG. 6B, will be briefly described.

The operations in FIG. 6B according to various embodiments will be described, for convenience, with reference to the electronic device 101 in FIG. 1A or 5A.

According to various embodiments, in operation 601, the electronic device 101 (e.g., at least one of the processor 120 or the communication processor 510) may control the state of the switch 560 to be a first state, thereby connecting at least one processor (e.g., the communication processor 510) to the second slot 540. It is assumed that, while the switch 560 is in the first state, the electronic device 101 performs network communication corresponding to the first SIM 531 and network communication corresponding to the second SIM 541.

In operation 603, the electronic device 101 may detect an event for using the eSIM 550 while the switch 560 is in the first state. For example, the electronic device 101 may detect an event for temporarily using the eSIM 550. In various embodiments, the event for using the eSIM 550 may include an event for temporarily using the eSIM 550 and an event for non-temporarily using the eSIM 550. For example, the event for temporarily using the eSIM 550 may be the deletion or addition of a profile configured in the eSIM 550, or a request for information about a profile of the eSIM 550, but this is merely for illustrative purposes. The event for temporarily using the eSIM 550 is not limited as long as the same is an event requiring the transmission/reception of data to/from the eSIM 550 without requiring connection of network communication corresponding to the eSIM 550 or while requiring connection of temporary network communication. The event for non-temporarily using the eSIM 550 may be an event requiring connection of network communication corresponding to the eSIM 550 or an event requiring connection and maintenance of network communication during at least a predetermined time (or procedure).

When the event for temporarily using the eSIM 550 is detected, the electronic device 101 may control, in operation 605, the state of the switch 560 from the first state to a second state, thereby connecting at least one processor (e.g., the communication processor 510) to the eSIM 550. While the switch 560 is in the second state, the network communication corresponding to the second SIM 541 may be disconnected.

In operation 607, the electronic device 101 may perform an operation associated with the eSIM 550.

According to various embodiments, in operation 609, the electronic device 101 may determine whether the operation associated with the eSIM 550 has been completed. When it is determined that the operation associated with the eSIM 550 has not been completed (609-No), the electronic device 101 may perform the operation associated with the eSIM 550. When it is determined that the operation associated with the eSIM 550 has been completed (609—Yes), the electronic device 101 may control, in operation 611, the state of the switch 560 to the first state, thereby connecting at least one processor (e.g., the communication processor 510) to the second slot 540. Thus, the second SIM 541 received in the second slot 540 may be connected to the communication processor 510.

In operation 613, the electronic device 101 may recover the network communication associated with the second SIM 541. The electronic device 101 may recover the network communication, based on information stored in the second SIM 541.

Although not illustrated, if the event for non-temporarily using the eSIM 550 (e.g., an event for connecting network communication corresponding to the eSIM 550) is detected, the electronic device 101 may establish the network communication corresponding to the eSIM 550, and may transmit and receive data, based on the corresponding network communication. In this case, operations 609 to 613 may not be performed.

Figure 6C:
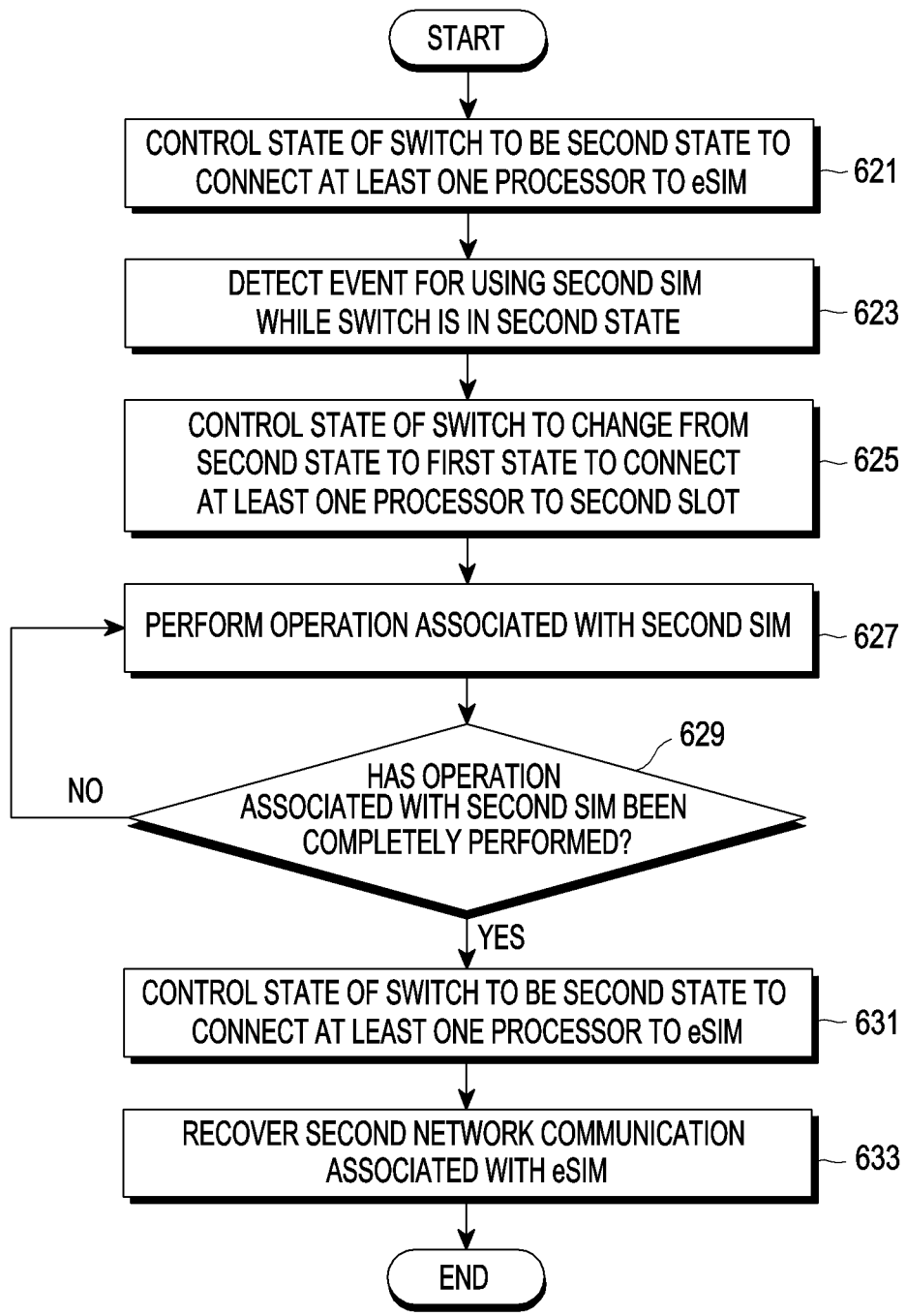
FIG. 6C is a flowchart illustrating an example method of operating an electronic device according to various embodiments.

FIG. 6C is a flowchart illustrating an example method of operating an electronic device according to various embodiments. The above-described operations, among the operations in FIG. 6C, will be briefly described.

The operations in FIG. 6C according to various embodiments will be described, for convenience, with reference to the electronic device 101 in FIG. 1A or 5A.

According to various embodiments, in operation 621, the electronic device 101 (e.g., at least one of the processor 120 or the communication processor 510) may control the state of the switch 560 to be a second state, thereby connecting at least one processor (e.g., the communication processor 510) to the eSIM 550. For example, the electronic device 101 may connect the communication processor 510 to the eSIM 550, based on the detection of an event for using the eSIM 550. The event for using the eSIM 550 may be a user command to use the eSIM 550, but as long as the event is an event requiring data transmission/reception between the eSIM 550 and the communication processor 510, the type thereof is not limited. The first SIM 531 and the eSIM 550 may be configured as default SIMs for use. In this case, the communication processor 510 may be connected to the eSIM 550 without any particular control by the electronic device 101.

According to various embodiments, in operation 623, the electronic device 101 may detect an event for using the second SIM 541 while the switch 560 is in the second state. For example, the electronic device 101 may detect an event for temporarily using the second SIM 541. In various embodiments, the event for using the second SIM 541 may include an event for temporarily using the second SIM 541 and an event for non-temporarily using the second SIM 541. For example, the event for temporarily using the second SIM 541 may be a request for information about the second SIM 541, but this is merely for illustrative purposes. The event for temporarily using the second SIM 541 is not limited as long as the same is an event requiring the transmission/reception of data to/from the second SIM 541 without connection of network communication corresponding to the second SIM 541 or while requiring temporary network communication. The event for non-temporarily using the second SIM 541 may be an event requiring connection of network communication corresponding to the second SIM 541 or an event requiring connection and maintenance of network communication during at least a predetermined time (or procedure).

When the event for temporarily using the second SIM 541 is detected, the electronic device 101 may control, in operation 625, the state of the switch 560 from the second state to a first state, thereby connecting at least one processor (e.g., the communication processor 510) to the second SIM 541. While the switch 560 is in the first state, the network communication corresponding to the eSIM 550 may be disconnected.

In operation 627, the electronic device 101 may perform an operation associated with the second SIM 541.

According to various embodiments, in operation 629, the electronic device 101 may determine whether the operation associated with the second SIM 541 has been completed. When it is determined that the operation associated with the second SIM 541 has not been completed (629-No), the electronic device 101 may perform the operation associated with the second SIM 541. When it is determined that the operation associated with the second SIM 541 has been completed (629—Yes), the electronic device 101 may control, in operation 631, the state of the switch 560 to the second state, thereby connecting at least one processor (e.g., the communication processor 510) to the eSIM 550.

In operation 633, the electronic device 101 may recover the network communication associated with the eSIM 550. The electronic device 101 may recover the network communication, based on information stored in the eSIM 550.

Although not illustrated, if the event for non-temporarily using the second SIM 541 (e.g., an event for connecting network communication corresponding to the second SIM 541) is detected, the electronic device 101 may establish the network communication corresponding to the second SIM 541, and may transmit and receive data, based on the corresponding network communication. In this case, operations 629 to 633 may not be performed.

Figure 7A:
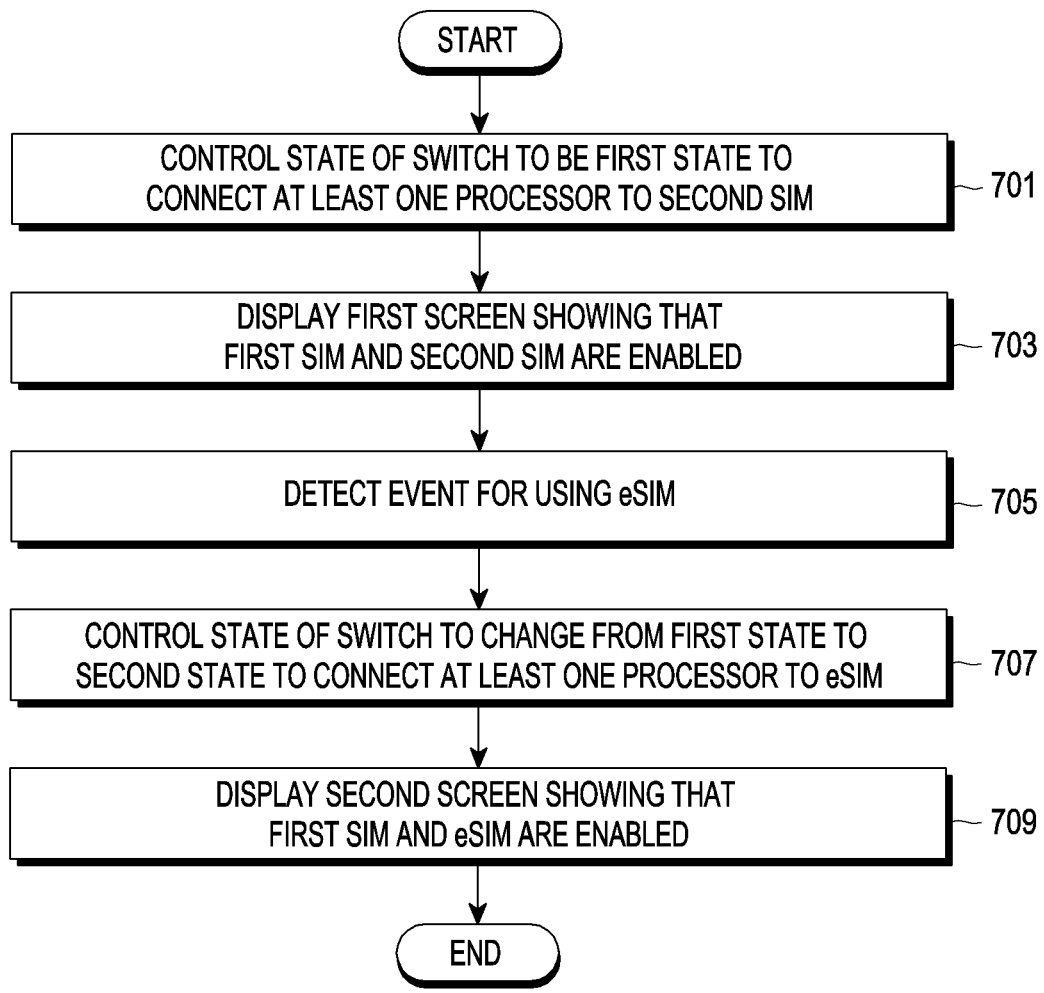
FIG. 7A is a flowchart illustrating an example method of operating an electronic device according to various embodiments.

FIG. 7A is a flowchart illustrating an example method of operating an electronic device according to various embodiments.

Operations in FIG. 7A according to various embodiments will be described, for convenience, with reference to the electronic device 101 in FIG. 1A or 5A.

The above-described operations, among the operations in FIG. 7A, will be briefly described.

According to various embodiments, in operation 701, the electronic device 101 (e.g., at least one of the processor 120 or the communication processor 510) may control the state of the switch 560 to be a first state, thereby connecting at least one processor (e.g., the communication processor 510) to the second slot 540. The second SIM 541 may be connected to the communication processor 510 through the second slot 540.

In operation 703, the electronic device 101 may control, for example, the display device 160 to display a first screen showing that the first SIM 531 and the second SIM 541 are enabled. The first screen may include at least some among, for example, information about the first SIM 531 and the second SIM 541, information about network communication connected based on the first SIM 531 and the second SIM 541, or information indicating whether the first SIM 531 and the second SIM 541 are enabled. Herein, the enabling of the first SIM 531 and the second SIM 541 may signify that network communication corresponding to each of the first SIM 531 and the second SIM 541 has been established. For example, even though at least one of the first SIM 531 and the second SIM 541 is in a standby state based on a DSDS mode, when the corresponding SIM can wake up in a predetermined period (or based on an event) in the standby state, it may be said that the corresponding SIM is enabled. Even though at least one of the first SIM 531 and the second SIM 541 is in a sleep mode according to discontinuous reception (DRX), when the corresponding SIM can wake up in a predetermined period (or based on an event), it may be said that the corresponding SIM is enabled. The configuration of the first screen is not limited, and will be described later. Even though network communication connection to a specific SIM is not made due to failure to search for a PLMN, search for a cell, camp on a cell, or make an RRC connection to a specific cell, it may be said that the SIM is enabled if a procedure for network communication connection to the corresponding SIM is being performed.

According to various embodiments, in operation 705, the electronic device 101 may detect an event for using the eSIM 550. For example, the electronic device 101 may detect the event for using the eSIM 550, based on user input to the first screen.

In operation 707, the electronic device 101 may control the state of the switch 560 to change from the first state to a second state, thereby connecting at least one processor to the eSIM 550.

In operation 709, the electronic device 101 may display a second screen showing that the first SIM 531 and the eSIM 550 are enabled.

When the state of the eSIM 550 is changed to an enabled state, the state of the second SIM 541 may be changed to a disabled state. The electronic device 101 may output a message indicating that the network communication corresponding to the second SIM 541 will be disconnected. For example, the electronic device 101 may also be configured to enable the eSIM 550 when an additional command is received from a user.

Figure 7B:
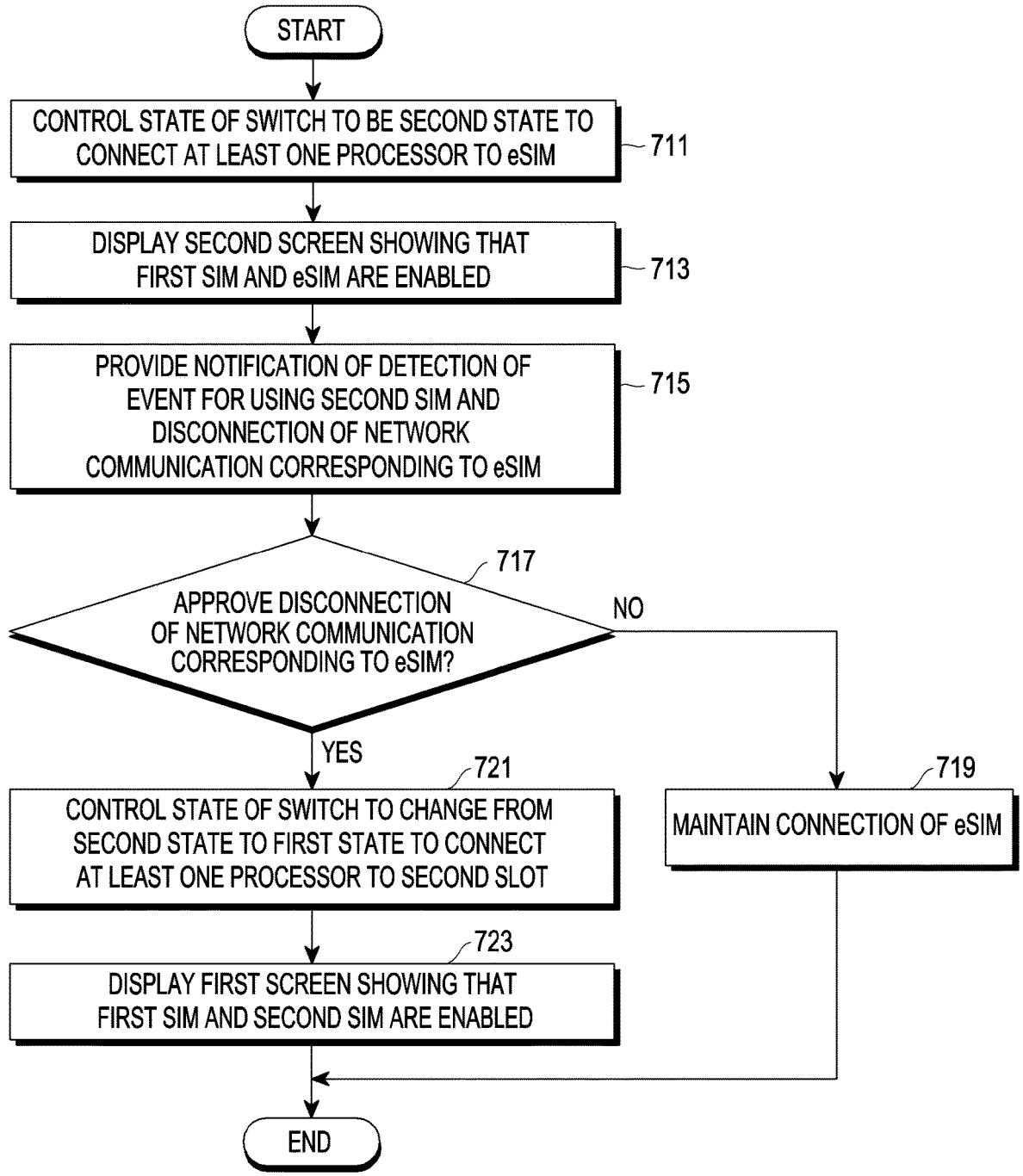
FIG. 7B is a flowchart illustrating an example method of operating an electronic device according to various embodiments.

FIG. 7B is a flowchart illustrating an example method of operating an electronic device according to various embodiments. The above-described operations, among the operations in FIG. 7B, will be briefly described. The operations in FIG. 7B will be described, for convenience, with reference to: the electronic device 101 in FIG. 1A or 5A; and FIGS. 8A, 8B, 8C and 8D.

According to various embodiments, in operation 711, the electronic device 101 (e.g., at least one of the processor 120 or the communication processor 510) may control the state of the switch 560 to be a second state, thereby connecting at least one processor (e.g., the communication processor 510) to the eSIM 550.

Figure 8A:
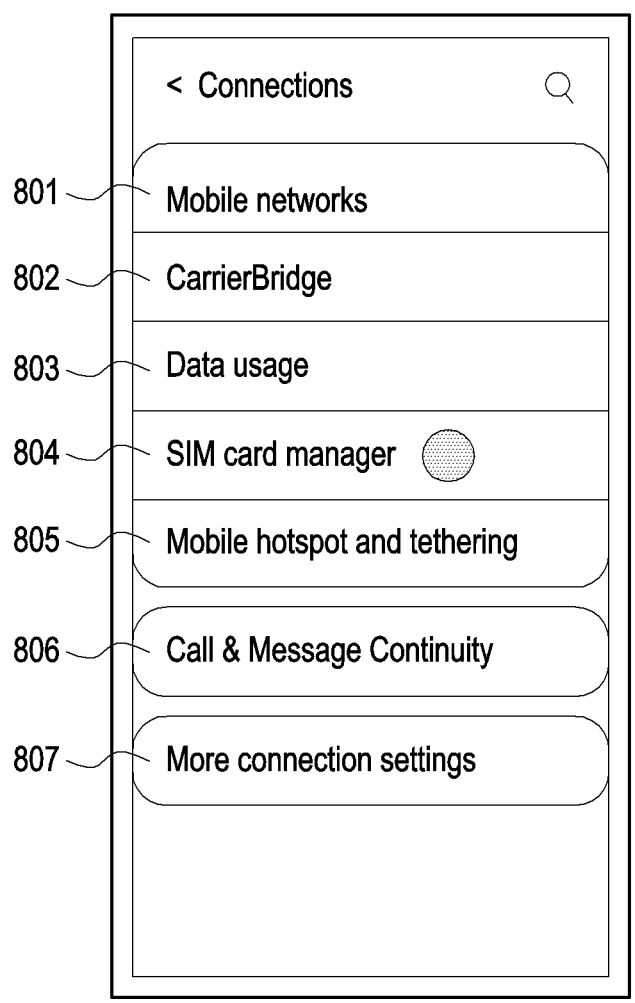
FIG. 8A is a diagram illustrating an example screen displayed in an electronic device according to various embodiments.
Figure 8B:
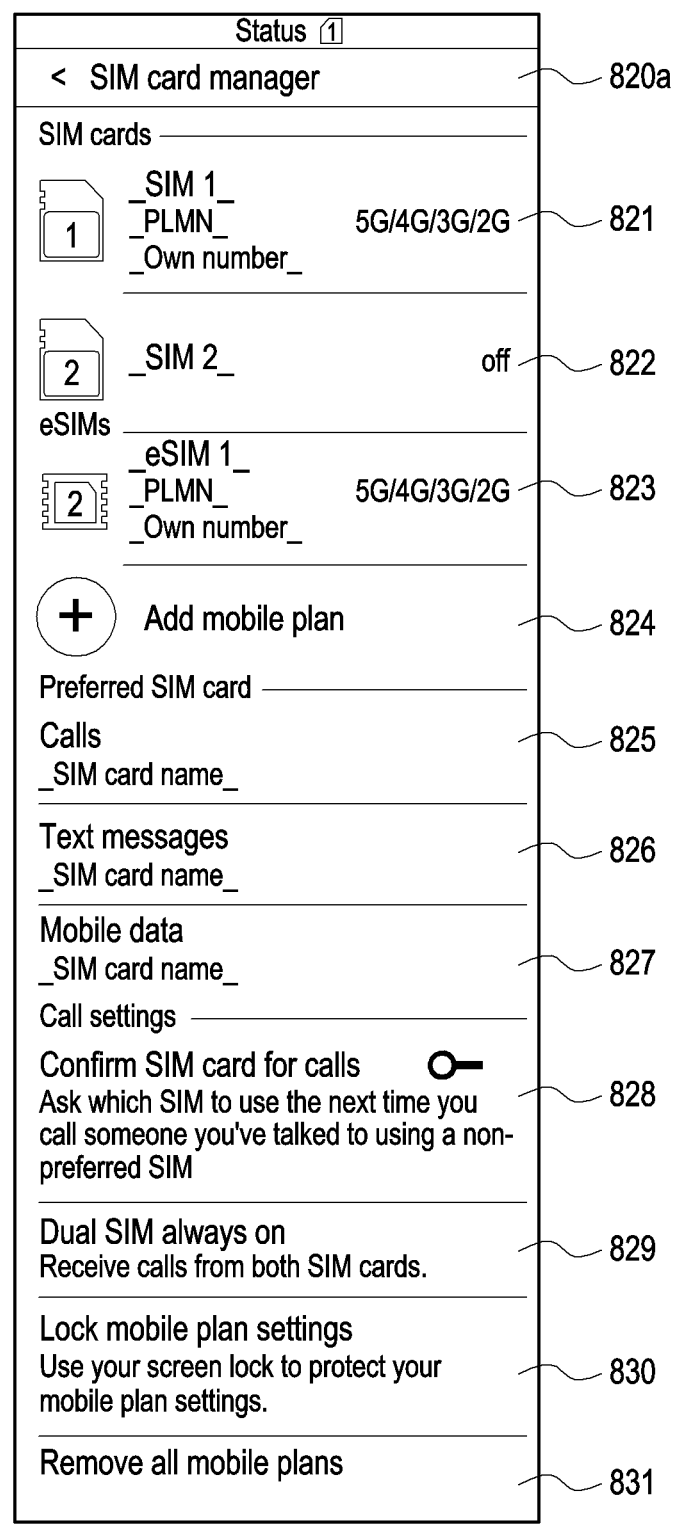
Figure 8C:
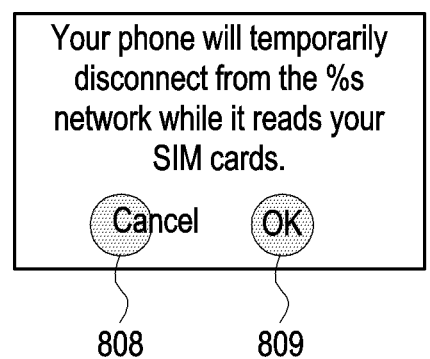
FIG. 8C is a diagram illustrating an example screen displayed in an electronic device according to various embodiments.

In operation 713, the electronic device 101 may display a second screen showing that the first SIM 531 and the eSIM 550 are enabled. For example, as illustrated in FIG. 8A, the electronic device 101 may display a screen on which connection of network communication can be configured. The screen on which connection can be configured may include at least one among, for example, a mobile network configuration tab 801, a carrier-bridge (carrierBridge) configuration tab 802, a data-usage-checking tab 803, a SIM card manager configuration tab 804, a mobile hotspot and tethering configuration tab 805, a call and message continuity configuration tab 806, or a more-connection-settings tab 807, but the types of tabs are not limited thereto. When the SIM card manager configuration tab 804 is selected from among the tabs 801 to 807, the electronic device 101 may display a screen 820a, illustrated in FIG. 8B, including SIM-related information.

According to various embodiments, the screen 820a including SIM-related information may include a tab 821 corresponding to the first SIM 531, a tab 822 corresponding to the second SIM 541, and a tab 823 corresponding to a profile (e.g., eSIM 1) stored in the eSIM 550. The electronic device 101 may display information associated with the first SIM 531 (e.g., an own number (e.g., a mobile station international subscriber directory number (MSISDN)), PLMN information, or supportable network communication types) in the tab 821 corresponding to the first SIM 531. The electronic device 101 may also display, based on the enabled state of the first SIM 531, supportable network communication types to be visually distinguished from the tab 822 corresponding to a disabled SIM (e.g., the second SIM 541). A number "1" included in an icon in the tab 821 may correspond to, for example, the first slot 530, and a number "2" included in an icon in each of the tabs 822 and 823 may correspond to, for example, the second slot 540. However, these are merely examples, and the icons may be omitted. The electronic device 101 may display information associated with the second SIM 541 (e.g., an own number, PLMN information, or supportable network communication types) in the tab 822 corresponding to the second SIM 541. However, the electronic device 101 may also display, based on the disabled state of the second SIM 541, only the text "Off" in the tab 822 corresponding to the second SIM 541. The electronic device 101 may display information associated with the eSIM 550 (e.g., an own number, PLMN information, or supportable network communication types) in the tab 823 corresponding to the first profile. The electronic device 101 may display, based on the enabled state of the eSIM 550, supportable network communication types to be visually distinguished from the tab 822 corresponding to a disabled SIM (e.g., the second SIM 541). The electronic device 101 may display supportable network types (e.g., 5G/4G/3G/2G) for an enabled SIM (e.g., the first SIM 531 and the eSIM 550), and may display, for a disabled SIM (e.g., the second SIM 541), an indicator (e.g., the text "Off") indicating the disabled state thereof, whereby a user can identify currently enabled/disabled SIMs. The screen 820a including SIM-related information may further include, depending on the implementation thereof, a tab 824 for adding a mobile plan, a call-related tab 825, a tab 826 related to text messages, a tab 827 related to mobile data, a tab 828 for confirming a SIM card for calls, a dual-SIM-always-on tab 829, a tab 830 for locking mobile plan settings, and a tab 831 for deleting all mobile plans, but is not limited thereto. A mobile plan may include a profile.

According to various embodiments, in operation 715, the electronic device 101 may provide notification of detection of an event for using the second SIM 541 and disconnection of network communication corresponding to the eSIM 550. For example, the electronic device 101 may detect an event for temporarily using the second SIM 541 (e.g., the reception of a SIM in the second slot 540). The electronic device 101, for example, may display a pop-up window, illustrated in FIG. 8C, indicating that the network communication corresponding to the eSIM 550 (e.g., a % s network) may be temporarily disconnected. The pop-up window may include a rejection icon 808 and an approval icon 809.

In operation 717, the electronic device 101 may determine whether disconnection of the network communication corresponding to the eSIM 550 has been approved. For example, when the approval icon 809 of the pop-up window is selected, the electronic device 101 may determine that disconnection of the network communication corresponding to the eSIM 550 has been approved. When it is determined that disconnection of the network communication corresponding to the eSIM 550 has not been approved (717-No) (e.g., when the rejection icon 808 is selected, or when the detection of selection of the approval icon 809 fails), the electronic device 101 may maintain connection of the eSIM 550 in operation 719. When it is determined that the disconnection of the network communication corresponding to the eSIM 550 has been approved (717—Yes), the electronic device 101 may control, in operation 721, the state of the switch 560 from the second state to a first state, thereby connecting at least one processor (e.g., the communication processor 510) to the second slot 540.

According to various embodiments, in operation 723, the electronic device 101 may display a first screen showing that the first SIM 531 and the second SIM 541 are enabled. For example, like the screen 820b illustrated in FIG. 8D, the electronic device 101 may display information associated with the second SIM 541 (e.g., an own number, PLMN-related information, and supportable network communication types) in a tab 822 corresponding to the second SIM 541. The electronic device 101 may also display, based on the enabled state of the second SIM 541, supportable network communication types to be visually distinguished from a tab 823 corresponding to a disabled SIM (e.g., the eSIM 550). The electronic device 101 may display supportable network types (e.g., 5G/4G/3G/2G) for an enabled SIM (e.g., the first SIM 531 and the second SIM 541), and may display, for a disabled SIM (e.g., the eSIM 550), an indicator (e.g., the text "Off") indicating the disabled state thereof, whereby a user can identify currently enabled/disabled SIMs.

Although not illustrated, as described with reference to FIG. 7A, the electronic device 101 may change the screen thereof from a screen showing that the eSIM 550 is disabled (e.g., the screen 820b in FIG. 8D) to a screen showing that the eSIM 550 is enabled (e.g., the screen 820a in FIG. 8B). In addition, when an event for using the eSIM 550 is detected, the electronic device 101 may display a pop-up window, indicating that the network communication corresponding to the second SIM 541 will be temporarily disconnected, similar to that in FIG. 8C, and, when an approval command is identified, may enable the eSIM 550 and may disable the second SIM 541.

Figure 9:
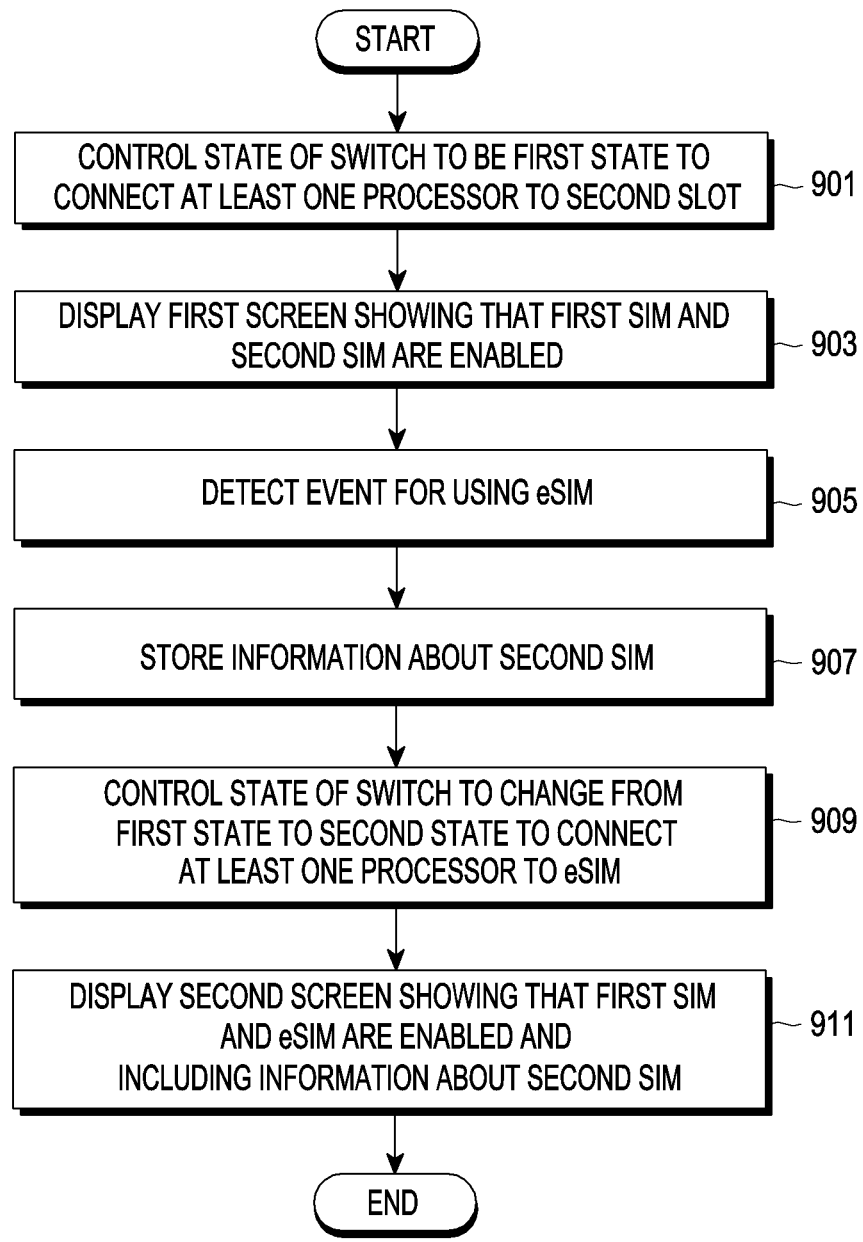
FIG. 9 is a flowchart illustrating an example method of operating an electronic device according to various embodiments.

FIG. 9 is a flowchart illustrating an example method of operating an electronic device according to various embodiments. The above-described operations, among the operations in FIG. 9, will be briefly described. The operations in FIG. 9 will be described, for convenience, with reference to: the electronic device 101 in FIG. 1A or 5A; and FIG. 10.

According to various embodiments, in operation 901, the electronic device 101 (e.g., at least one of the processor 120 or the communication processor 510) may control the state of the switch 560 to be a first state, thereby connecting at least one processor (e.g., the communication processor 510) to the second slot 540. In the state in which the second SIM 541 is connected, the electronic device 101 may display, in operation 903, a first screen showing that the first SIM 531 and the second SIM 541 are enabled (e.g., the screen in FIG. 8D).

In operation 905, the electronic device 101 may detect an event for using the eSIM 550.

According to various embodiments, in operation 907, the electronic device 101 may store information about the second SIM 541. For example, the electronic device 101 may store at least some among an ICCID, an IMSI, HPLMN-related information, and an MSISDN, corresponding to the second SIM 541. It is illustrated that the electronic device 101 stores information about the second SIM 541 when detecting an event for using the eSIM 550, but this is only an example. The electronic device 101 may store (or update) the information about the second SIM 541 at various time points, such as the time point of initializing the second SIM 541 (e.g., the time point of SIM initialization by booting of the electronic device 101), the time point of initially enabling the second SIM 541, or the time point of re-enabling the second SIM 541, but the time points are not limited thereto. When the information about the second SIM 541 is pre-stored before the event for using the eSIM 550 is detected, operation 907 may be omitted or may be replaced with an operation of reading the information about the second SIM 541.

In operation 909, the electronic device 101 may control the state of the switch 560 to change from the first state to a second state, thereby connecting at least one processor (e.g., the communication processor 510) to the eSIM 550.

Figure 10:
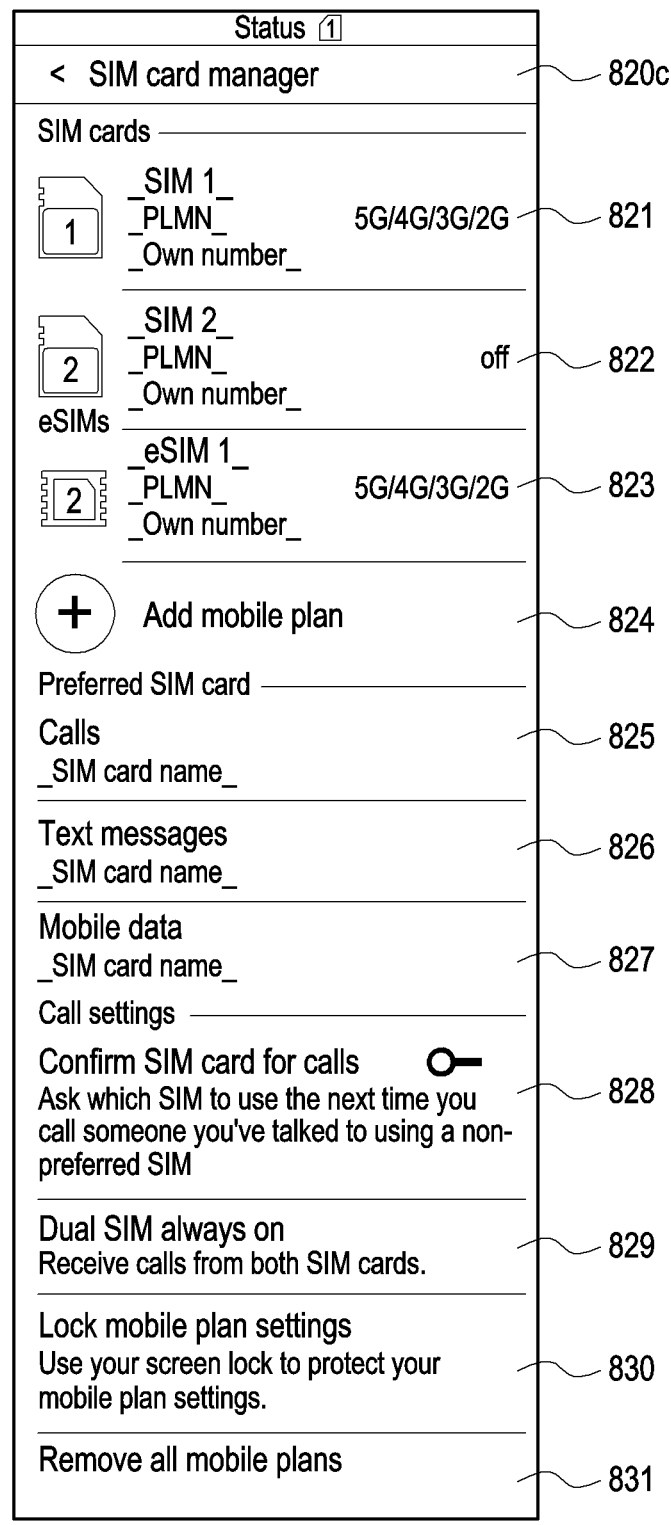
FIG. 10 is a diagram illustrating an example screen displayed in an electronic device according to various embodiments.

According to various embodiments, in operation 911, the electronic device 101 may display a second screen showing that the first SIM 531 and the eSIM 550 are enabled and including the information about the second SIM 541 (e.g., PLMN information, or an own number). For example, the electronic device 101 may display the screen 820c illustrated in FIG. 10. Referring to FIG. 10, the electronic device 101 may display the text "Off", which is an indicator indicating a disabled state, in the tab 822 corresponding to the second SIM 541. The electronic device 101 may further display information about a PLMN corresponding to the second SIM 541 in the tab 822 corresponding to the second SIM 541. The electronic device 101 may display the information about the second SIM 541, stored in operation 905 (or before the event for using the eSIM 550 is detected). Therefore, even when a specific SIM (e.g., the second SIM 541) is temporarily disabled, a user can identify information about the corresponding SIM.

According to various embodiments, although not illustrated, the electronic device 101 may also store information about the eSIM 550. When the state of the switch 560 is controlled to be the first state, the second SIM 541 may be controlled to be enabled and the eSIM 550 may be controlled to be disabled. The electronic device 101 may display a screen showing that the first SIM 531 and the second SIM 541 are enabled and that the eSIM 550 is disabled, together with the information about the eSIM 550.

Figure 11A:
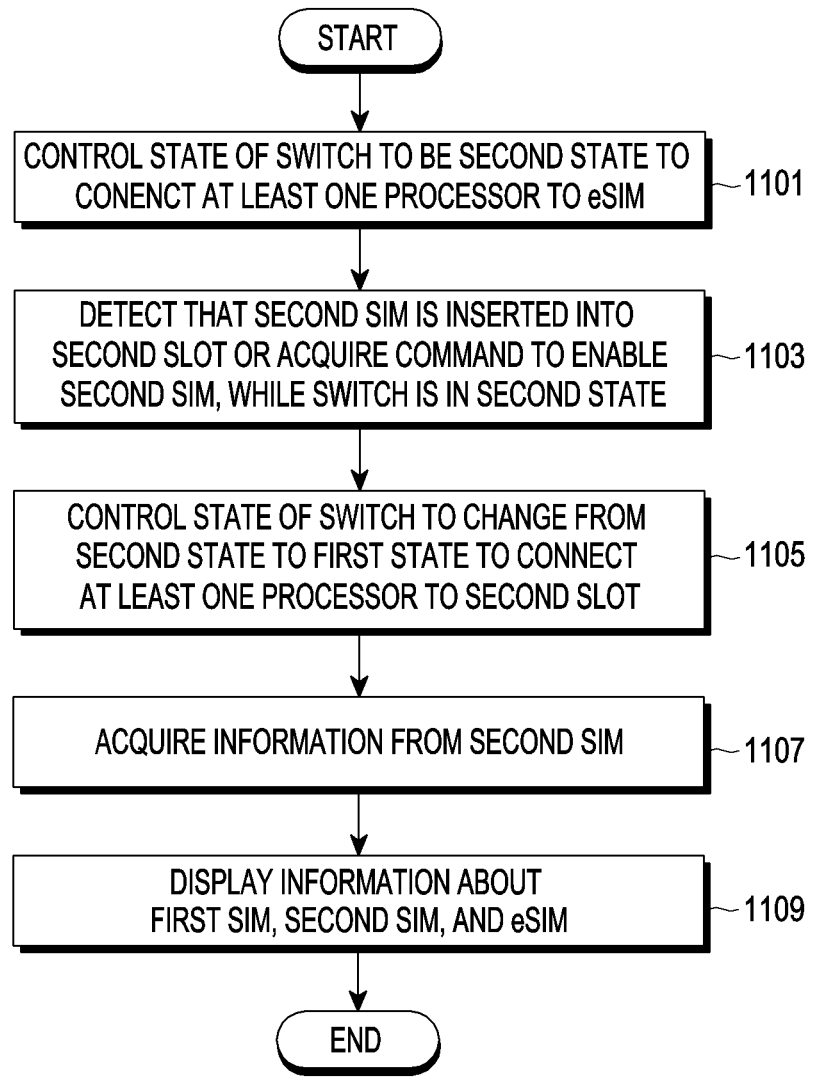
FIG. 11A is a flowchart illustrating an example method of operating an electronic device according to various embodiments.

FIG. 11A is a flowchart illustrating an example method of an electronic device according to various embodiments. The above-described operations, among the operations in FIG. 11A, will be briefly described. The operations in FIG. 11A will be described, for convenience, with reference to: the electronic device 101 in FIG. 1A or 5A; and FIGS. 11B, 11C, 11D, 11D, 11E and 11F.

According to various embodiments, in operation 1101, the electronic device 101 (e.g., at least one of the processor 120 or the communication processor 510) may control the state of the switch 560 to be a second state, thereby connecting at least one processor (e.g., the communication processor 510) to the eSIM 550. The electronic device 101, for example, may display the screen, illustrated in FIG. 8B, indicating that the first SIM 531 and the eSIM 550 are enabled and that the second SIM 541 is disabled.

Figure 11B:
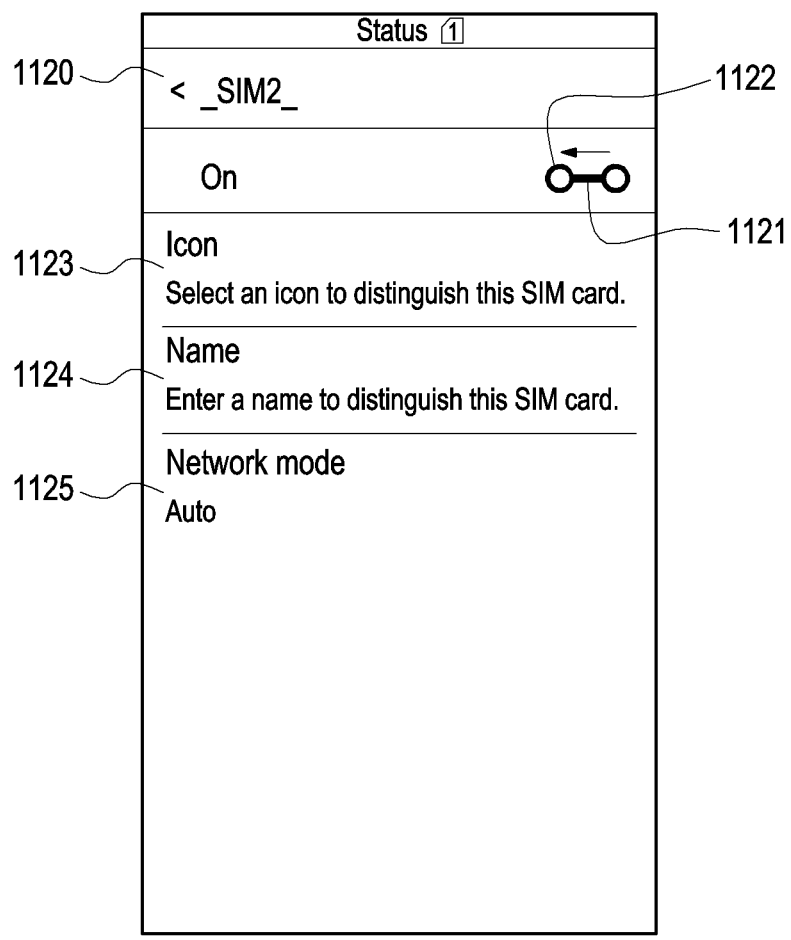
FIG. 11B is a diagram illustrating an example screen displayed in an electronic device according to various embodiments.

In operation 1103, while the switch 560 is in the second state, the electronic device 101 may detect that the second SIM 541 is inserted into the second slot 540, or acquire a command to enable the second SIM 541. For example, when the tab 822 corresponding to the second SIM 541 is selected on the screen illustrated in FIG. 8B, the electronic device 101 may display, as illustrated in FIG. 11B, a screen 1120 including information corresponding to the second SIM 541. The screen 1120 including the information corresponding to the second SIM 541 may include a bar 1121 for toggling an object 1122. When the object 1122 is located at a first position on the bar 1121, the second SIM 541 may be enabled, and text (e.g., "On") indicating that the second SIM 541 is enabled may be displayed. When the object 1122 is located at a second position on the bar 1121, the second SIM 541 may be disabled, and text (e.g., "Off") indicating that the second SIM 541 is disabled may be displayed. The electronic device 101 may change the location of the object 1122, based on drag input corresponding to the object 1122 (or touch input designating the first position or the second position), and may control, based on the location of the object 1122, whether the second SIM 541 is enabled (or the state of the switch 560). As illustrated in FIG. 11B, when input for moving the object 1122 from the second position of the bar 1121 to the first position thereof is identified, the electronic device 101 may determine that a command to enable the second SIM 541 has been acquired, and, as illustrated in FIG. 11B, may also change the text from "Off" to "On".

In operation 1105, the electronic device 101 may control the state of the switch 560 to change from the second state to a first state, thereby connecting at least one processor to the second slot 540. A tab 1123 for controlling an icon corresponding to a SIM card, a name-related tab 1124, or a network mode tab 1125 may be included in the screen 1120, but is merely an illustrative example.

Figure 11C:
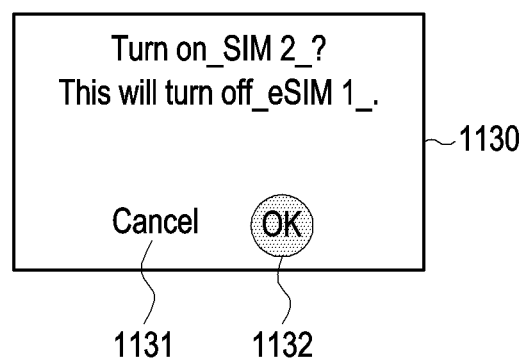
FIG. 11C is a diagram illustrating an example screen displayed in an electronic device according to various embodiments.

According to various embodiments, as illustrated in FIG. 11C, the electronic device 101 may also display a pop-up window 1130 indicating that the network communication corresponding to the eSIM 550 will be disconnected. The pop-up window 1130 may include a rejection icon 1131 and an approval icon 1132. When the approval icon 1132 is selected, the electronic device 101 may change the state of the switch 560 from the second state to the first state to enable the second SIM 541. If the rejection icon 1131 is selected, the electronic device 101 may maintain the enabled state of the eSIM 550.

According to various embodiments, in operation 1107, the electronic device 101 may acquire information from the second SIM 541. The electronic device 101 may perform, based on the acquired information, an operation corresponding to the second SIM 541 (e.g., an authentication procedure for network communication corresponding to the second SIM 541 and a network communication connection).

Figure 11D:
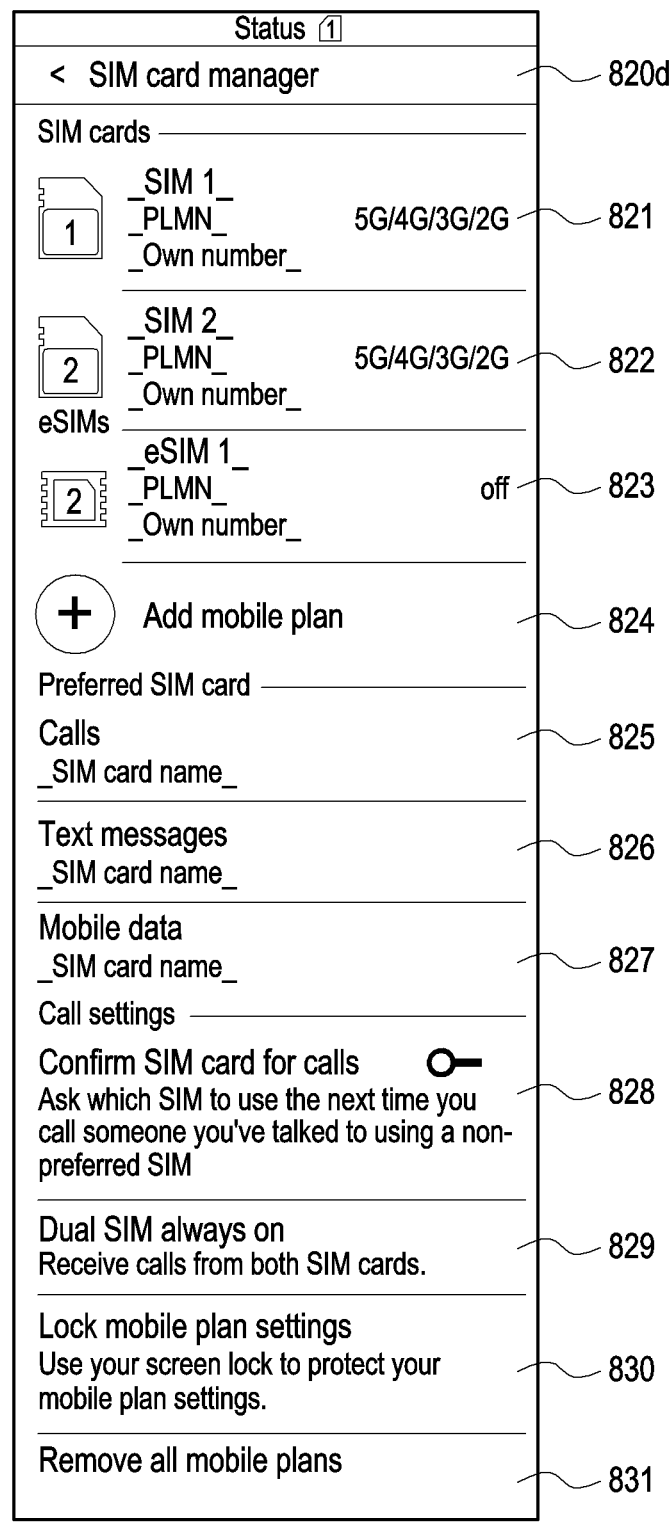
FIG. 11D is a diagram illustrating an example screen displayed in an electronic device according to various embodiments.

In operation 1109, the electronic device 101 may display information about the first SIM 531, the second SIM 541, and the eSIM 550. For example, as illustrated in FIG. 11D, the electronic device 101 may display supportable network communication types (e.g., 5G/4G/3G/2G) for the tab 822 corresponding to the second SIM 541 on screen 820d, thereby indicating that the second SIM 541 is enabled. The electronic device 101 may display, for the tab 823 corresponding to a first profile, an indicator (e.g., the text "Off") indicating that the eSIM 550 is disabled. The electronic device 101 may also store information about the eSIM 550. For example, the electronic device 101 may store the information about the eSIM 550 after being connected to the eSIM 550 in operation 1101, but the time point of storage thereof is not limited. The electronic device 101 may display the stored information about the eSIM 550 (e.g., PLMN information) in the tab 823 corresponding to the first profile.

Figure 11E:
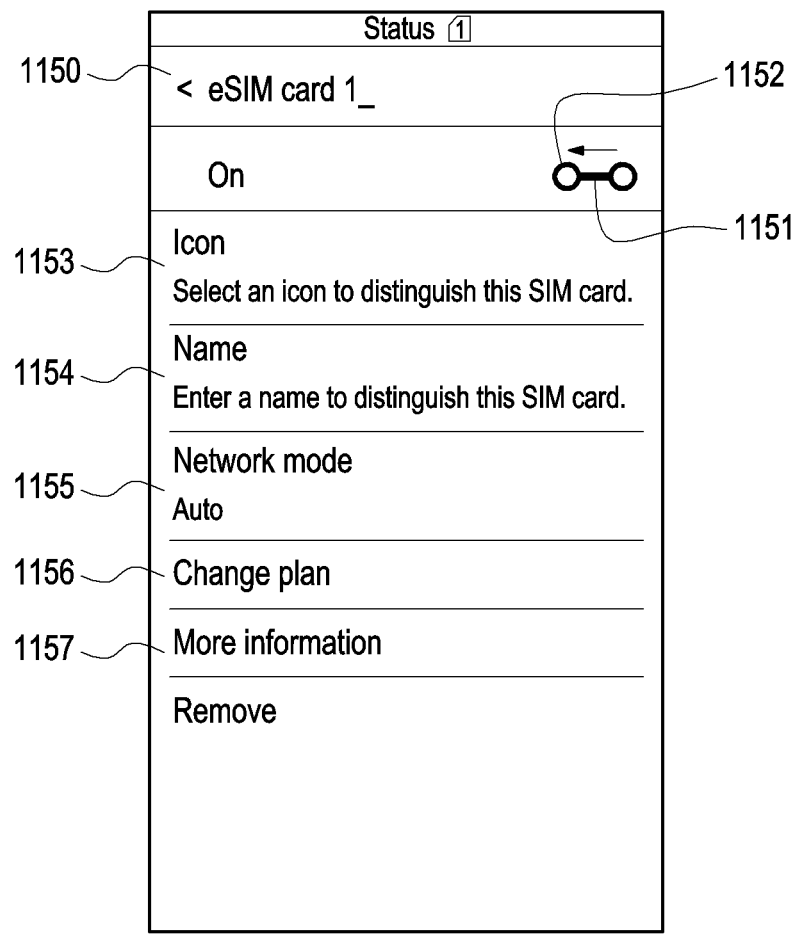
FIG. 11E is a diagram illustrating an example screen displayed in an electronic device according to various embodiments.

According to various embodiments, the electronic device 101 may also acquire a command to enable the eSIM 550. For example, in the state in which the screen 820d illustrated in FIG. 11D is displayed, the electronic device 101 may detect selection of the tab 823 corresponding to the first profile. When the tab 823 corresponding to the first profile is selected, the electronic device 101 may display, as illustrated in FIG. 11E, a screen 1150 including information corresponding to the eSIM 550. The screen 1150 including the information corresponding to the eSIM 550 may include a bar 1151 for toggling an object 1152. When the object 1152 is located at a first position on the bar 1151, the eSIM 550 may be enabled, and text (e.g., "On") indicating that the eSIM 550 is enabled may be displayed. When the object 1152 is located at a second position on the bar 1151, the eSIM 550 may be disabled, and text (e.g., "Off") indicating that the eSIM 550 is disabled may be displayed. The electronic device 101 may change the location of the object 1152, based on drag input corresponding to the object 1152, and may control, based on the location of the object 1152, whether the eSIM 550 is enabled (or the state of the switch 560). As illustrated in FIG. 11E, when input for moving the object 1152 from the second position of the bar 1151 to the first position thereof is identified, the electronic device 101 may determine that a command to enable the eSIM 550 has been acquired, and, as illustrated in FIG. 11E, may also change the text from "Off" to "On". The electronic device 101 may control the state of the switch 560 to change from the first state to a second state, thereby connecting at least one processor to the eSIM 550. The screen 1150 may include at least one among a tab 1153 for controlling an icon corresponding to a SIM card, a name-related tab 1154, a network mode tab 1155, a mobile plan change tab 1156, and an additional-information-related tab 1157.

Figure 11F:
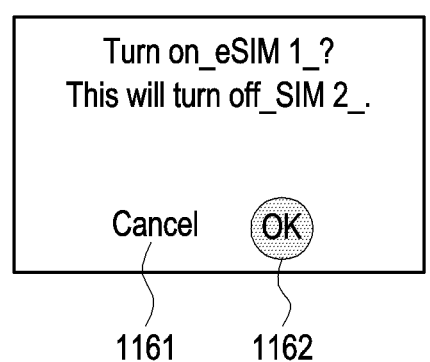
FIG. 11F is a diagram illustrating an example screen displayed in an electronic device according to various embodiments.

According to various embodiments, as illustrated in FIG. 11F, the electronic device 101 may also display a pop-up window 1160 indicating that the network communication corresponding to the second SIM 541 will be disconnected. The pop-up window 1160 may include a rejection icon 1161 and an approval icon 1162. When the approval icon 1162 is selected, the electronic device 101 may change the state of the switch 560 from the first state to the second state to enable the second SIM 541. If the rejection icon 1161 is selected, the electronic device 101 may maintain the enabled state of the second SIM 541.

Figure 12:
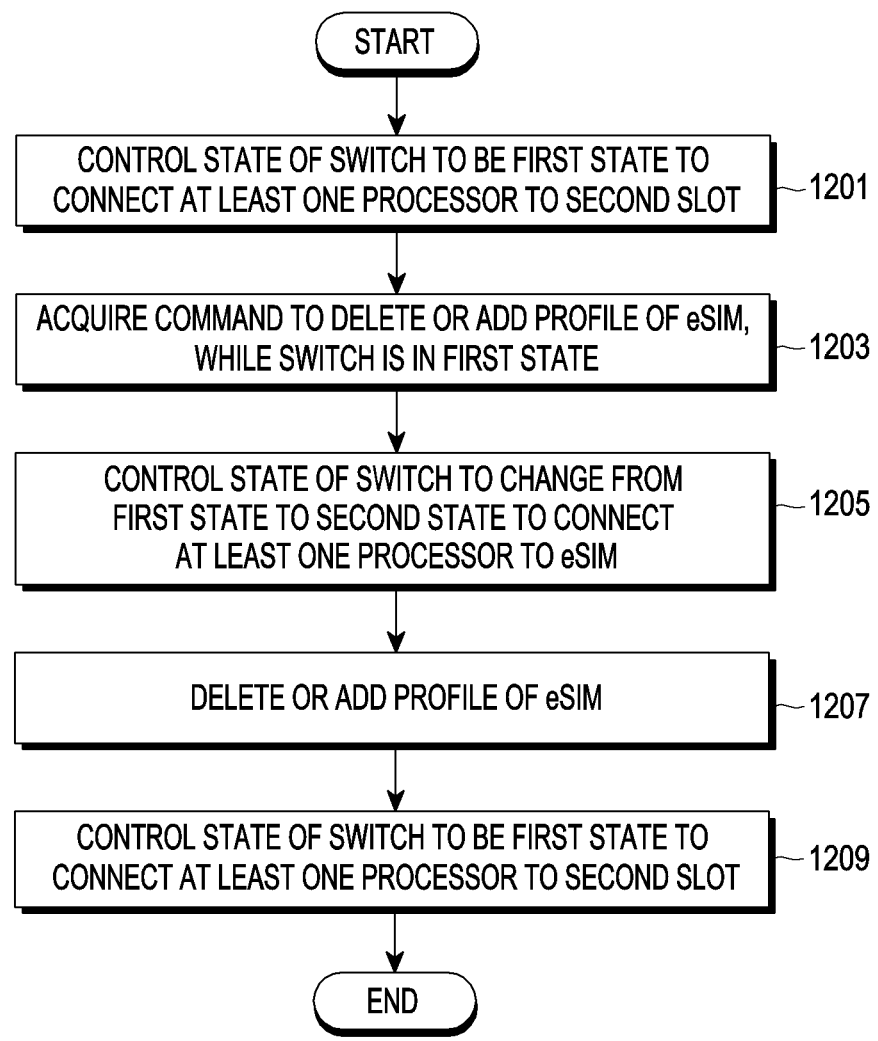
FIG. 12 is a flowchart illustrating an example method of operating an electronic device according to various embodiments.

FIG. 12 is a flowchart illustrating an example method of operating an electronic device according to various embodiments. The above-described operations, among the operations in FIG. 12, will be briefly described. The operations in FIG. 12 will be described, for convenience, with reference to: the electronic device 101 in FIG. 1A or 5A; and FIGS. 13A, 13B, 13C, 13D and 13E.

According to various embodiments, in operation 1201, the electronic device 101 (e.g., at least one of the processor 120 or the communication processor 510) may control the state of the switch 560 to be a first state, thereby connecting at least one processor (e.g., the communication processor 510) to the second slot 540.

In operation 1203, while the switch 560 is in a first state, the electronic device 101 may acquire a command to delete or add a profile of the eSIM 550. For example, the electronic device 101 may detect selection of a tab 823 corresponding to a first profile while a screen (e.g., the screen in FIG. 8D), indicating that the second SIM 541 is enabled but the eSIM is disabled, is displayed. When the tab 823 corresponding to a first profile is selected, the electronic device 101 may display the screen 1310, illustrated in FIG. 13A, including information corresponding to the eSIM 550. The screen 1310 including the information corresponding to the eSIM 550 may include a bar 1311 for toggling an object 1312. When the object 1312 is located at a first position on the bar 1311, the eSIM 550 may be enabled, and text (e.g., "On") indicating that the eSIM 550 is enabled may be displayed. When the object 1312 is located at a second position on the bar 1311, the eSIM 550 may be disabled, and text (e.g., "Off") indicating that the eSIM 550 is disabled may be displayed. Since the eSIM 550 is currently disabled, the text "Off" may be displayed. The screen 1310 may include at least one among a tab 1313 for controlling an icon corresponding to a SIM card, a name-related tab 1314, a network mode tab 1315, a mobile plan change tab 1316, an additional-information-related tab 1317, or a mobile plan (e.g., profile) deletion tab 1318. When the mobile plan deletion tab 1318 is selected, the electronic device 101 may determine that a profile deletion command has been acquired.

Figure 13A:
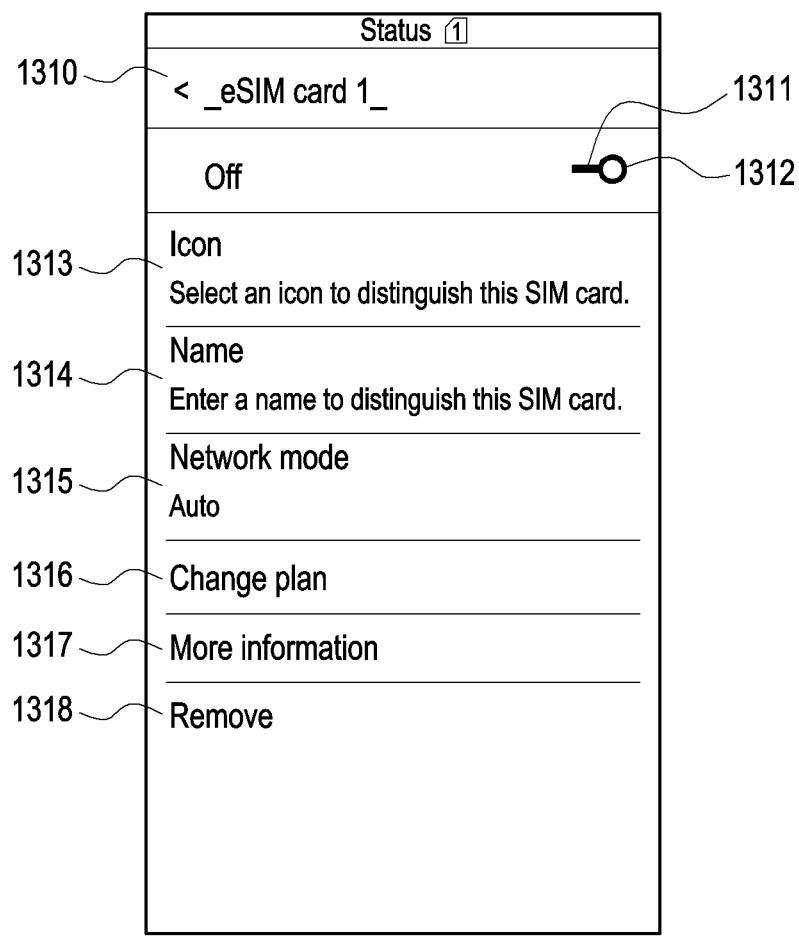
FIG. 13A is a diagram illustrating an example screen displayed in an electronic device according to various embodiments.
Figure 13B:
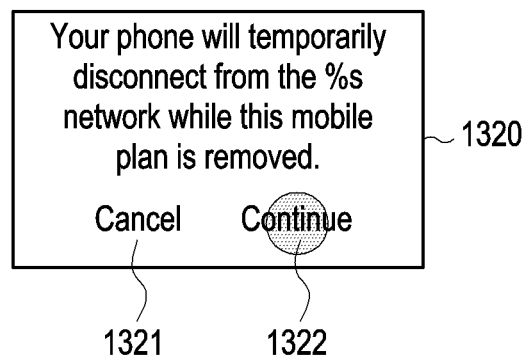
FIG. 13B is a diagram illustrating an example screen displayed in an electronic device according to various embodiments.

According to various embodiments, when the profile deletion command or the profile addition command is acquired, in operation 1205, the electronic device 101 may control the state of the switch 560 to change from the first state to a second state, thereby connecting at least one processor to the eSIM 550. According to various embodiments, the electronic device 101 may determine whether the corresponding profile can be deleted, and, when it is determined that the corresponding profile is can be deleted, may start a deletion procedure of controlling the state of the switch 560 to change from the first state to the second state. For example, when a profile policy rule 2 (PPR2) is configured in the corresponding profile, the corresponding profile may be impossible to delete. When it is determined that there are no restrictions on deletion, the electronic device 101 may also start the deletion procedure. As illustrated in FIG. 13B, the electronic device 101 may also display a pop-up window 1320 indicating that network communication corresponding to the second SIM 541 will be temporarily disconnected while a profile is deleted. When an approval icon 1322 is selected from among a rejection icon 1321 and the approval icon 1322 included in the pop-up window 1320, the electronic device 101 may start the deletion procedure.

According to various embodiments, in operation 1207, the electronic device 101 may delete or add a profile of the eSIM 550. For example, at least one of the processor 120 or the communication processor 510 may transfer a request for deletion or addition of a profile to the eSIM 550, and the eSIM 550 may delete or add the profile.

When the deletion or addition of the profile is completed (or when the request for the deletion or addition of the profile has been transferred to the eSIM 550), in operation 1209, the electronic device 101 may control the state of the switch 560 to be the first state, thereby connecting at least one processor to the second slot 540. The electronic device 101 may change the state of the second SIM 541 to an enabled state, and may recover the network communication corresponding to the second SIM 541.

Figure 8D:
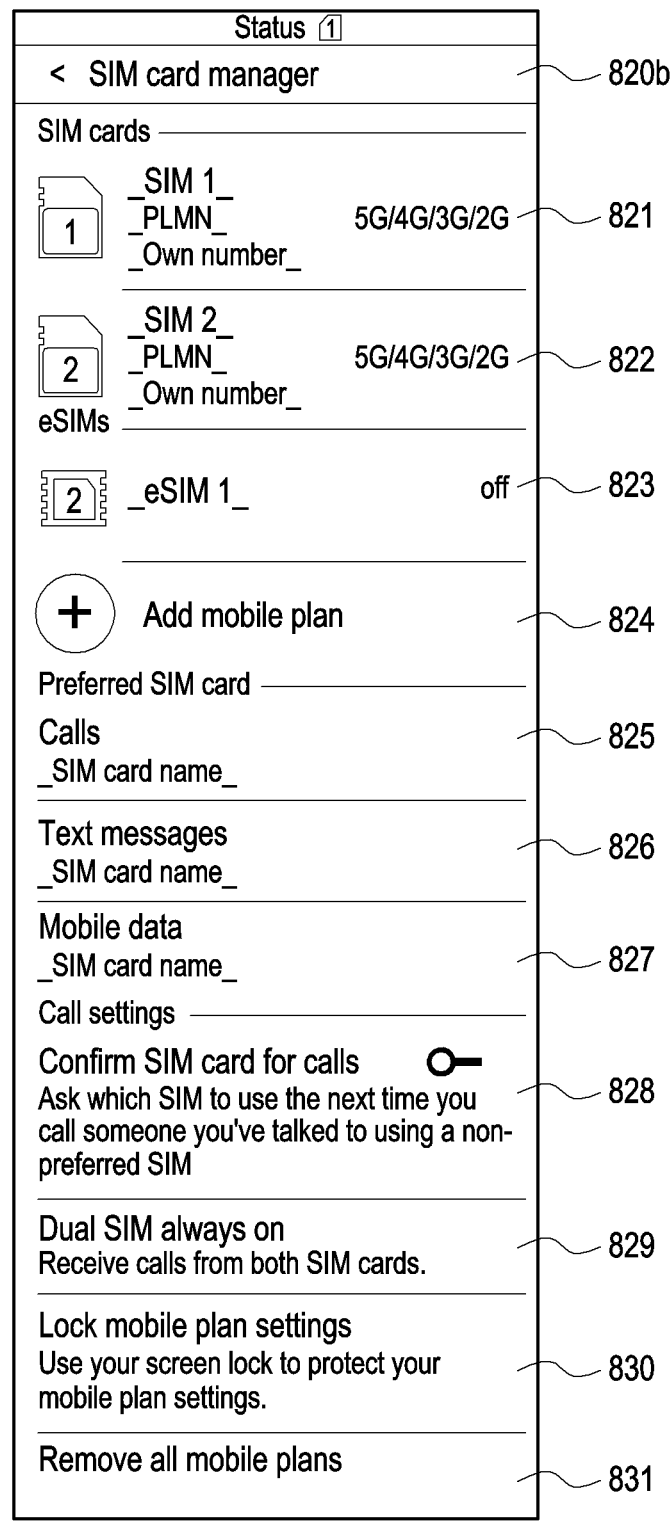
FIG. 8D is a diagram illustrating an example screen displayed in an electronic device according to various embodiments.
Figure 13C:
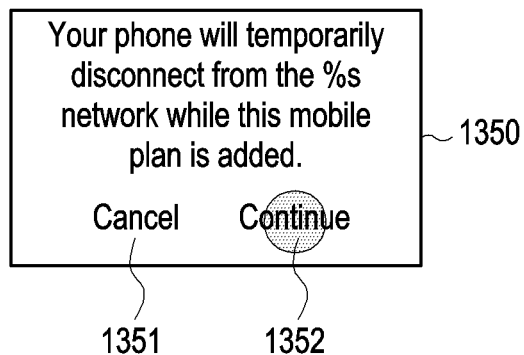
FIG. 13C is a diagram illustrating an example screen displayed in an electronic device according to various embodiments.

In various embodiments, when the tab 824 for adding a mobile plan (e.g., a profile) is selected on the screen illustrated in FIG. 8D, the electronic device 101 may determine that a profile addition command has been acquired. When the mobile plan addition command is acquired, the electronic device 101 may also control the switch 560 such that at least one processor is connected to the eSIM 550. The electronic device 101, for example, may determine whether addition of a profile is possible, and, when addition of a profile is possible, may start a procedure for addition. If PPR1 is configured in a profile configured in the existing eSIM 550, it may be impossible to disable the corresponding profile. In this case, it may be determined that addition of another profile is impossible. If PPR1 is not configured in the existing configured profile, the electronic device 101 may start the procedure for addition. As illustrated in FIG. 13C, the electronic device 101 may also display a pop-up window indicating that network communication corresponding to the second SIM 541 will be temporarily disconnected while a profile is added. When an approval icon 1352 is selected from among a rejection icon 1351 and the approval icon 1352 included in the pop-up window 1350, the electronic device 101 may start the addition procedure. When the addition is completed, the electronic device 101 may display, as illustrated in FIG. 13D, a screen 820e including a tab 1380 corresponding to an added second profile (e.g., eSIM 2). In FIG. 13D, the added second profile is expressed as "eSIM 2" in the tab 1380 corresponding to the added second profile according to an embodiment, but the added profile may be stored in the same eSIM (e.g., the eUICC 401 or the eSIM 550) together with the existing profile (e.g., the first profile (eSIM 1)). When the tab 1380 corresponding to the added second profile is selected, at least one object capable of controlling the corresponding profile to be enabled may be displayed. In another embodiment, the electronic device 101 may enable the eSIM 550 after a profile is added. In this case, a screen showing that the added profile of the eSIM 550 is enabled may be displayed.

Figure 13E:
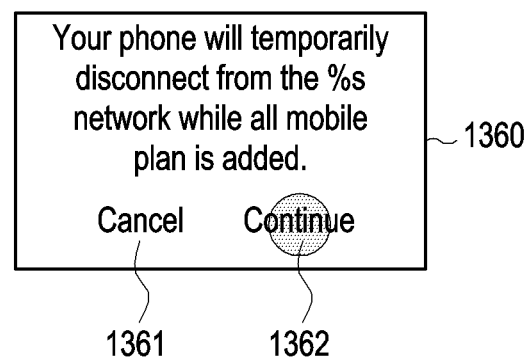
FIG. 13E is a diagram illustrating an example screen displayed in an electronic device according to various embodiments.

In various embodiments, when the tab 831 for deleting all mobile plans (e.g., profiles) is selected on the screen illustrated in FIG. 8D, the electronic device 101 may determine that a command to delete all profiles has been acquired. When a command to delete all profiles is acquired, the electronic device 101 may control, in operation 1205, the state of the switch 560 to change from the first state to the second state, thereby connecting at least one processor to the eSIM 550. According to various embodiments, the electronic device 101 may determine whether at least some of all profiles can be deleted, and, when it is determined that the at least some of all profiles can be deleted, may start a deletion procedure of controlling the state of the switch 560 to change from the first state to the second state. As illustrated in FIG. 13E, the electronic device 101 may display a pop-up window 1360 indicating that the network communication corresponding to the second SIM 541 will be temporarily disconnected while all profiles are deleted. When an approval icon 1362 is selected from among a rejection icon 1361 and the approval icon 1362 included in the pop-up window 1360, the electronic device 101 may start the deletion procedure.

Figure 14A:
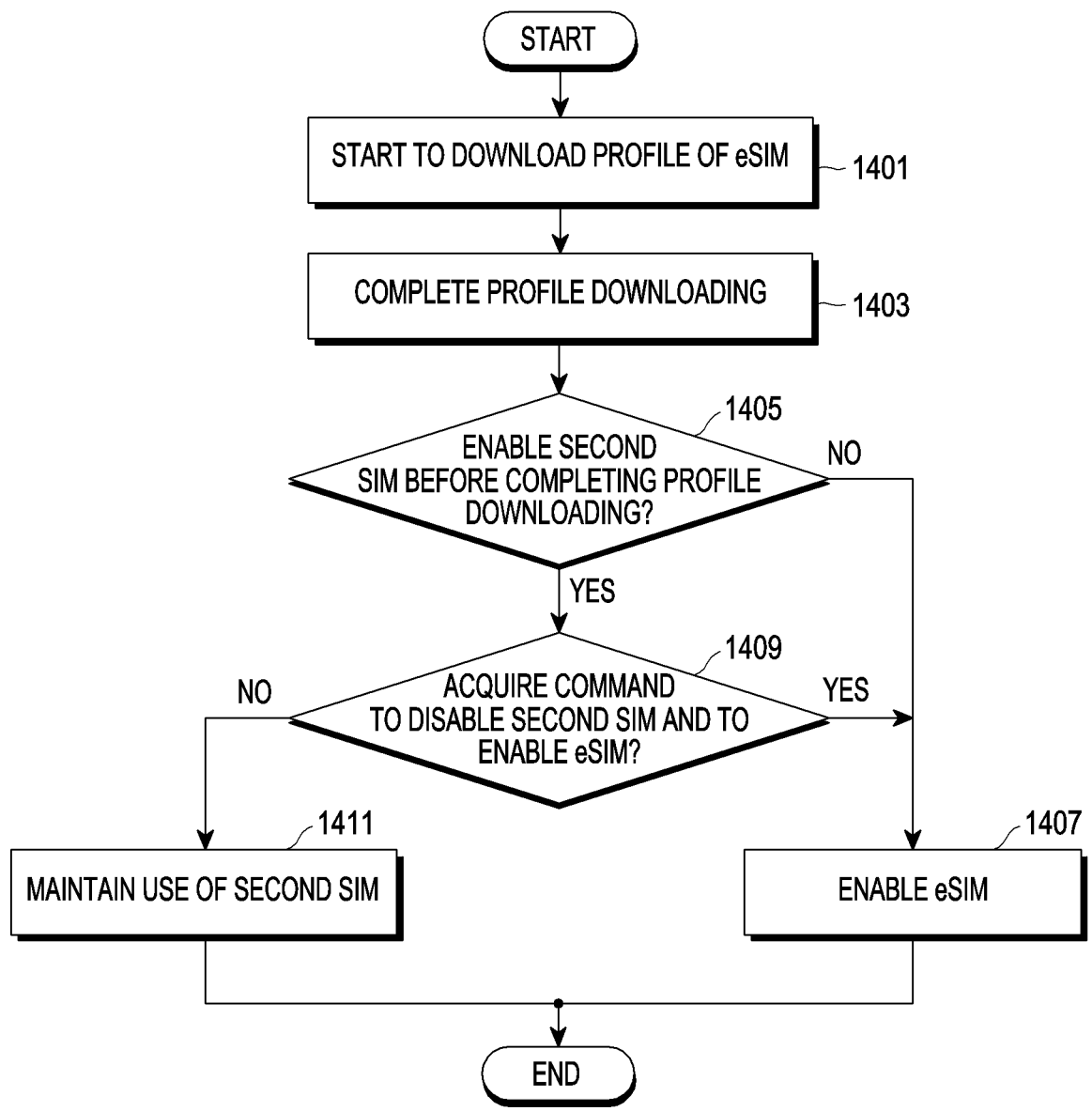
FIG. 14A is a flowchart illustrating an example method of operating an electronic device according to various embodiments.
Figure 14B:
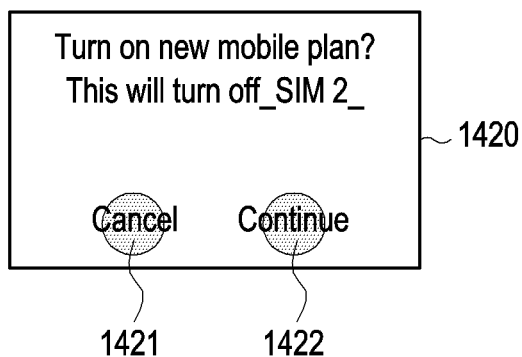
FIG. 14B is a diagram illustrating an example screen displayed in an electronic device according to various embodiments.

FIG. 14A is a flowchart illustrating an example method of operating an electronic device according to various embodiments. The above-described operations, among the operations in FIG. 14A, will be briefly described. The operations in FIG. 14A will be described, for convenience, with reference to: the electronic device 101 in FIG. 1A or 5A; and FIG. 14B.

According to various embodiments, in operation 1401, the electronic device 101 (e.g., at least one of the processor 120 or the communication processor 510) may start to download a profile from the eSIM 550.

In operation 1403, the electronic device 101 may complete profile downloading.

In operation 1405, the electronic device 101 may determine whether the second SIM 541 is enabled before the profile downloading is completed. For example, before the profile downloading, the second SIM 541 may be enabled, and the electronic device 101 may determine whether the second SIM 541 has been enabled.

When it is determined that the second SIM 541 has not been enabled (1405-No), according to various embodiments, in operation 1407, the electronic device 101 may enable the eSIM 550, and may perform network communication using the downloaded profile. In various embodiments, the electronic device 101 may output an inquiry about whether to enable the eSIM 550, and may enable the eSIM 550, based on additional user input. When it is determined that the second SIM 541 is enabled (1405—Yes), the electronic device 101 may determine, in operation 1409, whether a command to disable the second SIM 541 and enable the eSIM 550 is acquired. For example, the electronic device 101 may display a pop-up window 1420, illustrated in FIG. 14B, indicating that the second SIM 541 will be disabled and inquiring about whether to enable the downloaded profile. When the command to disable the second SIM 541 and enable the eSIM 550 is acquired (e.g., when an icon 1422 for approving (continuing) the pop-up window 1420 is selected) (1409—Yes), the electronic device 101 may enable the eSIM 550 in operation 1407. The electronic device 101 may change the state of the switch 560 to a second state. When the command to disable the second SIM 541 and enable the eSIM 550 is not acquired (e.g., when an icon 1421 for rejecting the pop-up window 1420 is selected) (1409-No), the electronic device 101 may maintain the use of the second SIM 541 in operation 1411. The electronic device 101 may maintain the state of the switch 560 to be a first state.

Figure 15A:
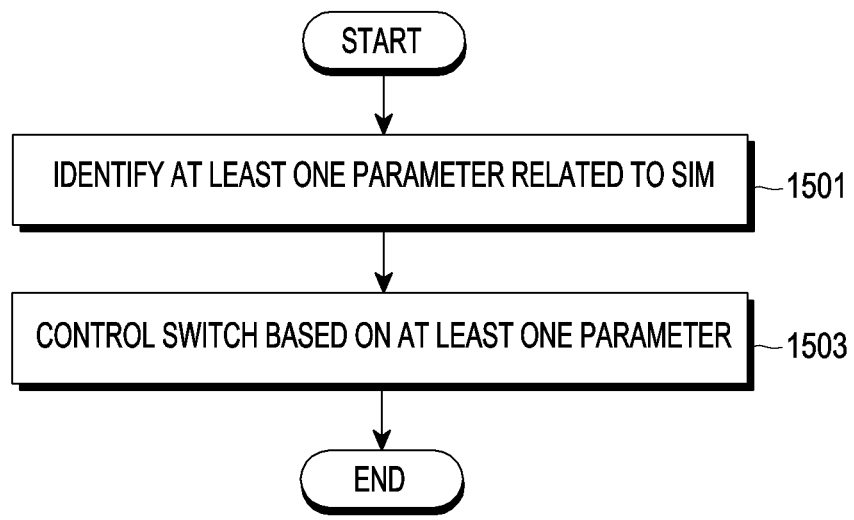
FIG. 15A is a flowchart illustrating an example method of operating an electronic device according to various embodiments.

FIG. 15A is a flowchart illustrating an example method of operating an electronic device according to various embodiments. The above-described operations, among the operations in FIG. 15A, will be briefly described. The operations in FIG. 15A will be described, for convenience, with reference to: the electronic device 101 in FIG. 1A or 5A; and FIGS. 15B, 15C and 15D.

According to various embodiments, in operation 1501, the electronic device 101 (e.g., at least one of the processor 120 or the communication processor 510) may identify at least one parameter related to a SIM. According to various embodiments, the electronic device 101 may identify at least one of a parameter stored in the memory 130 or a parameter received from a network. For example, the memory 130 may store at least one of a first parameter (e.g., HAS_EUICC) indicating whether the eSIM 550 is included in the electronic device 101 or a second parameter (e.g., UICC_SLOT) indicating the number of usable slots. The number of usable slots, for example, may indicate the number of slots for rSIMs used at the request of a mobile network operator, and/or the number of slots capable of receiving rSIMs. For example, the first parameter to a third parameter may be determined at the time of manufacture thereof, and may be stored in a consumer software customization (CSC) file. In various embodiments, the first parameter and/or the second parameter may be also be received from a network and may then be updated. For example, when information about whether a mobile network operator supports an eSIM is changed, the electronic device 101 may receive a changed third parameter (e.g., SUPPORT_EUICC) from a network, and may store the same in the memory 130. For example, the electronic device 101 may identify the third parameter included in the consumer software customization (CSC) file, but the method by which the electronic device 101 determines whether the network supports an eSIM is not limited. At least one of operation 1501 or 1503, for example, may be performed while the electronic device 101 is booted, but the time point of performing the operation is not limited.

According to various embodiments, in operation 1503, the electronic device 101 may control the switch 560, based on the at least one parameter. In a first example, it may be determined that the first parameter is true, that there are two second parameters, and that the third parameter is true. In this case, the electronic device 101 may control the switch 560 such that one of the second slot 540 or the eSIM 550 is selectively connected to the communication processor 510. For example, as described above for operations 603 and 605 in FIG. 6A, the electronic device 101 may control, based on detection of an event for using the second SIM 541, the switch 560 such that the second slot 540 is connected to the communication processor 510. On the basis of detection of an event for using the eSIM 550, the electronic device 101 may control the switch 560 such that the eSIM 550 is connected to the communication processor 510. The electronic device 101, for example, may display the screen illustrated in FIG. 8B or 8D, and may control, based on user input, the switch 560 to enable one of the second SIM 541 or the eSIM 550. According to various embodiments, if the third parameter is true, the electronic device 101 may display a screen including all of a tab corresponding to the first SIM 531, a tab corresponding to the second SIM 541, and a tab corresponding to the eSIM 550. On the basis of an input on the screen, the electronic device 101 may determine a SIM which is to be enabled among the second SIM 541 and the eSIM 550. The electronic device 101 may control the switch 560 such that the SIM that is determined to be to be enabled is connected to at least one processor (e.g., the communication processor 510). In various embodiments, as illustrated in FIG. 10, the electronic device 101, for example, may store information about a disabled SIM, and may then display the information even in the disabled state thereof.

Figure 15B:
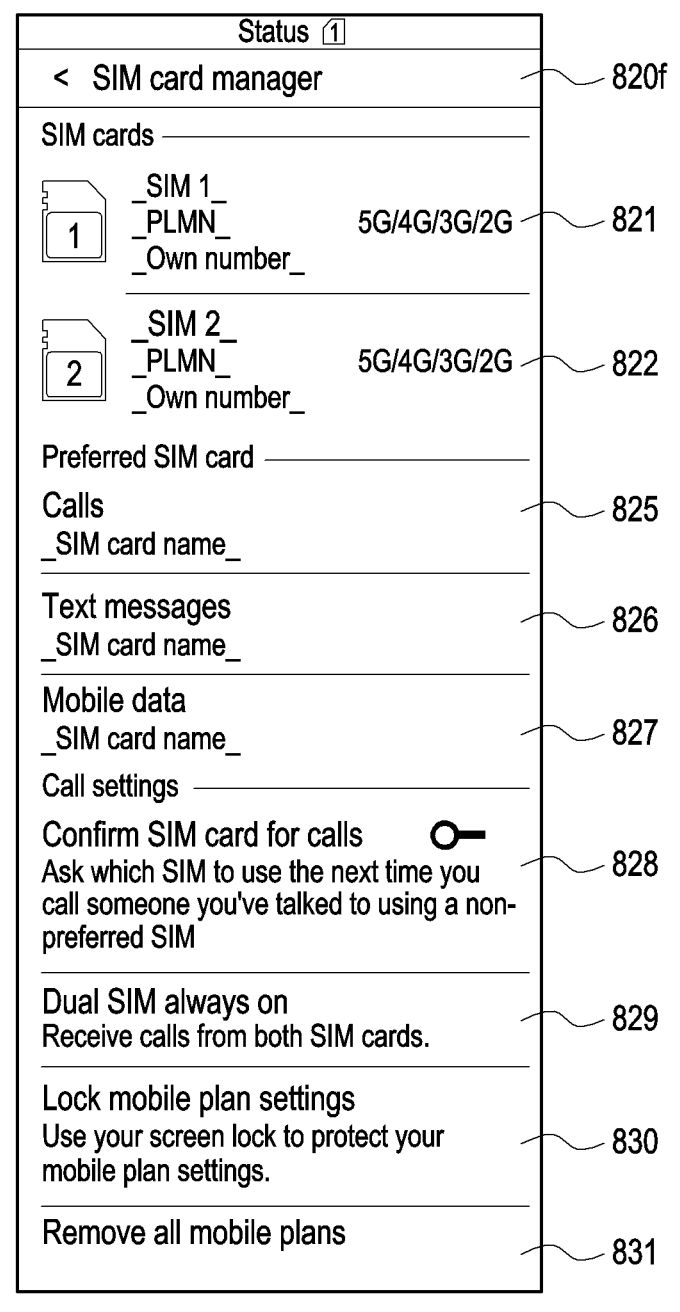

In second example, it may be determined that the first parameter is true, that there are two second parameters, and that the third parameter is false. For example, a specific network communication operator may not support an eSIM, in which case the third parameter may be false. In this case, the electronic device 101 may control the switch 560 such that the second slot 540 is connected to the communication processor 510. For example, the electronic device 101 may identify the third parameter while being booted, and may control the switch 560 such that the second slot 540 is connected to the communication processor 510. The electronic device 101 may display, for example, the screen 820*f* illustrated in FIG. 15B. As illustrated in FIG. 15B, information about a profile of an eSIM may not be displayed. In another implementation example, the information about an eSIM may be displayed, but may be implemented to be disabled such that a user cannot select the same.

Figure 15C:
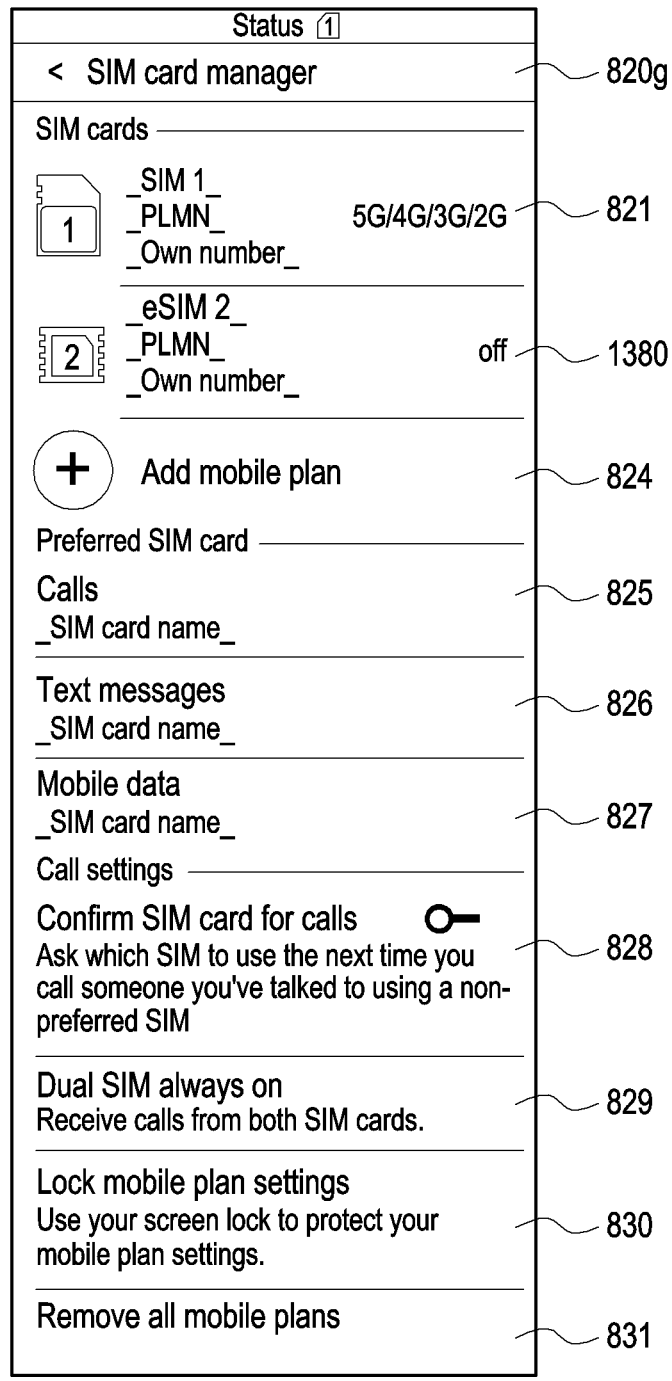
FIG. 15C is a diagram illustrating an example screen displayed in an electronic device according to various embodiments.

In a third example, it may be determined that the first parameter is true, that there is one second parameter, and that the third parameter is true. For example, a specific network communication operator may be an operator that is required to necessarily use an eSIM. The electronic device 101 may control the switch 560 such that the eSIM 550 is connected to the communication processor 510. The electronic device 101 may display, for example, the screen 820*g* illustrated in FIG. 15C. As illustrated in FIG. 15C, information about the first SIM 531 and an eSIM 1380 may be displayed.

Figure 15D:
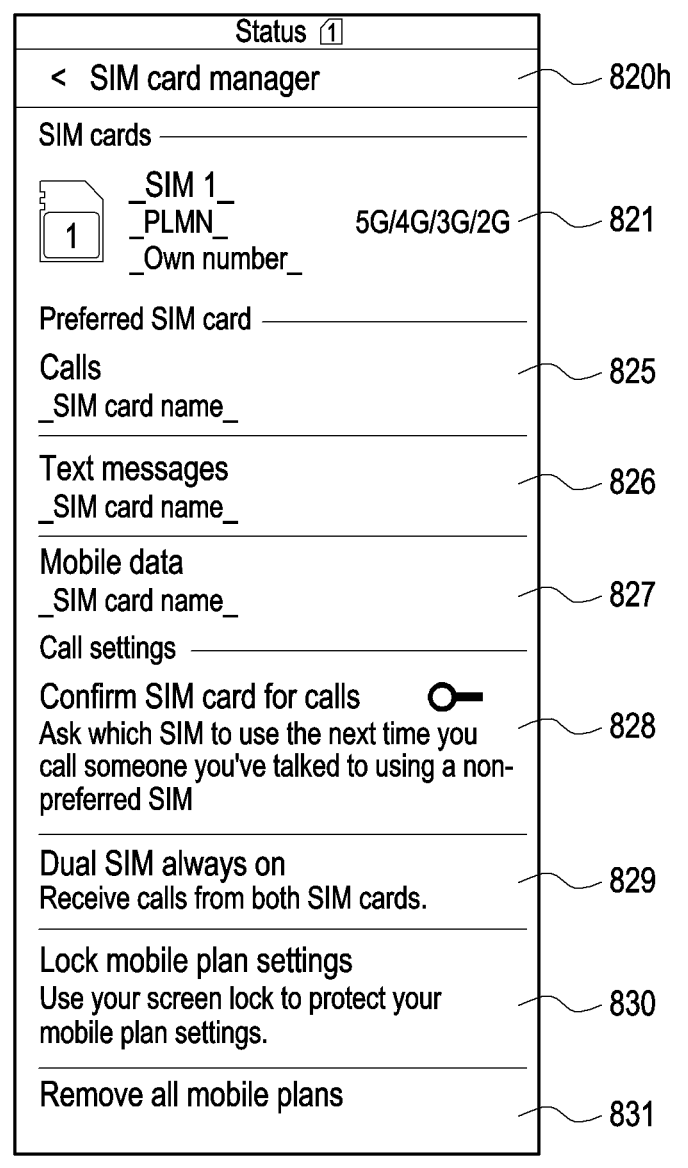

In a fourth example, it may be determined that the first parameter is true, that there is one second parameter, and that the third parameter is false. For example, a specific network communication operator may be an operator that is required to use only one rSIM. The electronic device 101 may control the switch 560 such that the second slot 540 or the eSIM 550 is connected to the communication processor 510, but may not request a connected entity for information, or may ignore received information. The electronic device 101 may also control the switch 560 such that the communication processor 510 is not connected to either of the second slot 540 or the eSIM 550. The electronic device 101 may display, for example, the screen 820*h* illustrated in FIG. 15D. As illustrated in FIG. 15D, information about the second SIM 541 and a profile of at least one eSIM may not be displayed. In another implementation example, the information about the second SIM 541 and the profile of at least one eSIM may be displayed, but may be implemented to be disabled such that a user cannot select the same.

In a fifth example, a user of the electronic device 101 may switch from a first network communication operator, supporting a third parameter which is true, to a second network communication operator, supporting a third parameter which is false, to use network communication. For example, the electronic device 101 may switch from the setting for the first network communication operator to the setting for the second network communication operator. The electronic device 101, for example, may configure a switched setting while being booted. In this case, the electronic device 101 may be in the state in which a profile is downloaded and stored using the eSIM 550. When a downloaded profile is present, the electronic device 101 may display a message indicating that switching of a network communication operator is impossible. Alternatively, the electronic device 101 may display a pop-up window inquiring about deletion of a profile of the eSIM 55. When a profile deletion command is acquired through the pop-up window, the electronic device 101 may perform the profile deletion command, and may then perform a procedure of switching the setting for a network communication operator. Laws related to eUICC operation are enacted in certain countries (e.g., Turkey), and thus switching from a network communication operator that supports an eSIM to a network communication operator that does not support an eSIM, or vice versa may not be possible. When it is determined, based on information about the specific country in which the electronic device 101 is currently located, that the electronic device 101 is located in the specific country, the electronic device 101 may display a message indicating that it is impossible to switch a network communication operator.

Figure 16:
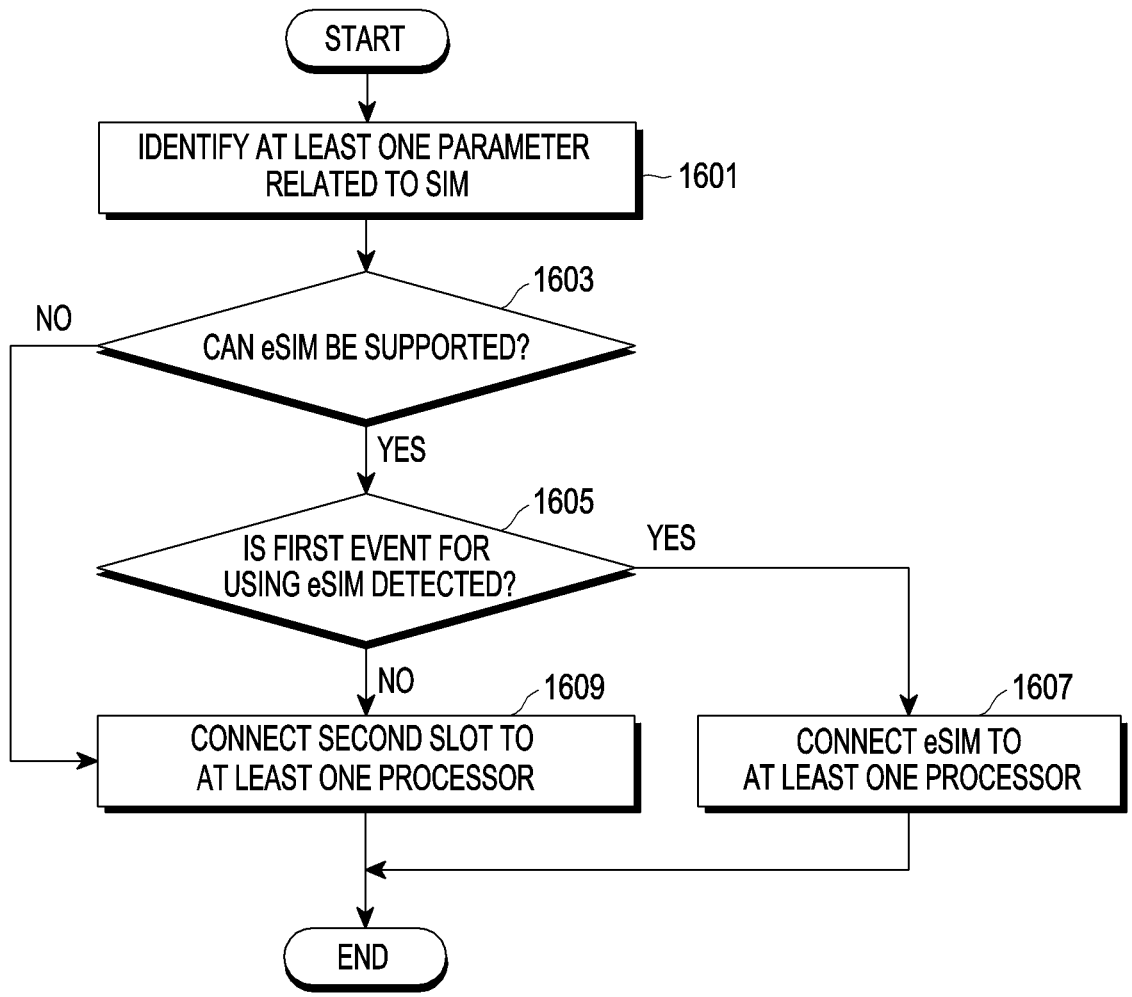
FIG. 16 is a flowchart illustrating an example method of operating an electronic device according to various embodiments.

FIG. 16 is a flowchart illustrating an example method of operating an electronic device according to various embodiments. The operations in FIG. 16 will be described, for convenience, with reference to the electronic device 101 in FIG. 1A or 5A. The above-described operations, among the operations in FIG. 16, will be briefly described.

According to various embodiments, in operation 1601, the electronic device 101 (e.g., at least one of the processor 120 or the communication processor 510) may identify at least one parameter related to a SIM.

In operation 1603, the electronic device 101 may determine, based on the at least one parameter, whether a network is capable of supporting an eSIM. For example, the electronic device 101 may determine whether a third parameter is true or false. When it is determined that the network is capable of supporting an eSIM (e.g., when it is determined that the third parameter is true) (1603—Yes), the electronic device 101 may determine, in operation 1605, whether a first event for using the eSIM 550 has been detected. For example, it is determined that the electronic device 101 is capable of supporting an eSIM and that the number of usable slots is two, the electronic device 101 may determine whether the first event for using the eSIM 550 has been detected. When it is determined that the first event for using the eSIM 550 has been detected (1605—Yes), the electronic device 101 may control, in operation 1607, the switch 560 to connect the eSIM 550 to at least one processor. When it is determined that the first event for using the eSIM 550 has not been detected (1605-No), the electronic device 101 may control, in operation 1609, the switch 560 to connect the second slot 540 to at least one processor. When it is determined that the net is not capable of supporting an eSIM (e.g., when it is determined that the third parameter is false) (1603-No), the electronic device 101 may control, in operation 1609, the switch 560 to connect the second slot 540 to at least one processor.

Figure 17:
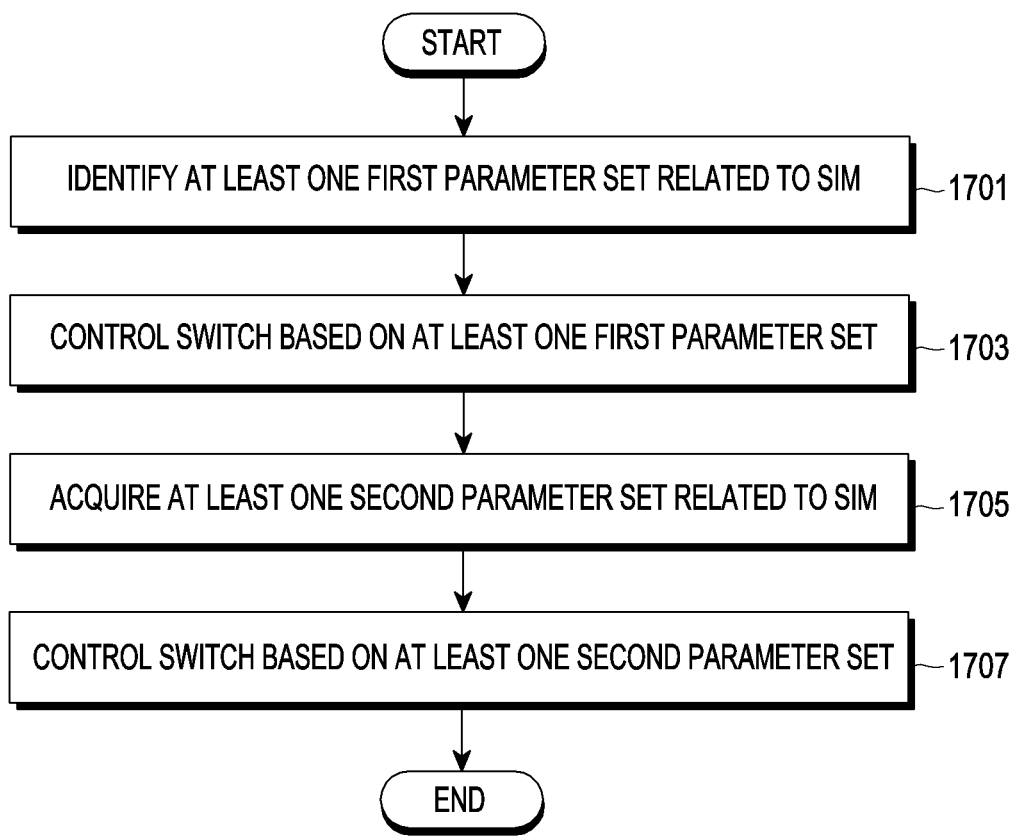
FIG. 17 is a flowchart illustrating an example method of operating an electronic device according to various embodiments.
Figure 18:
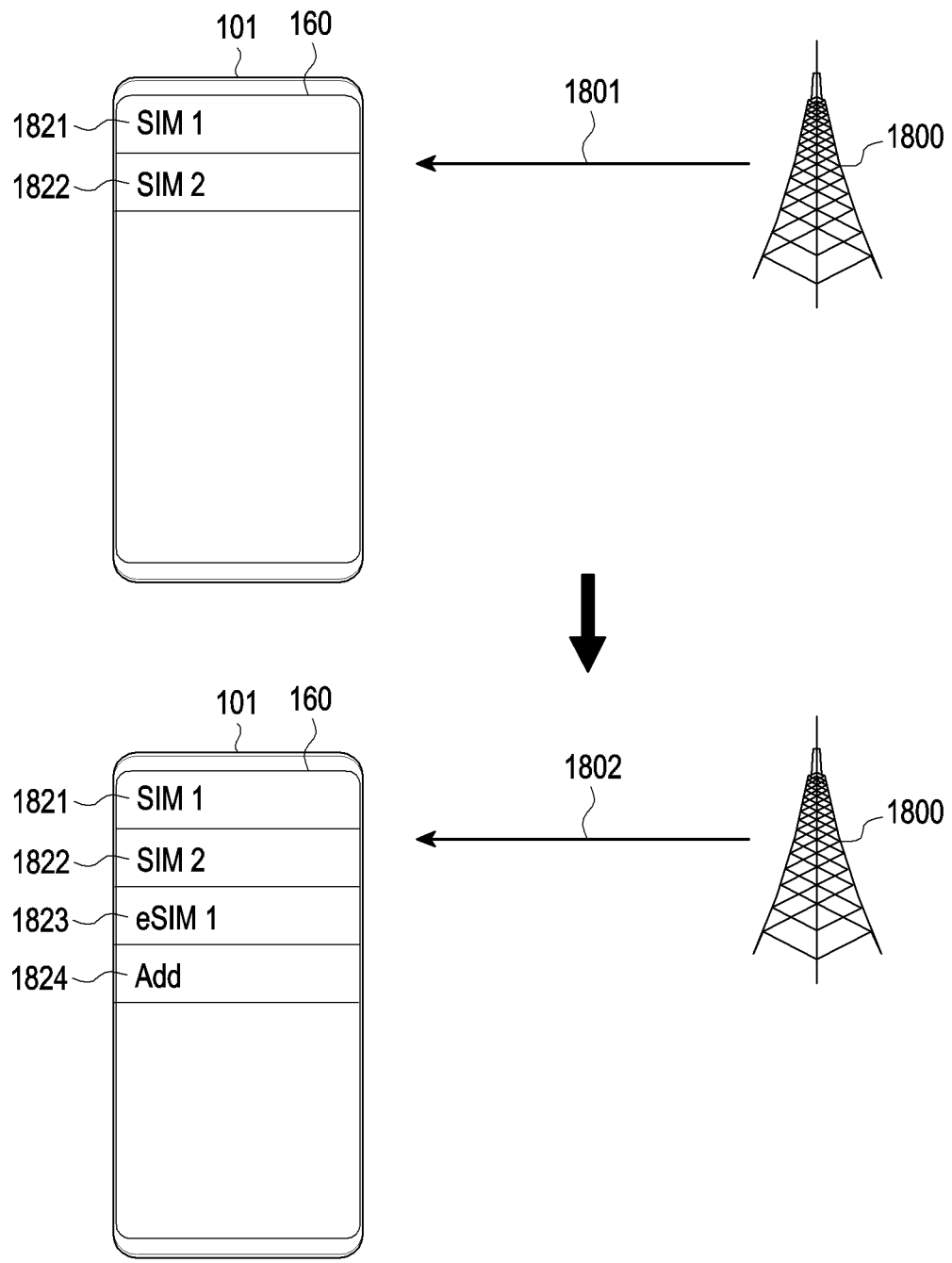
FIG. 18 is a diagram illustrating an example network policy change according to various embodiments.

FIG. 17 is a flowchart illustrating an example method of operating an electronic device according to various embodiments. The above-described operations, among the operations in FIG. 17, will be briefly described. The embodiment in FIG. 17 will be described, for convenience, with reference to: the electronic device 101 in FIG. 1A or 5A; and FIG. 18. FIG. 18 is a diagram illustrating an example network policy change according to various embodiments.

According to various embodiments, in operation 1701, the electronic device 101 (e.g., at least one of the processor 120 or the communication processor 510) may identify at least one first parameter set related to a SIM.

In operation 1703, the electronic device 101 may control the switch 560 based on the at least one first parameter set. For example, as illustrated in FIG. 18, the electronic device 101 may receive first information 1801 from a network 1800. The electronic device 101 may identify the first parameter set, based on at least one of the first information 1801 or information stored in the memory 130. For example, the electronic device 101 may receive the first information to update the information stored in the memory 130, and may identify the updated information. The first parameter set may indicate that the network 1800 does not support an eSIM. The electronic device 101 may control the switch 560 such that the second slot 540 is connected to the communication processor 510. The electronic device 101 may display information 1821 and 1822 about the first SIM 531 and the second SIM 541, which are rSIMs. The electronic device 101 may perform at least a part of identification of the first parameter set and switch control based thereon in a booting (or rebooting) process. For example, the electronic device 101 may output, based on received information, a message inquiring about whether to reboot, and may reboot when user input related to the message is acquired. At least a part of the identification of the first parameter set and the switch control based thereon may be performed while the electronic device 101 reboots.

According to various embodiments, in operation 1705, the electronic device 101 may acquire at least one second parameter set related to a SIM. For example, a network communication operator, which manages the network 1800, may change a policy to support an eSIM. The network 1800 may provide the electronic device 101 with second information 1802 indicating that the network 1800 supports an eSIM. The electronic device 101 may store the second information 1802. The electronic device 101 may reboot based on the reception of the second information.

In operation 1707, the electronic device 101 may control the switch 560, based on the at least one second parameter set. For example, the electronic device 101 may control, based on detection of an event for using the eSIM 550, the switch 560 such that the eSIM 550 is connected to the communication processor 510. The electronic device 101 may display information 1821, 1822, and 1823 about the first SIM 531, the second SIM 541, and the eSIM 550, and a tab 1824 for profile addition. For example, when the second parameter set corresponds to the above-described first example, the electronic device 101 may control, based on the detection of an event for using the eSIM 550, the switch 560 such that the eSIM 550 is connected to the communication processor 510. If the second parameter set corresponds to the third example, the electronic device 101 may control the switch 560 such that the eSIM 550 is connected to the communication processor 510.

According to various embodiments, at least one of operations 1705 and 1707 may also be performed while the electronic device 101 reboots after operation 1703.

Even when the network communication operator supports an eSIM and then changes a policy so as not to support the eSIM, the network 1800 may provide the electronic device 101 with information indicating that eSIM is not supported, thereby providing a dual SIM function corresponding to the changed policy without replacing the electronic device 101.

Hereinafter, various example embodiments of restricting an operation of an eSIM profile will be described with reference to FIGS. 19 to 35. According to various embodiments, as described above, the electronic device 101 may include at least one eUICC (e.g., the eSIM 201). In the description later, the eUICC 401 may correspond to an eSIM. According to various embodiments, "eSIM 1" and/or "eSIM 2" illustrated in the drawings (e.g., FIGS. 28A and 29D) may be a profile(s) included in one eUICC 401. For example, the same may be refer to a profile included in an eSIM.

As illustrated in FIG. 3, an eUICC (e.g., the eSIM 201) may be included in the electronic device 101, and may communicate with the processor 120. According to various embodiments, as illustrated in FIG. 4, the eUICC 401 may include at least one profile 410, 420, or 430. Each profile included in the eUICC 401 may be referred to as an eSIM profile. For example, in FIG. 4, one eUICC 401 may include a first profile 410 (a first eSIM profile), a second profile 420 (a second eSIM profile), or a third profile 430 (a third eSIM profile). According to various embodiments, when multiple profiles are installed in the one eUICC 401, only one profile (e.g., the first profile 410) may be enabled, and the remaining profiles (e.g., the second profile 420 and the third 430) may be disabled.

According to various embodiments, FIG. 5A illustrates that the electronic device 101 is connected to the first SIM 531 and the second SIM 541 through the first slot 530 and the second slot 540, but the electronic device 101 may not include the first slot 530 and/or the second slot 540, or only an eUICC (e.g., the eSIM 550) may be connected to the communication processor 510 while the first SIM 531 and the second SIM 541 are not connected thereto. In the various embodiments, the switch 560 in FIG. 5A may be omitted.

According to various embodiments, each profile stored in an eUICC (e.g., the eUICC 401 in FIG. 4) may include a profile policy rule (PPR) which restricts (or does not allow) an operation of the corresponding profile. The PPR may be configured such that a change in the state of the corresponding profile (e.g., a change from an enabled state to a disabled state, or a change from a disabled state to an enabled state) is not allowed, or such that the deletion of the corresponding profile is not allowed. The PPR may be defined by a profile owner that provides a profile, and may be defined by the SM-DP+ server 220. Information about the SM-DP+ server 220 may be included in metadata of a profile.

According to various embodiments, each profile stored in the eUICC 401 may not include the PPR, or may include one or more PPRs. When a specific profile is installed in the eUICC 401, the PPR may be included in the corresponding profile. According to various embodiments, the PPR may include PPR1 and PPR2. The embodiments in the disclosure are not limited to the PPRs described below, and various profile policy rules for operation and management of a profile may be added as the PPRs of the disclosure.

PPR1: "Disabling of this Profile is not allowed"

PPR2: "Deletion of this Profile is not allowed"

For example, when the PPR1 is configured for a specific profile, a change of the state of the corresponding profile from an enabled state to a disabled state may not be allowed, or may be restricted. Further, when the PPR2 is configured for a specific profile, deletion of the corresponding profile may not be allowed, or may be restricted. According to various embodiments, the PPR2 may not affect application of PPR1 to another profile (e.g., application to disabling another profile).

Figure 20:
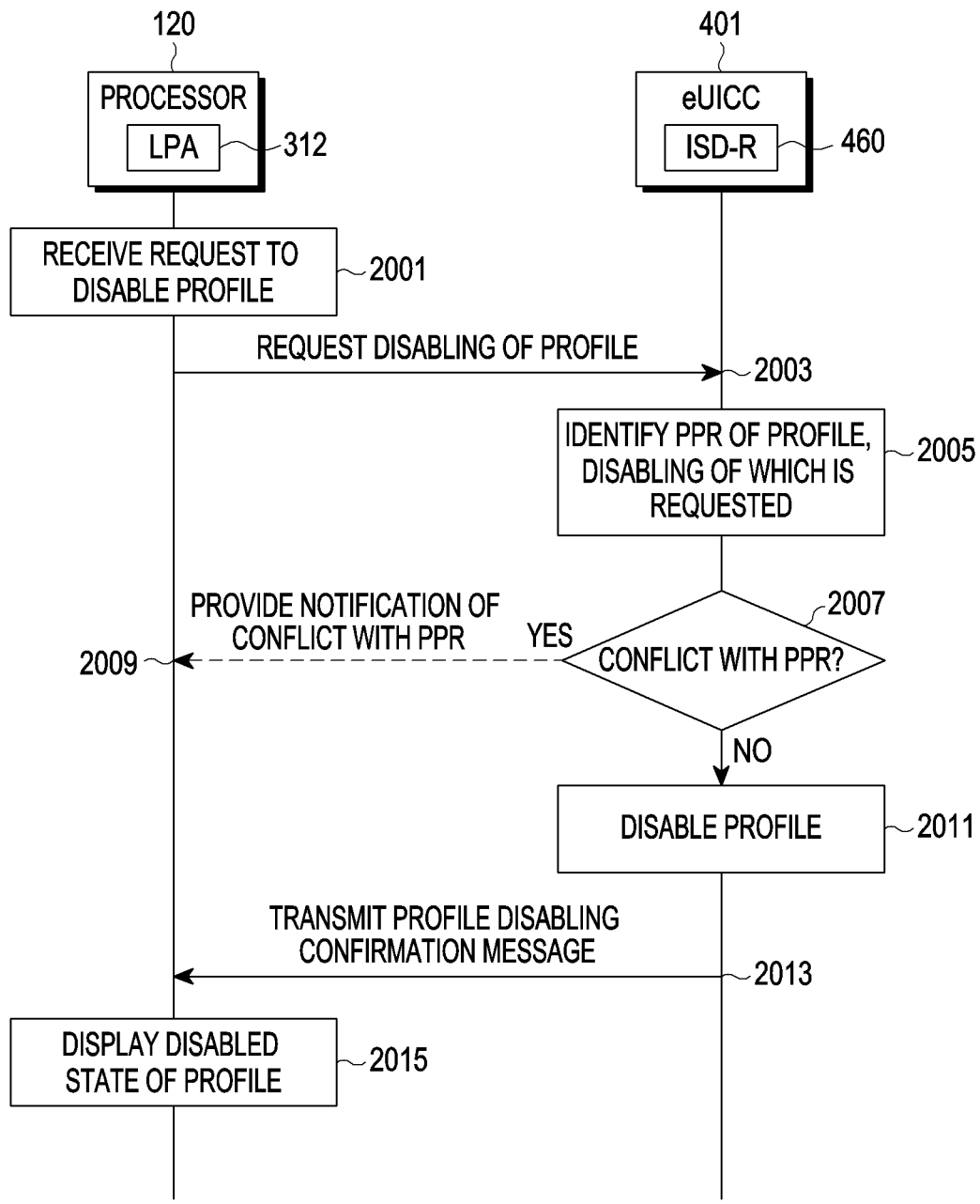
FIG. 20 is a flowchart illustrating an example profile disabling method according to various embodiments.
Figure 21:
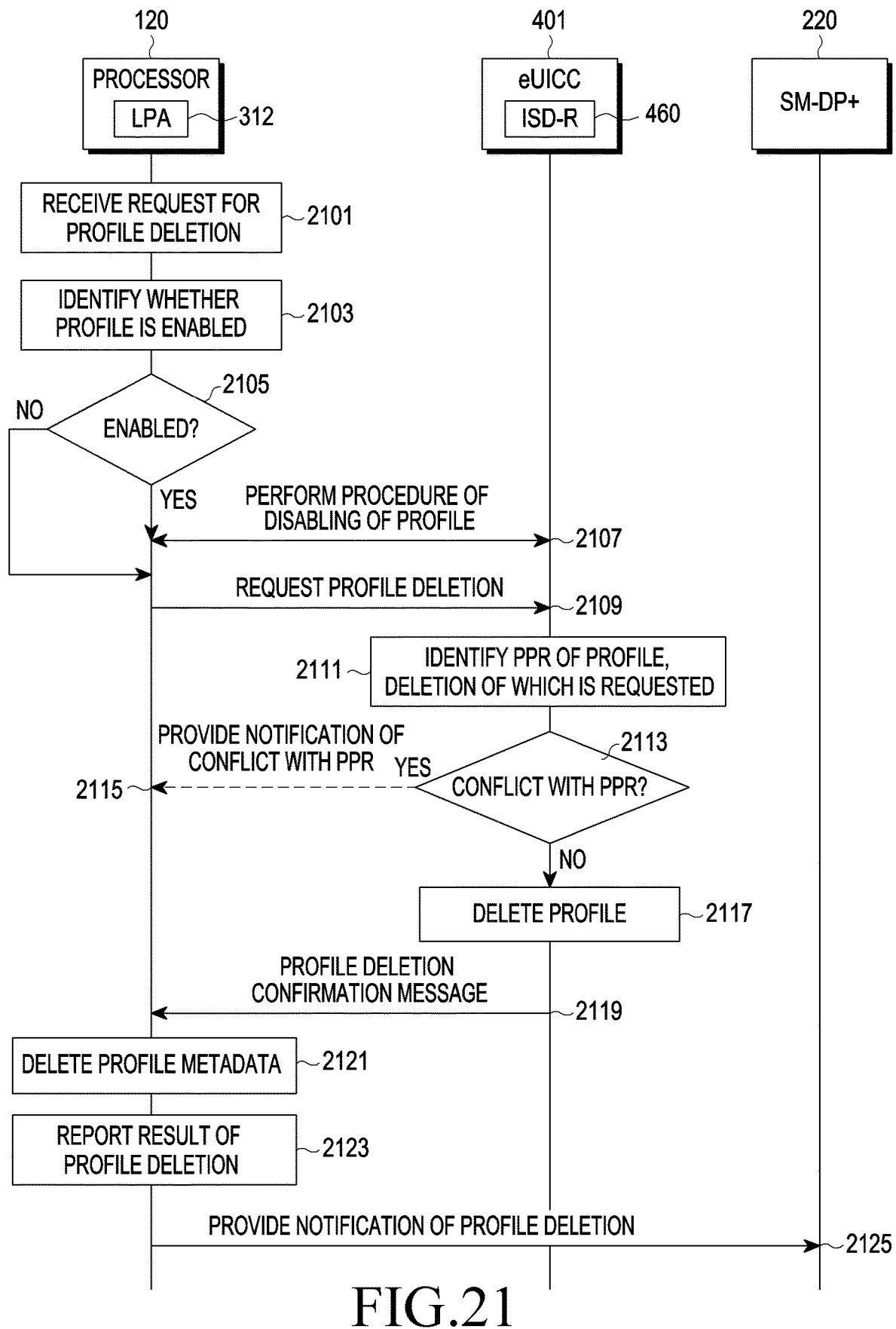
FIG. 21 is a flowchart illustrating an example profile deletion method according to various embodiments.

Hereinafter, an operation of an electronic device according to a profile policy rule will be described with reference to FIGS. 19 to 24. According to various embodiments, FIGS. 19 to 21 illustrate the operation of an electronic device according to enabling, disabling, or deleting of a profile, to which a profile policy rule (PPR) has been applied.

Figure 19:
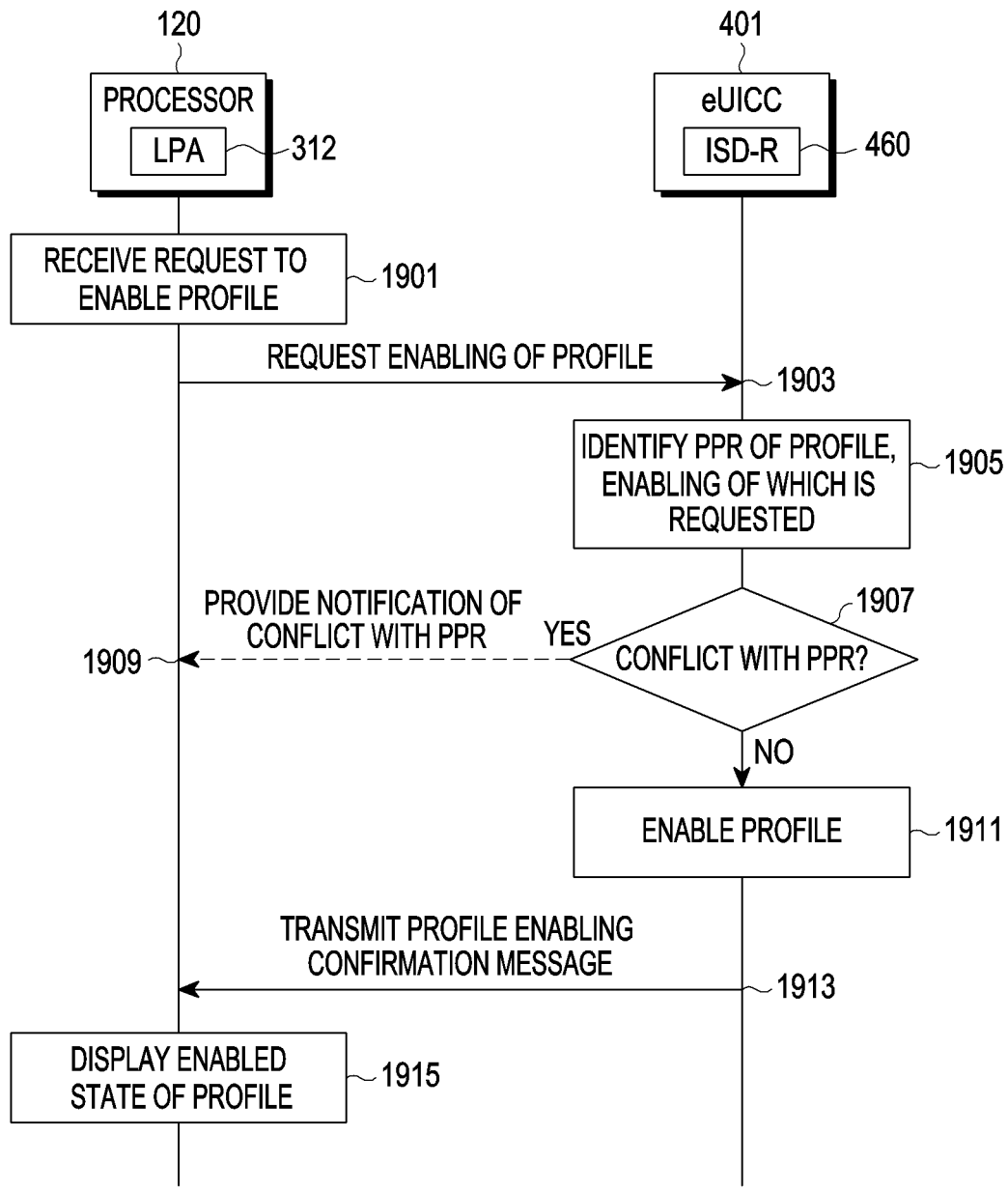
FIG. 19 is a flowchart illustrating an example profile enabling method according to various embodiments.

FIG. 19 is a flowchart illustrating an example profile enabling method according to various embodiments.

According to various embodiments, in operation 1901, the processor 120 (e.g., the LPA 312) of the electronic device 101 may receive a request to enable a currently disabled profile. The request to enable the profile may be made by selecting a corresponding menu item by a user through the screen 820a or 820b, illustrated in FIG. 8B or 8D, including SIM-related information. Example embodiments of a method for the enabling request will be described later.

According to various embodiments, in operation 1903, the processor 120 of the electronic device 101 may transmit, to the eUICC 401 (e.g., the ISD-R 460), a request to enable a specific profile selected by the user.

According to various embodiments, in operation 1905, the eUICC 401 of the electronic device 101 may determine whether a PPR has been applied to the specific profile, the enabling of which has been requested, or to another preinstalled profile. As a result of the determination, when it is determined in operation 1907 that the enabling request conflicts with the PPR applied to the specific profile, the enabling of which has been requested, or the another pre-installed profile (Yes), the eUICC 401 may notify the processor 120 of the conflict with the PPR in operation 1909.

According to various embodiments, as a result of the determination, when it is determined in operation 1907 that the enabling request does not conflict with the PPR applied to the profile (No), the eUICC 401 may enable the corresponding disabled profile in operation 1911.

According to various embodiments, in operation 1913, as a result of the enabling of the profile, the eUICC 401 of the electronic device 101 may transmit a profile enabling confirmation message (profile enable confirmation) to the processor 120.

According to various embodiments, the processor 120 of the electronic device 101 may receive the profile enabling confirmation message from the eUICC 401, and, in operation 1915, may display, on a screen, information indicating that the state in which the corresponding profile is enabled.

FIG. 20 is a flowchart illustrating an example profile disabling method according to various embodiments.

According to various embodiments, in operation 2001, the processor 120 (e.g., the LPA 312) of the electronic device 101 may receive a request to disable a currently enabled profile. The request to disable the profile may be made by selecting a corresponding menu item by a user through the screen 820a or 820b, illustrated in FIG. 8B or 8D, including SIM-related information. Example embodiments of a method for the disabling request will be described later.

According to various embodiments, in operation 2003, the processor 120 of the electronic device 101 may transmit, to the eUICC 401 (e.g., the ISD-R 460), a request to disable a specific profile selected by a user.

According to various embodiments, in operation 2005, the eUICC 401 of the electronic device 101 may determine whether a PPR has been applied to the specific profile, the disabling of which has been requested. As a result of the determination, when it is determined in operation 2007 that the disabling request conflicts with the PPR applied to the profile (Yes), the eUICC 401 may notify the processor 120 of the conflict with the PPR in operation 2009. For example, when PPR1 has been applied to the profile, the disabling of the profile which is enabled may not be allowed according to the definition of the PPR1 as described above.

According to various embodiments, as a result of the determination, when it is determined in operation 2007 that the disabling request does not conflict with the PPR applied to the profile (No) (e.g., when the PPR1 is not applied to the profile), the eUICC 401 may disable the corresponding enabled profile in operation 2011.

According to various embodiments, in operation 2013, as a result of the disabling of the profile, the eUICC 401 of the electronic device 101 may transmit a profile disabling confirmation message (profile disable confirmation) to the processor 120.

According to various embodiments, the processor 120 of the electronic device 101 may receive the profile disabling confirmation message from the eUICC 401, and, in operation 2015, may display, on a screen, information indicating that the corresponding profile is disabled.

FIG. 21 is a flowchart illustrating an example profile deletion method according to various embodiments.

According to various embodiments, in operation 2101, the processor 120 (e.g., the LPA 312) of the electronic device 101 may receive a request to delete a currently enabled profile. The request to delete the profile may be made by selecting a corresponding menu item by a user through the screen 820a or 820b, illustrated in FIG. 8B or 8D, including SIM-related information. Example embodiments of a method for the deletion request will be described later.

According to various embodiments, when a profile to be deleted is enabled, the processor 120 of the electronic device 101 may disable and then delete the profile. For example, in operation 2103, the processor 120 may determine whether the profile, the deletion of which is requested, is enabled. As a result of the determination, when it is determined in operation 2105 that the profile, the deletion of which is requested, is enabled (2105—Yes), the processor 120 may perform, in operation 2107, a procedure of disabling the profile, the deletion of which is requested, together with the eUICC 401. In one example, the disabling procedure between the processor 120 and the eUICC 401 may be performed according to the above-described process in FIG. 20.

As a result of the determination, when it is determined in operation 2105 that the profile, the deletion of which is requested, is disabled (2105-No), in operation 2109, the processor 120 of the electronic device 101 may transmit, to the eUICC 401 (e.g., the ISD-R 460), the request for the deletion of the profile selected by a user.

According to various embodiments, in operation 2111, the eUICC 401 of the electronic device 101 may determine whether a PPR has been applied to the specific profile, the deletion of which is requested. As a result of the determination, when it is determined in operation 2113 that the deletion request conflicts with the PPR applied to the profile (2113—Yes), the eUICC 401 may notify the processor 120 of the conflict with the PPR in operation 2115. For example, when PPR2 has been applied to the profile, the deletion of the profile may not be allowed according to the definition of the PPR2 as described above. According to various embodiments, when PPR1 has been applied to the profile, disabling of the profile is not allowed according to the definition of the PPR1 as described above, and thus the deletion thereof may not be performed.

According to various embodiments, as a result of the determination, when it is determined in operation 2113 that the deletion request does not conflict with the PPR applied to the profile (2113-No) (e.g., when the PPR2 is not applied to the profile), the eUICC 401 may delete the corresponding disabled profile in operation 2117.

According to various embodiments, in operation 2119, as a result of the deletion of the profile, the eUICC 401 of the electronic device 101 may transmit a profile deletion confirmation message (profile delete confirmation) to the processor 120.

According to various embodiments, the processor 120 of the electronic device 101 may receive the profile deletion confirmation message from the eUICC 401, may delete metadata of the corresponding profile in operation 2121, and, in operation 2123, may display, on a screen, information indicating that the corresponding profile has been deleted.

According to various embodiments, in operation 2125, the processor 120 of the electronic device 101 may notify the SM-DP+ server 220 of the result of the deletion of the profile.

Figure 22:
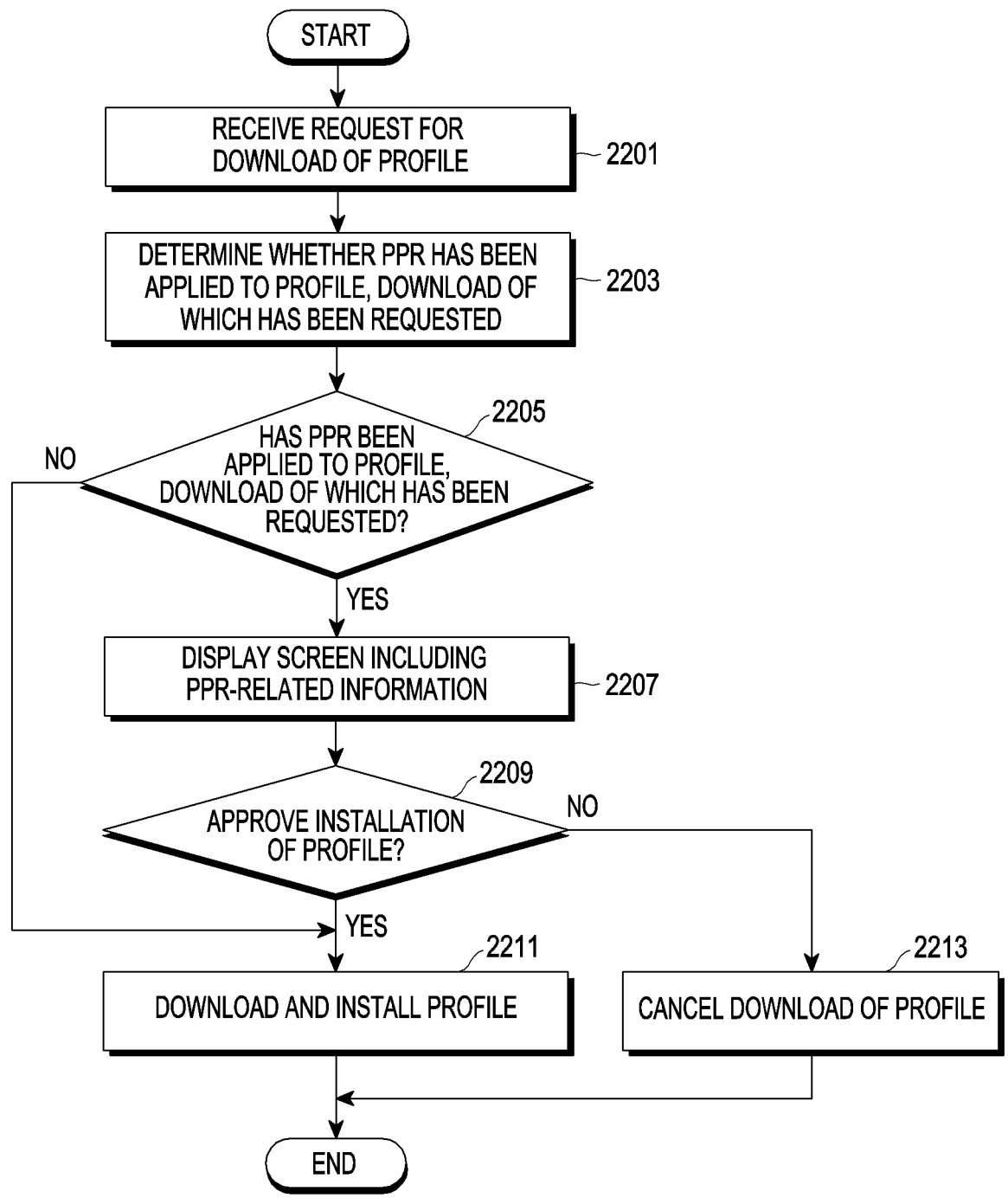
FIG. 22 is a flowchart illustrating an example profile download method according to various embodiments.

FIG. 22 is a flowchart illustrating an example profile download method according to various embodiments.

Operations in FIG. 22 according to various embodiments will be described, for convenience, with reference to the electronic device 101 in FIG. 1A or 3.

According to various embodiments, in operation 2201, the processor 120 (e.g., the LPA 312) of the electronic device

101 may receive a request for profile download. The request for profile download may be made by requesting download of a specific profile through a link included in a webpage or a menu item, which is provided to download the specific profile, or by purchasing a voucher based on a quick response (QR) code including an activation code, and scanning the QR code in the electronic device 101. However, the examples of the disclosure are not limited to the methods.

According to various embodiments, in operation 2203, the processor 120 of the electronic device 101 may determine whether a PPR has been applied to the profile, the download of which has been requested. As a result of the determination, when it is determined in operation 2205 that the PPR has been applied to the profile, the download of which has been requested (2205—Yes) (e.g., when it is determined that PPR1 and/or PPR2 has been applied to the corresponding profile), the processor 120 may display a screen including PPR-related information in operation 2207. According to various embodiments, the processor 120 may include and display, on the screen including the PPR-related information, a menu item for approving the installation of the corresponding profile.

According to various embodiments, when the processor 120 of the electronic device 101 receives, in operation 2209, profile installation approval through the menu item for approving the profile installation (2209—Yes), the processor 120 may download the profile and install the downloaded profile in the eUICC 401 in operation 2211.

According to various embodiments, when profile installation cancellation is input through the menu item for approving the profile installation in operation 2209 (2209-No), the processor 120 of the electronic device 101 may cancel the profile downloading in operation 2213.

According to various embodiments, as a result of determining in operation 2203 whether the PPR has been applied to the profile, the download of which is requested, when it is determined in operation 2205 that PPR has not been applied to the profile, the download of which is requested (2205-No) (e.g., when it is determined that PPR1 and/or PPR2 has not been applied to the corresponding profile), the processor 120 of the electronic device 101 may download the profile and installed the downloaded profile in the eUICC 401 in operation 2211.

Figure 23:
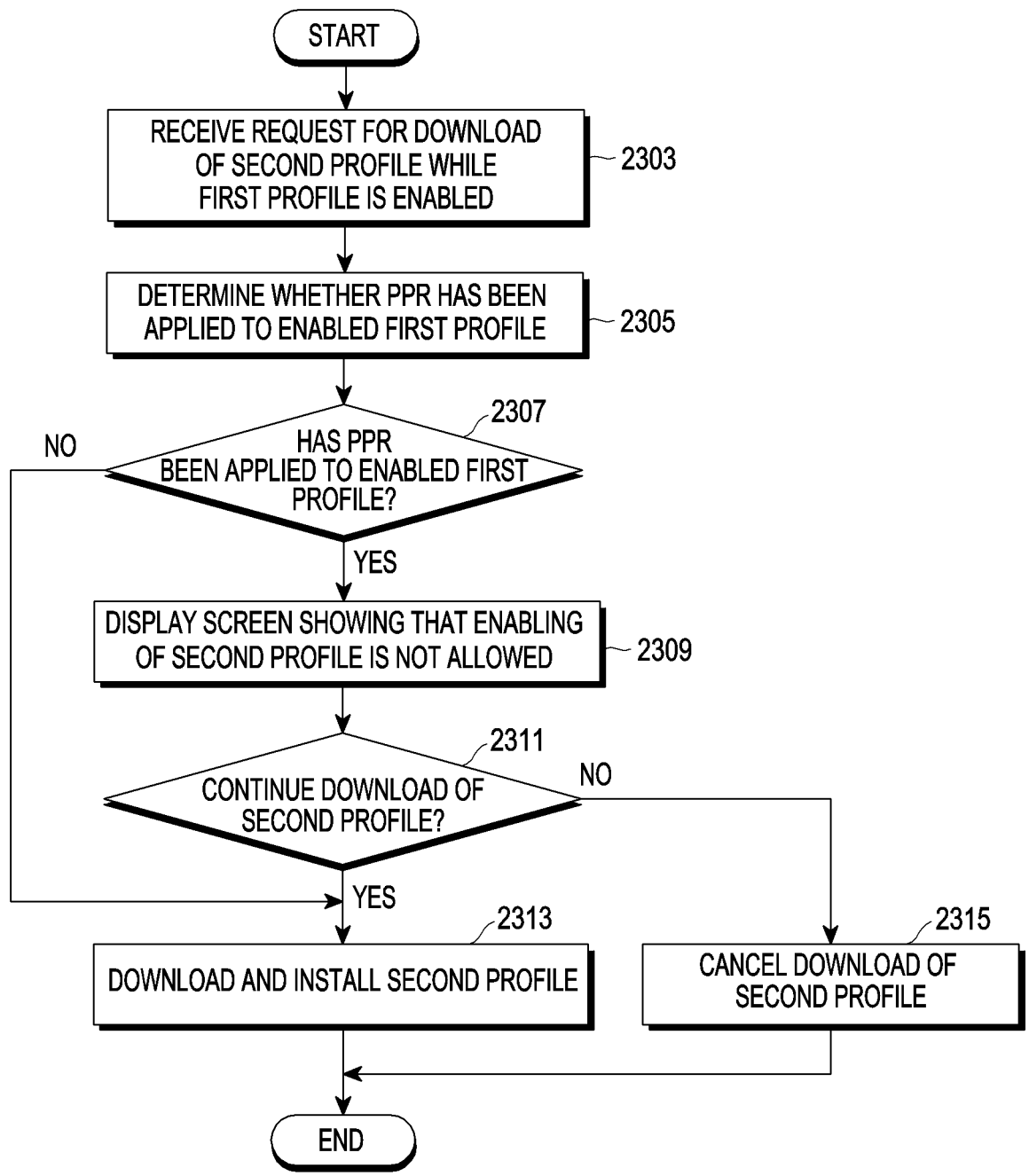
FIG. 23 is a flowchart illustrating an example profile download method according to various embodiments.

FIG. 23 is a flowchart illustrating an example profile download method according to various embodiments.

Operations in FIG. 23 according to various embodiments will be described, for convenience, with reference to the electronic device 101 in FIG. 1A or 3.

According to various embodiments, in operation 2303, the processor 120 (e.g., the LPA 312) of the electronic device 101 may receive a request for downloading a second profile while a first profile preinstalled in the eUICC 401 is enabled. The request for downloading the second profile may be made by requesting download of the second profile through a link included in a webpage or a menu item, which is provided to download the second profile, or by purchasing a voucher based on a quick response (QR) code including an activation code and scanning the QR code in the electronic device 101. However, the examples of the disclosure are not limited to the methods.

According to various embodiments, in operation 2305, the processor 120 of the electronic device 101 may determine whether a PPR has been applied to the first profile, which has been preinstalled and enabled. As a result of the determination, when it is determined in operation 2307 that the PPR has been applied to the enabled first profile (e.g., when it is determined that PPR1 and/or PPR2 has been applied to the corresponding profile), the processor 120 may display, in operation 2309, a screen including information which indicates that the enabling of the second profile may be not allowed even though the second profile is downloaded. According to various embodiments, the processor 120 may include and display, on the screen including the information, a menu item for continuing the download of the second profile. Further, the processor 120 may provide notification of the fact that a memory reset should be performed in order to download a new profile from the screen including the information. The screen may further include a menu item capable of executing a shortcut to a function of the memory reset.

According to various embodiments, when the processor 120 of the electronic device 101 is requested to continue the download of the second profile in operation 2311, the processor 120 may download the second profile and install the downloaded second profile in the eUICC 401 in operation 2313.

According to various embodiments, when cancellation of the downloading or installation of the second profile is input through the menu item in operation 2311, the processor 120 of the electronic device 101 may cancel the downloading of the second profile in operation 2315.

According to various embodiments, as a result of determining in operation 2305 whether the PPR has been applied to the enabled first profile, when it is determined in operation 2307 that the PPR has not been applied to the first profile (e.g., when it is determined that PPR1 and/or PPR2 has not been applied to the corresponding profile), the processor 120 of the electronic device 101 may download a profile of the second eSIM and install the same in the eUICC 401 in operation 2313.

Figure 24:
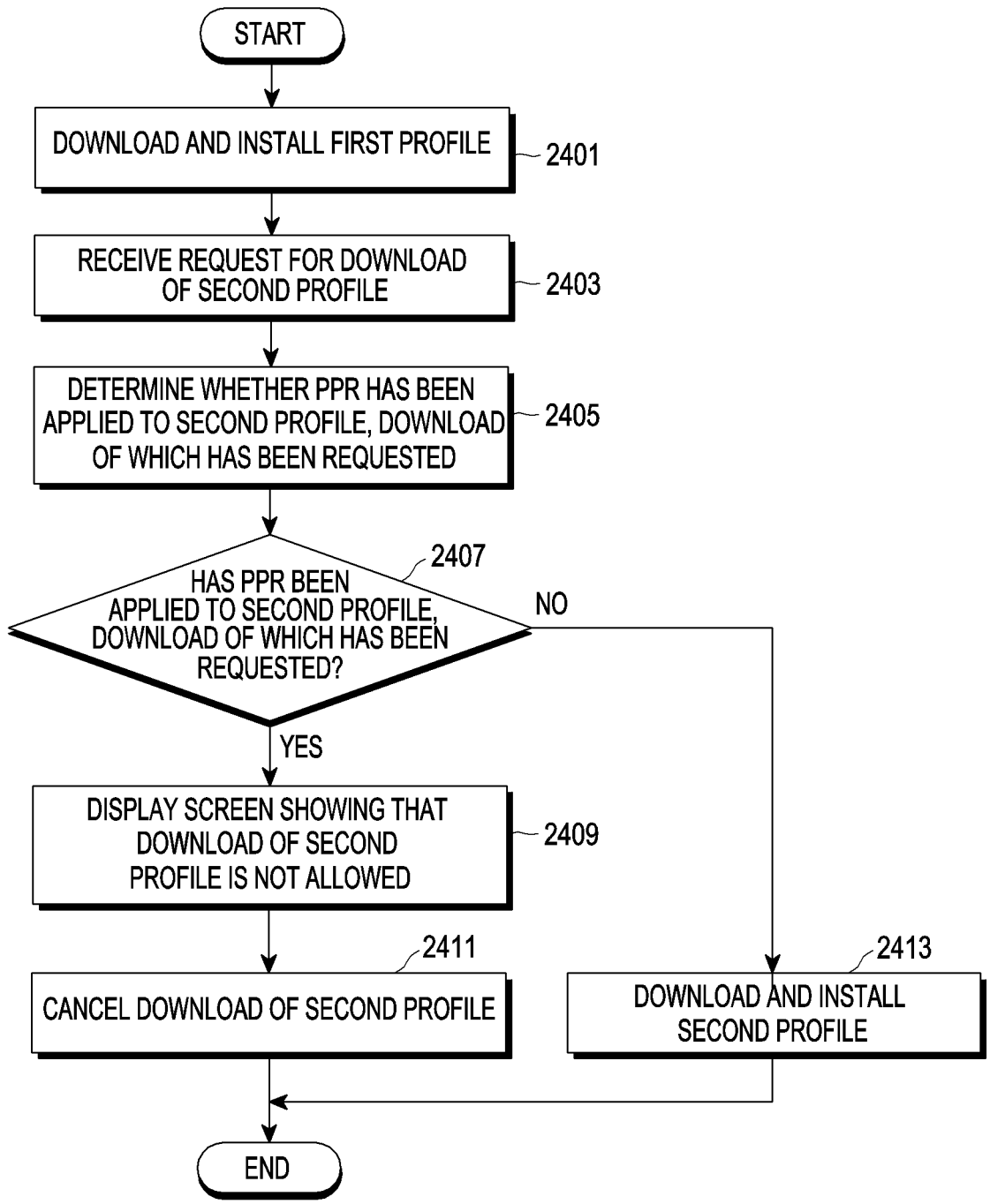
FIG. 24 is a flowchart illustrating an example profile download method according to various embodiments.

FIG. 24 is a flowchart illustrating an example profile download method according to various embodiments.

Operations in FIG. 24 according to various embodiments will be described, for convenience, with reference to the electronic device 101 in FIG. 1A or 3.

According to various embodiments, in operation 2401, the processor 120 (e.g., the LPA 312) of the electronic device 101 may download a first profile and install the same in the eUICC 401 of the electronic device 101.

In operation 2403, the processor 120 may receive a request for download of a second profile while the first profile is installed in the electronic device 101. The request for download of the second profile may be made by requesting the download of the second profile through a link included in a webpage or a menu item, which is provided to download the second profile, or by purchasing a voucher based on a quick response (QR) code including an activation code and scanning the QR code in the electronic device 101. However, the examples of the disclosure are not limited to the methods.

According to various embodiments, in operation 2405, the processor 120 of the electronic device 101 may determine whether a PPR has been applied to the second profile, the download of which has been requested. As a result of the determination, when it is determined in operation 2407 that the PPR has been applied to the second profile, the download of which has been requested (2407—Yes) (e.g., when it is determined that PPR1 and/or PPR2 has been applied to the corresponding profile), the processor 120 may display, in operation 2409, a screen including information which indicates that the second profile cannot be downloaded. According to various embodiments, the processor 120 may cancel the download of the second profile in operation 2411.

According to various embodiments, as a result of determining in operation 2405 whether a PPR has been applied to the second profile, when it is determined in operation 2407 that the PPR has not been applied to the second profile, the download of which has been requested (2407-No) (e.g., when it is determined that PPR1 and/or PPR2 has not been applied to the corresponding profile), the processor 120 of the electronic device 101 may download the second profile and install the same in the eUICC 401 in operation 2413.

Figure 25:
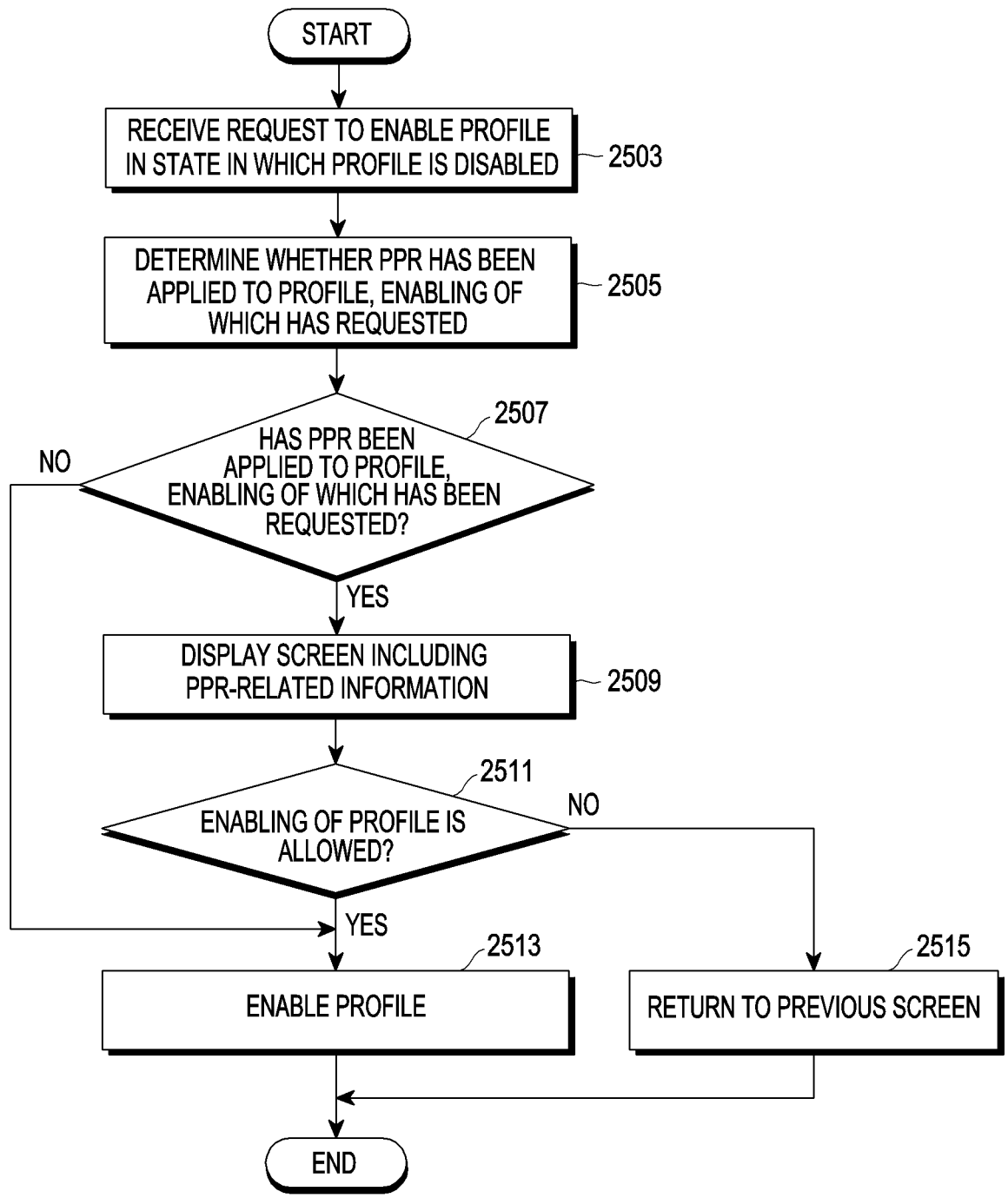
FIG. 25 is a flowchart illustrating an example profile enabling method according to various embodiments.

FIG. 25 is a flowchart illustrating an example profile enabling method according to various embodiments. The operations in FIG. 25 will be described, for convenience, with reference to: the electronic device 101 in FIG. 1A or 3; and FIGS. 26A, 26B, and 26C.

According to various embodiments, in operation 2503, in the state in which a profile installed in the eUICC 401 of the electronic device 101 is disabled, the processor 120 (e.g., the LPA 312) of the electronic device 101 may receive a request to enable the disabled profile. The request to enable the profile may be made by selecting a corresponding function by a user through the screens illustrated in FIGS. 26A and 26B.

According to various embodiments, a screen 820i, illustrated in FIG. 26A, including SIM-related information may include a tab 821 corresponding to the first SIM 531 and a tab 823 corresponding to a first profile (eSIM 1). According to various embodiments, when the first SIM 531 is not included in the electronic device 101, the tab 821 corresponding to the first SIM 531 may not be displayed on the screen 820i. The electronic device 101 may display information associated with the first SIM 531 (e.g., an own number (e.g., MSISDN), PLMN information, or supportable network communication types) in the tab 821 corresponding to the first SIM 531. The electronic device 101 may display, based on the enabled state of the first SIM 531, supportable network communication types to be visually distinguished from a disabled SIM. According to various embodiments, the electronic device 101 may display only the text "Off", based on the disabled state of the first profile. The electronic device 101 may display information associated with the first profile (e.g., an own number (e.g., MSISDN), PLMN information, or supportable network communication types) in the tab 823 corresponding to the first profile. The electronic device 101 may display supportable network types (e.g., 5G/4G/3G/2G) for an enabled SIM (e.g., the first SIM 531), and may display, for a disabled SIM (e.g., the eSIM 550), an indicator (e.g., the text "Off") indicating the disabled state thereof, whereby a user can identify currently enabled/disabled SIMs.

According to various embodiments, the screen 820i including SIM-related information may further include, depending on the implementation thereof, a tab 824 for adding a mobile plan, a call-related tab 825, a tab 826 related to text messages, a tab 827 related to mobile data, a tab 828 for confirming a SIM card for calls, a dual-SIM-always-on tab 829, a tab 830 for locking mobile plan settings, or a tab 831 for deleting all mobile plans, but is not limited thereto. A mobile plan may include a profile.

Figure 26B:
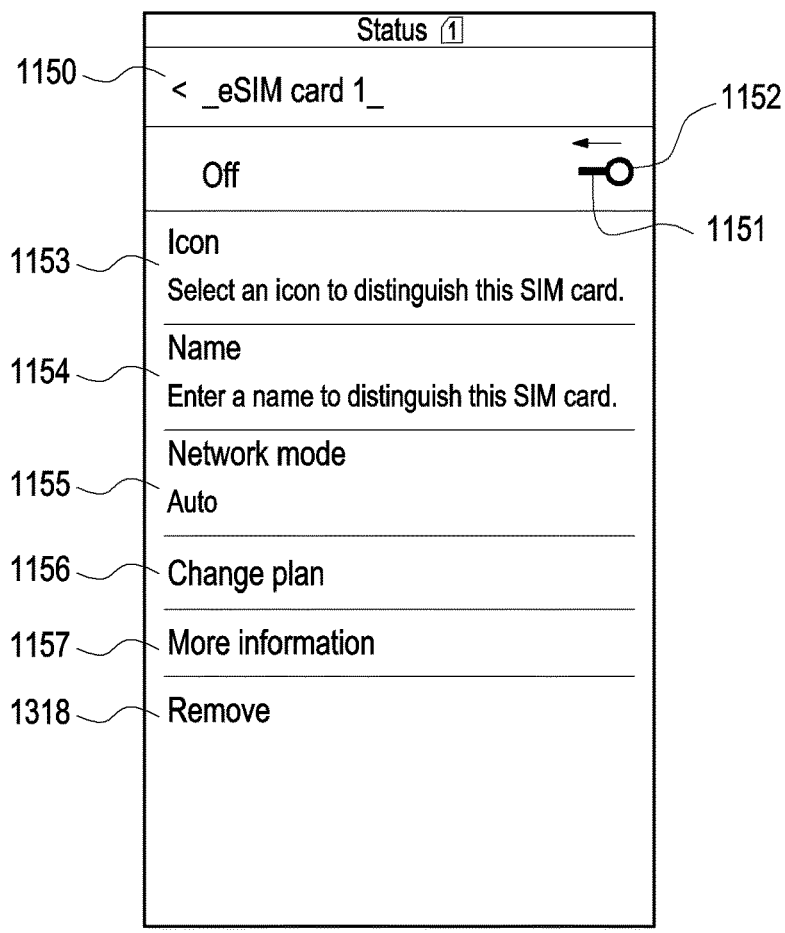
FIG. 26B is a diagram illustrating an example screen displayed in an electronic device according to various embodiments.

According to various embodiments, in the state in which the screen illustrated in FIG. 26A is displayed, the electronic device 101 may detect selection of the tab 823 corresponding to the first profile (eSIM 1). When the tab 823 corresponding to the first profile is selected, the electronic device 101 may display a screen 1150, illustrated in FIG. 26B, including information corresponding to the first profile. The screen 1150 including the information corresponding to the first profile may include a bar 1151 for toggling an object 1152. When the object 1152 is located at a first position on the bar 1151, the first profile may be enabled, and text (e.g., "On") indicating that the first profile is enabled may be displayed. When the object 1152 is located at a second position on the bar 1151, the first profile may be disabled, and text (e.g., "Off") indicating that the first profile is disabled may be displayed. The electronic device 101 may change the location of the object 1152, based on drag input corresponding to the object 1152, and may control, based on the location of the object 1152, whether to enable the first profile. As illustrated in FIG. 26B, when an input for moving the object 1152 from the second position of the bar 1151 to the first position thereof is identified, the electronic device 101 may determine that a request to enable the disabled first profile has been received. The screen 1150 illustrated in FIG. 26B may include at least one among a tab 1153 for controlling an icon corresponding to a first profile, a name-related tab 1154, a network mode tab 1155, a mobile plan change tab 1156, an additional-information-related tab 1157, or a mobile plan (e.g., profile) deletion tab 1318. When the mobile plan deletion tab 1318 is selected, the electronic device 101 may determine that a command to delete the first profile has been acquired.

Figure 26C:
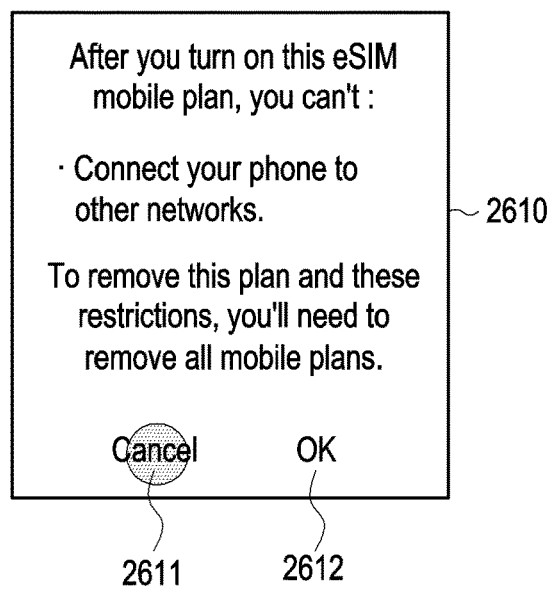
FIG. 26C is a diagram illustrating an example screen displayed in an electronic device according to various embodiments.

According to various embodiments, when the processor 120 receives the request to enable the profile in operation 2503, the eUICC 401 of the electronic device 101 may determine, in operation 2505, whether a PPR has been applied to the profile, the enabling of which has been requested. As a result of the determination, when it is determined in operation 2507 that the PPR has been applied to the profile, the enabling of which has been requested (2507—Yes) (e.g., when it is determined that PPR1 and/or PPR2 has been applied to the corresponding profile), the processor 120 may display, in operation 2509, a screen (e.g., a pop-up window) including information indicating that the PPR has been applied to the profile. According to various embodiments, the screen may be displayed as illustrated in FIG. 26C. For example, referring to FIG. 26C, the electronic device 101 may report, through a screen 2610, that when a first eSIM has been enabled, it is not possible to download and enable another profile, and that it is necessary to remove all profiles installed in the electronic device 101 in order to remove the preinstalled first profile or remove the PPR applied to the first eSIM.

According to various embodiments, when enabling of the profile is approved in operation 2511 (2511—Yes), the processor 120 may enable the profile in operation 2513. As illustrated in FIG. 26C, a menu item for approving the enabling of the profile may be provided while being included in a screen which includes information indicating that the PPR has been applied to the profile. When an approval icon 2612 is selected from among a rejection icon 2611 and the approval icon 2612 included in the screen 2610 in FIG. 26C, the processor 120 may perform a profile enabling procedure. When the profile enabling procedure is completed, the processor 120 may display supportable network types (e.g., 5G/4G/3G/2G) in the tab 823 corresponding to the enabled eSIM (e.g., the first eSIM 550) on the screen 820i in FIG. 26A.

According to various embodiments, when the enabling of the profile is rejected in operation 2511 (2511-No) (e.g., when the rejection icon 2611 is selected from among the rejection icon 2611 and the approval icon 2612 included in the screen 2610 in FIG. 26C), the processor 120 may return the screen to a previous screen without enabling the profile in operation 2515.

According to various embodiments, as a result of determining, in operation 2505, whether the PPR has been applied to the eSIM profile, the enabling of which has been requested, when it is determined in operation 2507 that the PPR has not been applied to the profile (2507-No) (e.g., when it is determined that PPR1 and/or PPR2 has not been applied to the corresponding profile), the processor 120 of the electronic device 101 may enable the profile in operation 2513.

Figure 27:
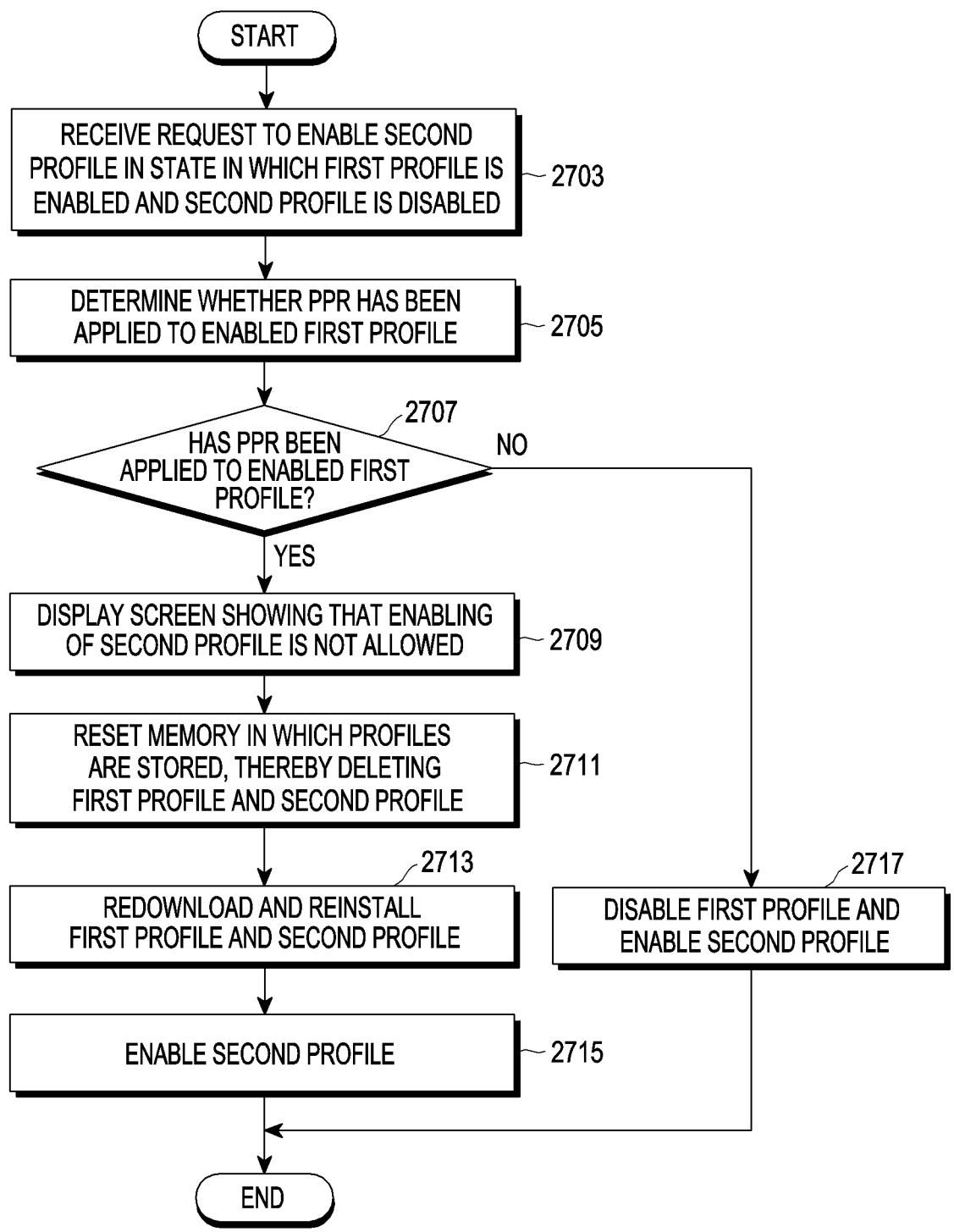
FIG. 27 is a flowchart illustrating an example method for enabling a profile of an eSIM according to various embodiments.

FIG. 27 is a flowchart illustrating an example profile enabling method according to various embodiments. The operations in FIG. 27 will be described, for convenience, with reference to: the electronic device 101 in FIG. 1A or 3; the eUICC 401 in FIG. 4; and FIGS. 28A, 28B, 28C, and 28D.

According to various embodiments, in operation 2703, in the state in which a first profile installed in the eUICC 401 of the electronic device 101 is enabled and a second profile is disabled, the processor 120 may receive a request to enable the second profile. The request to enable the second profile may be made by selecting a corresponding function by a user through the screen illustrated in FIG. 28A.

Figure 28A:
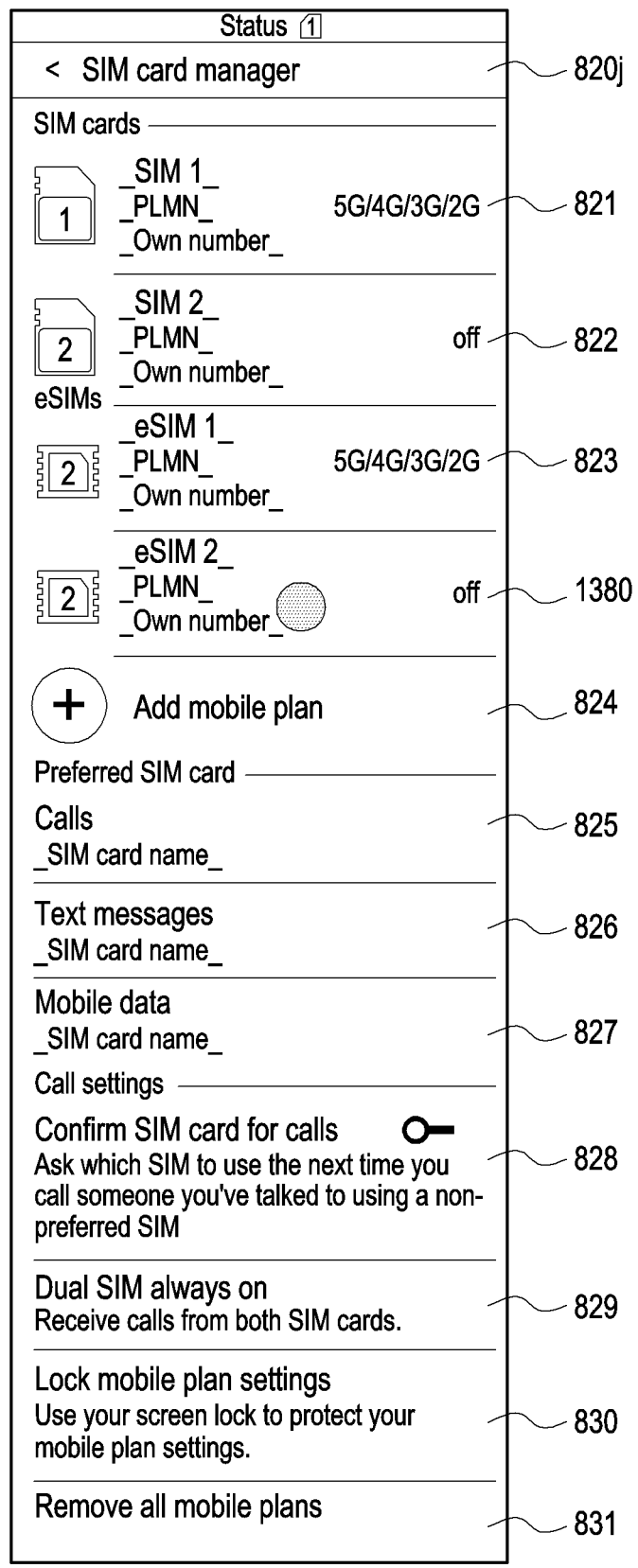
FIG. 28A is a diagram illustrating an example screen displayed in an electronic device according to various embodiments.

According to various embodiments, the screen 820j, illustrated in FIG. 28A, including SIM-related information may include a tab 821 corresponding to the first SIM 531, a tab 822 corresponding to the second SIM 541, a tab 823 corresponding to a first profile (eSIM 1), and a tab 1380 corresponding to a second profile (eSIM 2). According to various embodiments, when the electronic device 101 does not include the first SIM 531 and/or the second SIM 541, the tab 821 corresponding to the first SIM 531 and the tab 822 corresponding to the second SIM 541 may not be displayed on the screen 820j. The electronic device 101 may also display, based on the enabled state of the first profile, supportable network communication types to be visually distinguished from the disabled second profile. According to various embodiments, the electronic device 101 may also display only the text "Off", based on the disabled state of the second profile. The electronic device 101 may display information associated with the first profile and the second profile (e.g., an own number (e.g., MSISDN), PLMN information, or supportable network communication types) in the tabs 823 and 1380 corresponding to the first profile and the second profile. The electronic device 101 may display supportable network types (e.g., 5G/4G/3G/2G) for an enabled profile (e.g., the first profile), and may display, for a disabled profile (e.g., the second profile), an indicator (e.g., the text "Off") indicating the disabled state thereof, whereby a user can identify currently enabled/disabled profiles.

According to various embodiments, in the state in which the screen illustrated in FIG. 28A is displayed, the electronic device 101 may detect selection of the tab 1380 corresponding to the second profile. When the tab 1380 corresponding to the second profile is selected, the electronic device 101 may display the screen, illustrated in 28B, including information corresponding to the second profile. For example, a screen including the information corresponding to the second profile may include a bar 1151 for toggling an object 1152. When the object 1152 is located at a first position on the bar 1151, the second profile may be enabled, and text (e.g., "On") indicating that the second profile is enabled may be displayed. When the object 1152 is located at a second position on the bar 1151, the second profile may be disabled, and text (e.g., "Off") indicating that the second profile is disabled may be displayed. The electronic device 101 may change the location of the object 1152, based on drag input corresponding to the object 1152, and may control, based on the location of the object 1152, whether the second profile has been enabled. When input for moving the object 1152 from the second position of the bar 1151 to the first position thereof is identified, the electronic device 101 may determine that a request to enable the disabled second profile has been received.

According to various embodiments, when the processor 120 receives a request to enable the second profile in operation 2703, the eUICC 401 of the electronic device 101 may determine, in operation 2705, whether a PPR has been applied to the enabled first profile. As a result of the determination, when it is determined in operation 2707 that the PPR has been applied to the enabled first profile (2707—Yes) (e.g., when it is determined that PPR1 and/or PPR2 has been applied to the corresponding profile), the processor 120 may display, in operation 2709, a screen (e.g., a pop-up window) including information indicating that the second profile, the enabling of which has been requested, cannot be enabled. According to various embodiments, the screen may be displayed as illustrated in FIG. 28C. For example, referring to FIG. 28C, the electronic device 101 may report, through a screen 2810, that, in order to enable the second profile, it is necessary to remove the currently enabled first profile or to delete all profiles currently installed in the electronic device 101 and then install the second profile again. When a confirmation icon 2811 is selected on the screen 2810 in FIG. 28C, the screen may return to the screen in FIG. 28B.

Figure 28B:
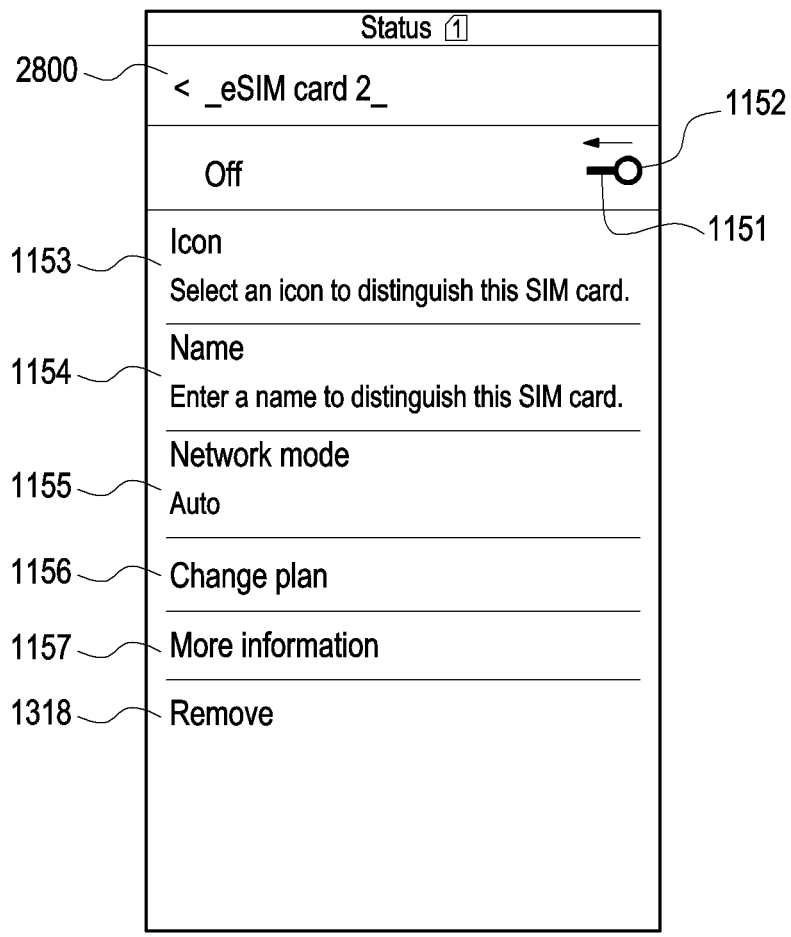
FIG. 28B is a diagram illustrating an example screen displayed in an electronic device according to various embodiments.
Figure 28C:
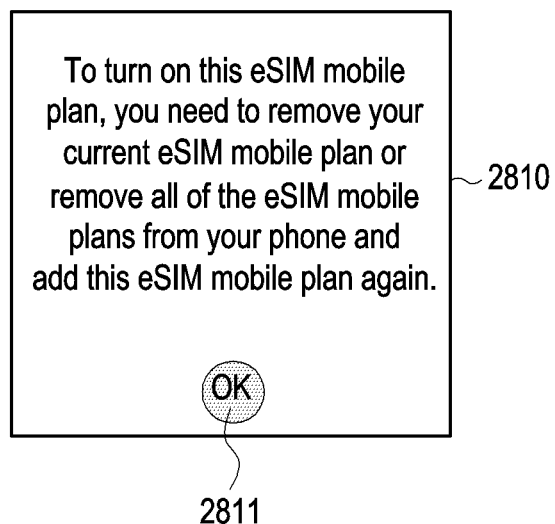
FIG. 28C is a diagram illustrating an example screen displayed in an electronic device according to various embodiments.

According to various embodiments, when a mobile plan deletion tab 1318 is selected on the screen in FIG. 28B, the processor 120 may reset, in operation 2711, a memory in which profiles are stored, thereby deleting both the first profile and the second profile.

According to various embodiments, in operation 2713, the processor 120 may redownload and reinstall the first profile and the second profile. The reinstalled first and second profiles are disabled, and thus the second profile may be enabled.

According to various embodiments, in operation 2715, the electronic device 101 may enable the second profile. According to an embodiment, only the second profile, among the deleted first and second profiles, may be reinstalled and enabled.

Figure 28D:
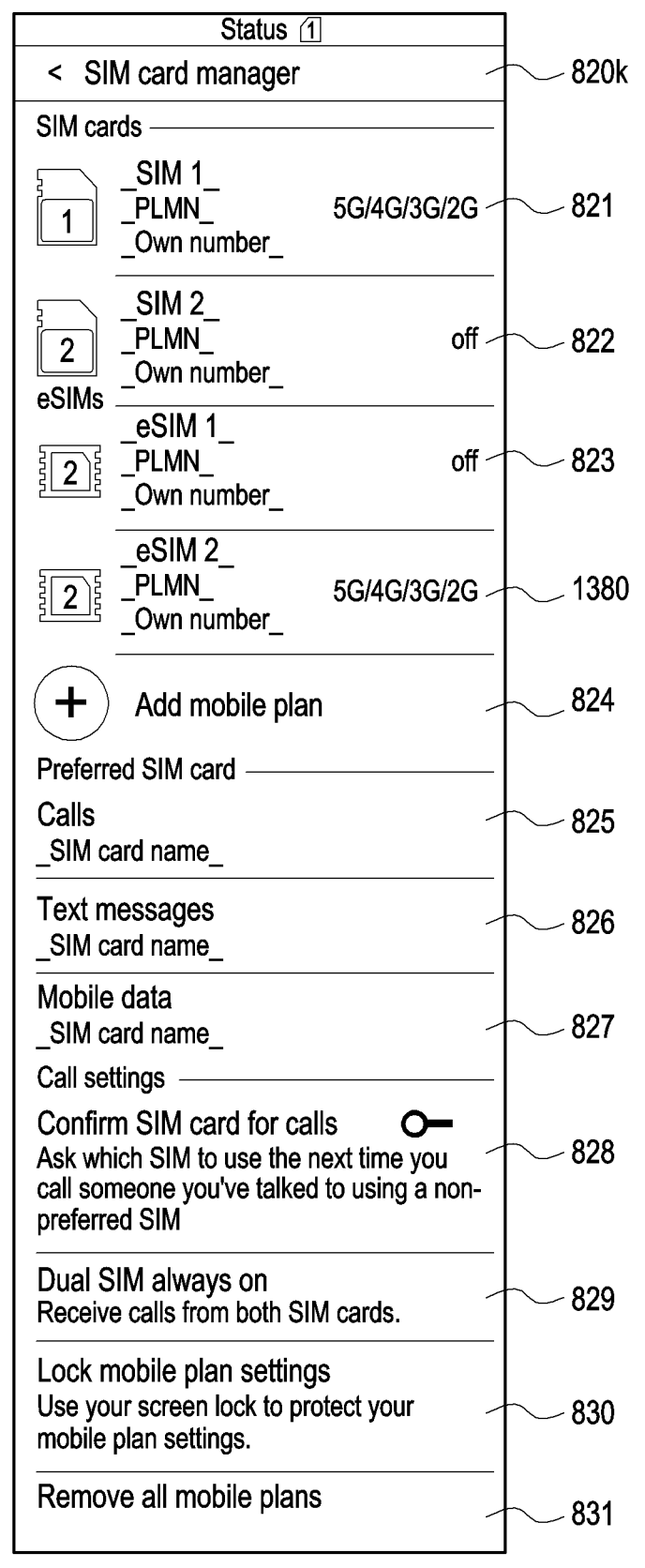

After the reinstallation of the first and second profiles, when the enabling of the second profile is completed, the processor 120 may display the screen 820k in FIG. 28D which replaces the screen 820j in FIG. 28A. For example, referring to FIG. 28D, the text "Off" may be displayed as an indicator indicating the disabled state of the first profile (eSIM 1) in the tab 823 corresponding to the first profile (eSIM 1), and supportable network types (e.g., 5G/4G/3G/2G) may be displayed as an indicator indicating the enabled state of the second profile (eSIM 2) in the tab 1380 corresponding to the second profile (eSIM 2).

According to various embodiments, as a result of determining in operation 2705 whether the PPR has been applied to the enabled first profile, when it is determined in operation 2707 that the PPR has not been applied to the first profile (2707-No) (e.g., when it is determined that PPR1 and/or PPR2 has not been applied to the corresponding profile), in operation 2717, the processor 120 of the electronic device 101 may disable the first profile and may then enable the disabled second profile.

Figure 29:
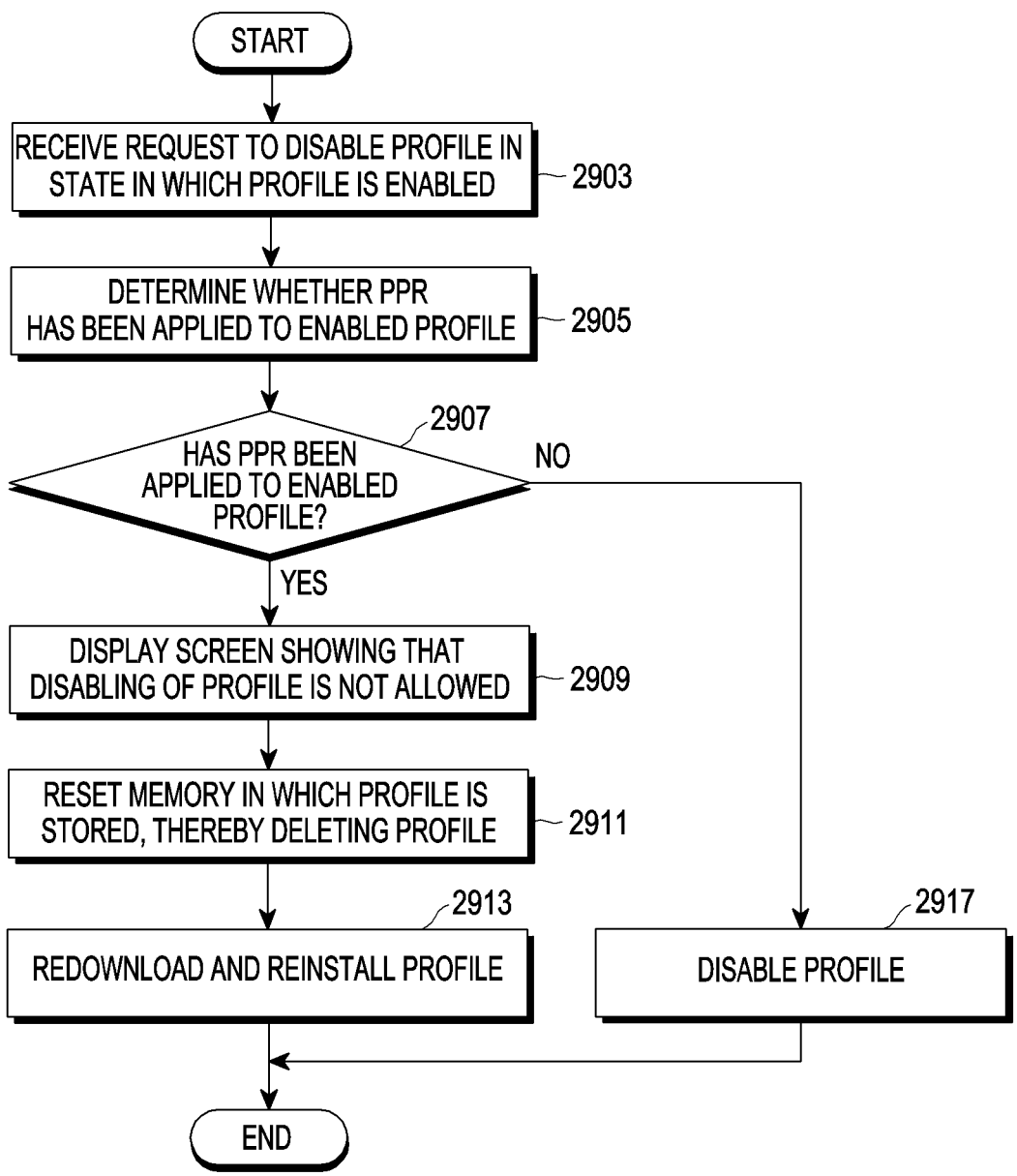
FIG. 29 is a flowchart illustrating an example profile disabling method according to various embodiments.

FIG. 29 is a flowchart illustrating an example profile disabling method according to various embodiments. The operations in FIG. 29 will be described, for convenience, with reference to: the electronic device 101 in FIG. 1 or 3; the eUICC 401 in FIG. 4; and FIGS. 30A, 30B, and 30C.

According to various embodiments, in operation 2903, in the state in which a profile installed in the eUICC 401 of the electronic device 101 is enabled, the processor 120 may receive a request to disable the profile. The request to disable the profile may be made by selecting a corresponding function by a user through the screen illustrated in FIG. 30A.

Figure 30A:
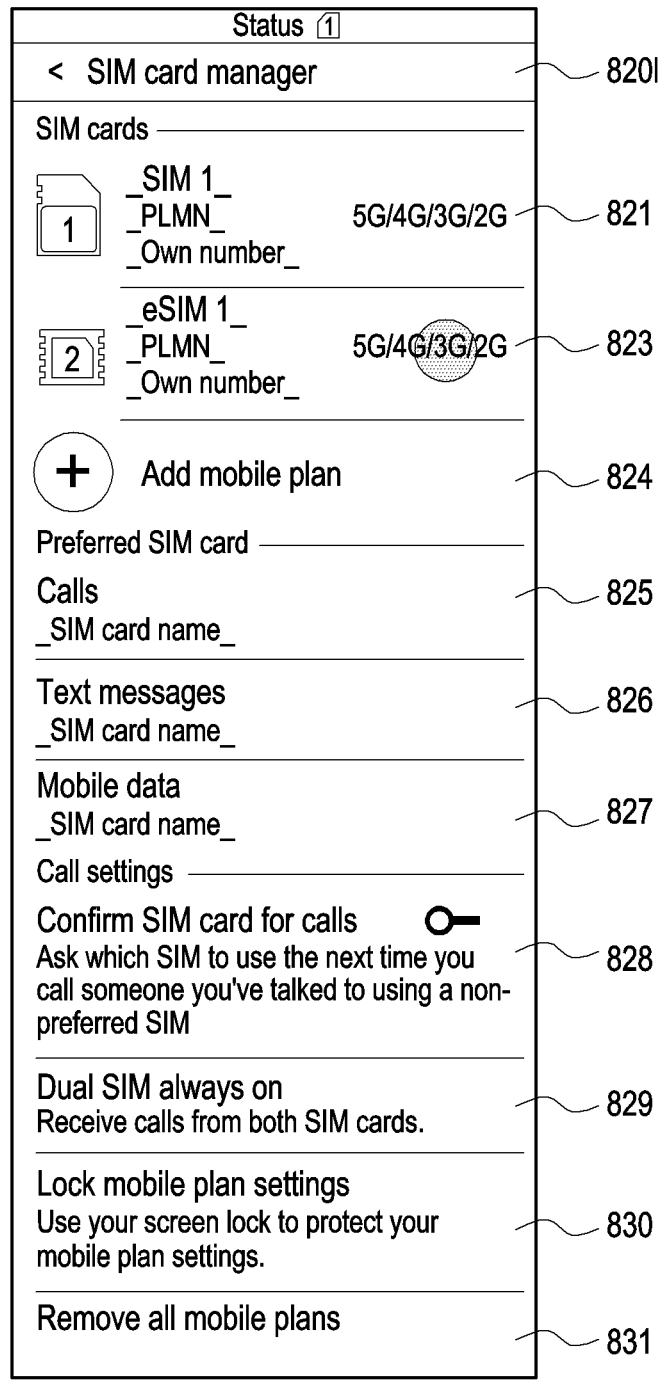
FIG. 30A is a diagram illustrating an example screen displayed in an electronic device according to various embodiments.
Figure 30B:
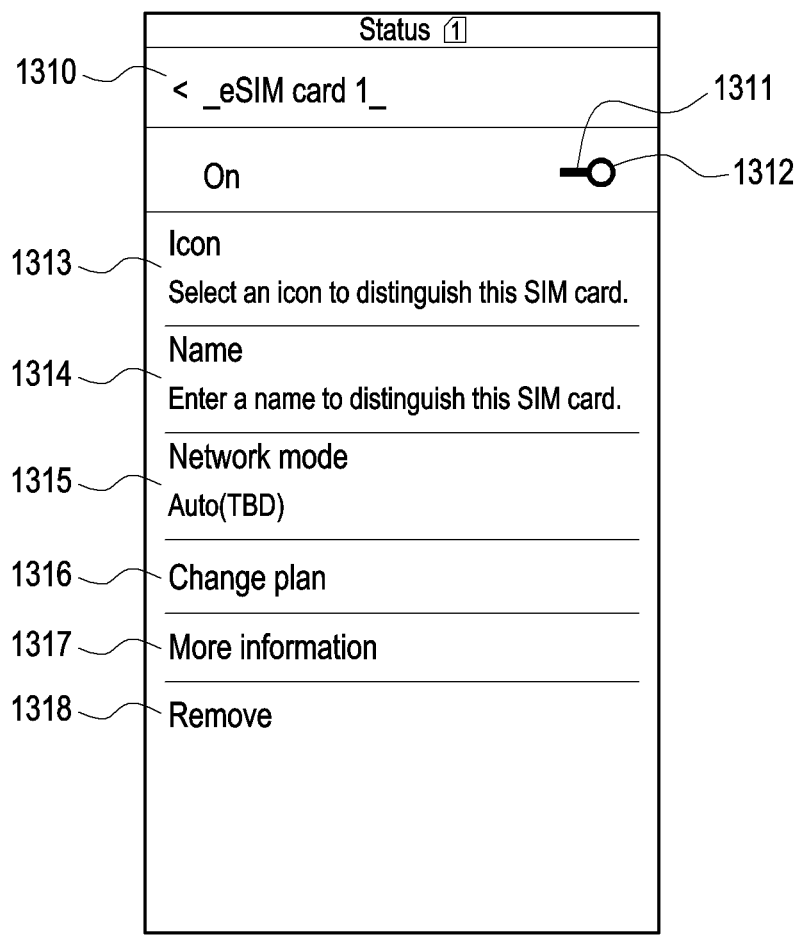
FIG. 30B is a diagram illustrating an example screen displayed in an electronic device according to various embodiments.

According to various embodiments, a screen 820*l*, illustrated in FIG. 30A, including SIM-related information may include a tab 821 corresponding to the first SIM 531 and a tab 823 corresponding to the first profile (eSIM 1). According to various embodiments, when the first SIM 531 is not included in the electronic device 101, the tab 821 corresponding to the first SIM 531 may not be displayed on the screen 820*l*. The electronic device 101 may display information associated with the first SIM and the first profile (e.g., an own number (e.g., MSISDN), PLMN information, or supportable network communication types) in the tabs 821 and 823 corresponding to the first SIM and the first profile. The electronic device 101 may display supportable network types (e.g., 5G/4G/3G/2G) for an enabled SIM (e.g., the first SIM 531 and the first profile).

According to various embodiments, in the state in which the screen illustrated in FIG. 30A is displayed, the electronic device 101 may detect selection of the tab 823 corresponding to the first profile. When the tab 823 corresponding to the first profile is selected, the electronic device 101 may display the screen, illustrated in FIG. 30B, including information corresponding to the first profile. For example, a screen 1310 including the information corresponding to the first profile may include a bar 1311 for toggling an object 1312. When the object 1312 is located at a first position on the bar 1311, the first profile may be enabled, and text (e.g., "On") indicating that the first profile is enabled may be displayed. When the object 1312 is located at a second position on the bar 1311, the first profile may be disabled, and text (e.g., "Off") indicating that the first profile is disabled may be displayed. The electronic device 101 may change the location of the object 1312, based on drag input corresponding to the object 1312, and may control, based on the location of the object 1312, whether to enable the first profile. According to various embodiments, when an input for moving the object 1312 from the first position of the bar 1311 to the second position thereof is identified, the electronic device 101 may determine that a request to disable the enabled first profile has been received.

Figure 30C:
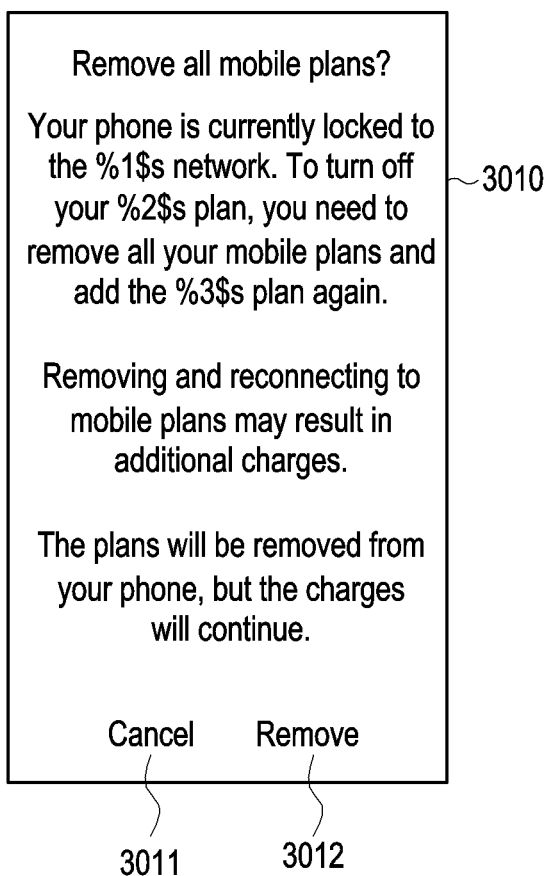
FIG. 30C is a diagram illustrating an example screen displayed in an electronic device according to various embodiments.

According to various embodiments, when the processor 120 receives, in operation 2903, a request to disable the profile (e.g., the first profile), the electronic device 101 may determine, in operation 2905, whether a PPR has been applied to the profile (e.g., the first profile), the disabling of which has been requested. As a result of the determination, when it is determined, in operation 2907, that the PPR has been applied to the enabled profile (2907—Yes) (e.g., when it is determined that PPR1 and/or PPR2 has been applied to the corresponding profile), the processor 120 may display, in operation 2909, a screen (e.g., a pop-up window) including information indicating that the profile, the disabling of which has been requested, cannot be disabled. According to various embodiments, the screen may be displayed as illustrated in FIG. 30C. For example, referring to FIG. 30C, the electronic device 101 may report, through a screen 3010, that in order to disable the first profile, it is necessary to delete all profiles currently installed in the electronic device 101 and install the first profile again. When a cancellation icon 3011 is selected on the screen 3010 in FIG. 30C, the screen may return to the screen 1310 in FIG. 30B.

According to various embodiments, when a mobile plan removal icon 3012 is selected on the screen 3010 in FIG. 30C, in operation 2911, the processor 120 may reset a memory in which profiles are stored, thereby deleting all profiles installed in the electronic device 101, including the first profile.

According to various embodiments, in operation 2913, the processor 120 may redownload and reinstalled the profile. The profile reinstalled in the electronic device 101 may be in a disabled state.

According to various embodiments, as a result of determining in operation 2905 whether the PPR has been applied to the profile, the disabling of which has been requested, when it is determined in operation 2907 that the PPR has not been applied to the profile, the disabling of which has been requested (e.g., when it is determined that PPR1 and/or PPR2 has not been applied to the corresponding profile), the processor 120 of the electronic device 101 may disable the profile in operation 2917. The disabled profile may be in a disabled state.

Figure 31:
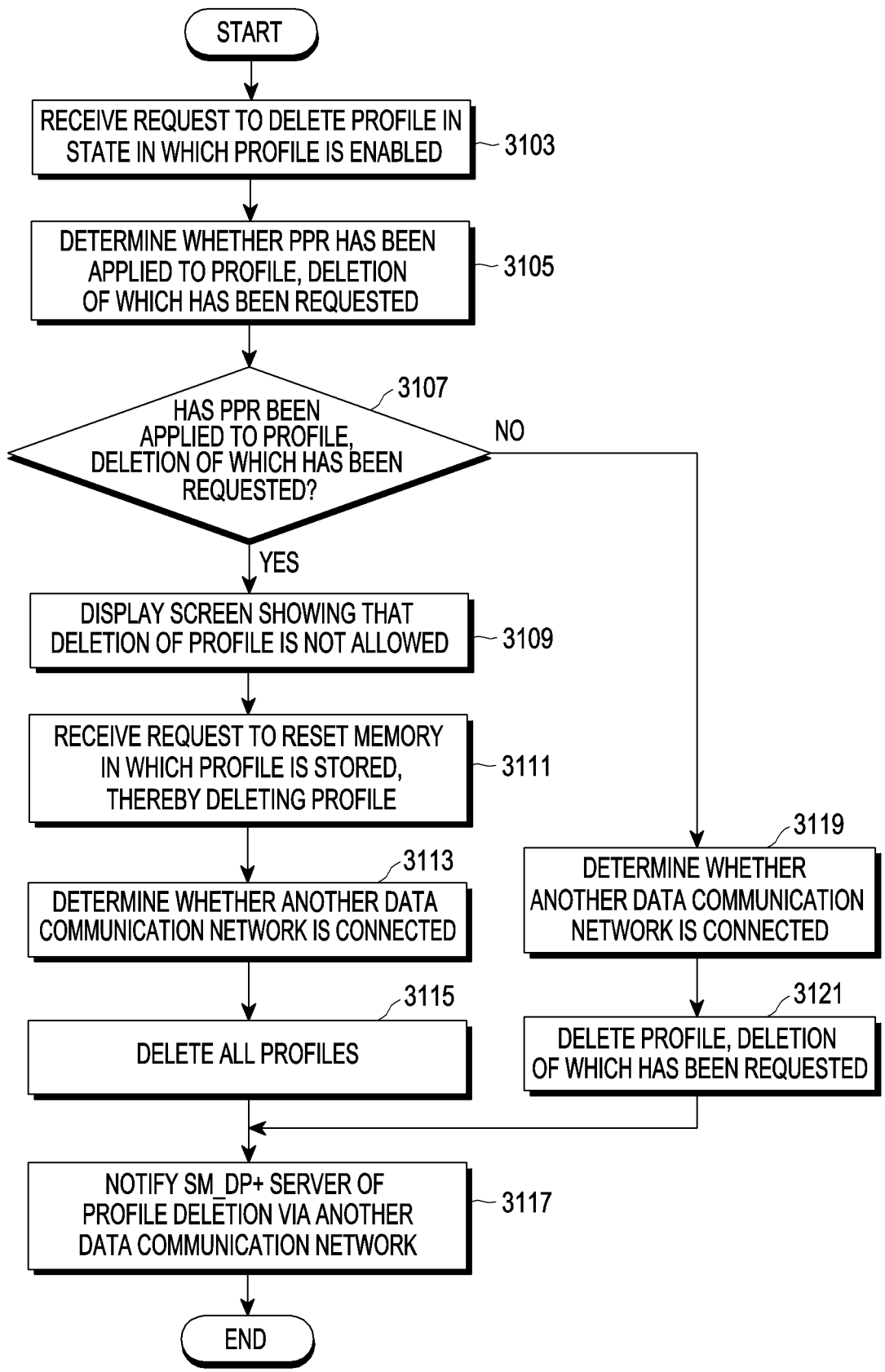
FIG. 31 is a flowchart illustrating an example profile deletion method according to various embodiments.

FIG. 31 is a flowchart illustrating an example profile deletion method according to various embodiments. The operations in FIG. 31 will be described, for convenience, with reference to: the electronic device 101 in FIG. 1 or 3; the eUICC 401 in FIG. 4; and FIGS. 32A, 32B, 32C, 32D, 32E, and 32F.

According to various embodiments, in operation 3103, in the state in which a profile installed in the eUICC 401 of the electronic device 101 is enabled, the processor 120 may receive a request for deletion of the profile. The request for deletion of the profile may be made by selecting a corresponding function by a user through the screens illustrated in FIGS. 32A and 32B.

Figure 32A:
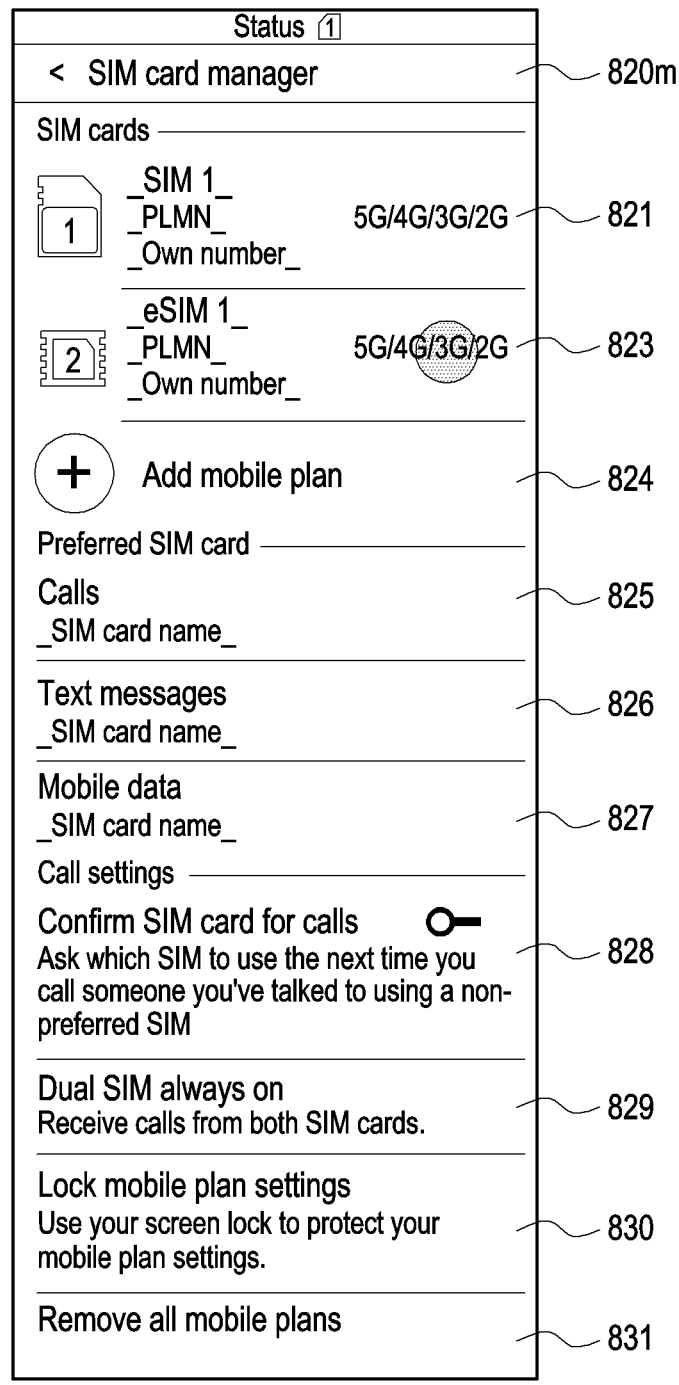
FIG. 32A is a diagram illustrating an example screen displayed in an electronic device according to various embodiments.

According to various embodiments, a screen 820*m*, illustrated in FIG. 32A, including SIM-related information may include a tab 821 corresponding to the first SIM 531 and a tab 823 corresponding to a first profile. According to various embodiments, when the first SIM 531 is not included in the electronic device 101, the tab 821 corresponding to a first SIM 531 may not be displayed on the screen 820*m*. The electronic device 101 may display information associated with the first SIM and the first profile (e.g., an own number (e.g., MSISDN), PLMN information, or supportable network communication types) in the tabs 821 and 823 corresponding to the first SIM and the first profile. The electronic device 101 may display supportable network types (e.g., 5G/4G/3G/2G) for an enabled SIM (e.g., the first SIM and the first profile).

According to various embodiments, in the state in which the screen illustrated in FIG. 32A is displayed, the electronic device 101 may detect selection of the tab 823 corresponding to the first profile (eSIM 1). When the tab 823 corresponding to the first profile is selected, the electronic device 101 may display the screen, illustrated in FIG. 32B, including information corresponding to the first profile.

Figure 32B:
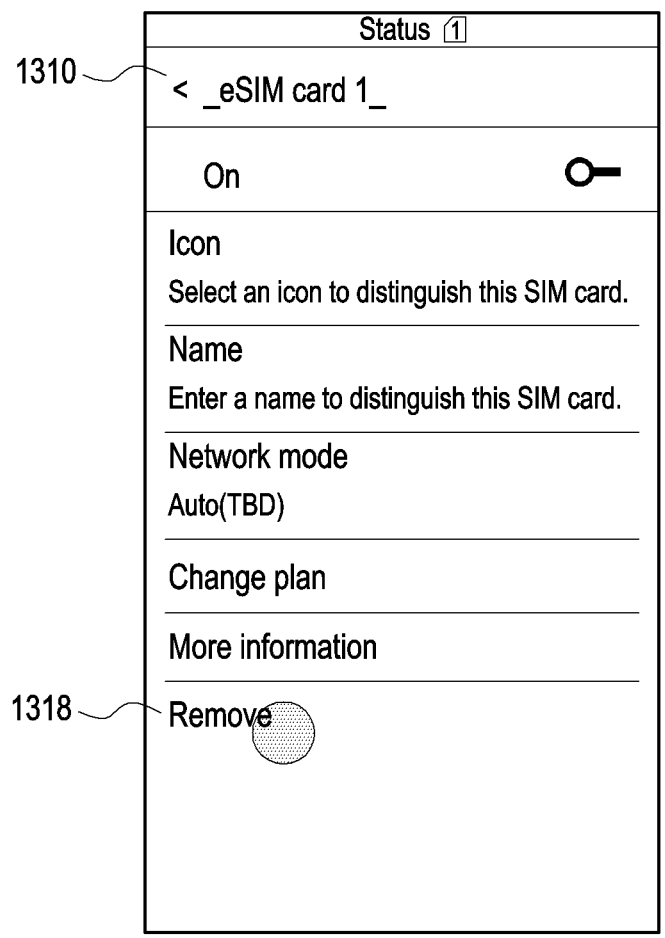
FIG. 32B is a diagram illustrating an example screen displayed in an electronic device according to various embodiments.

According to various embodiments, when a mobile plan deletion tab 1318 is selected on the screen 1310 in FIG. 32B, the electronic device 101 may determine that a request to delete the corresponding profile (e.g., the first profile) has been received.

According to various embodiments, when the processor 120 receives the request to delete the profile (e.g., the first profile) in operation 3103, the electronic device 101 may determine, in operation 3105, whether a PPR has been applied to the profile, deletion of which has been requested.

Figure 32C:
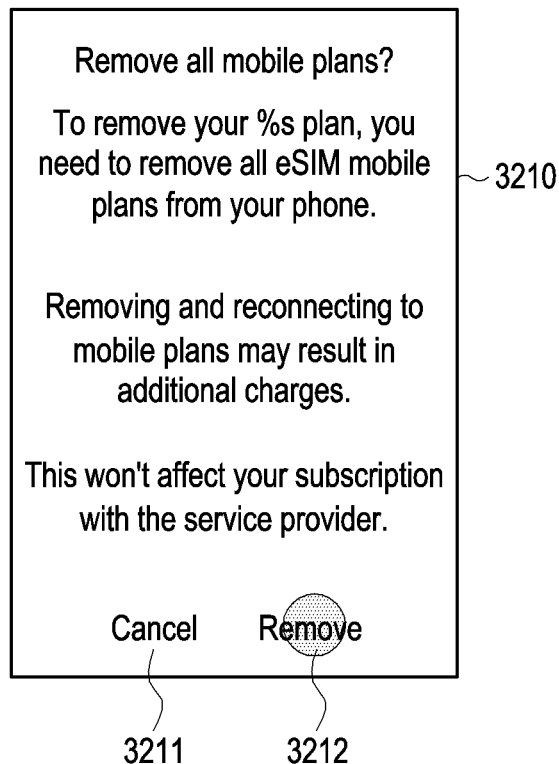
FIG. 32C is a diagram illustrating an example screen displayed in an electronic device according to various embodiments.

As a result of the determination, when it is determined in operation 3107 that the PPR has been applied to the profile, deletion of which has been requested. (3107—Yes) (e.g., when it is determined that PPR1 and/or PPR2 has been applied to the corresponding profile), the processor 120 may display, in operation 3109, a screen (e.g., a pop-up window) including information indicating that the profile, the deletion of which has been requested, cannot be deleted. According to various embodiments, the screen may be displayed as illustrated in FIG. 32C. For example, referring to FIG. 32C, the electronic device 101 may report, through a screen 3210, that in order to delete the profile, it is necessary to delete all profiles currently installed in the electronic device 101. When a cancellation icon 3211 is selected on the screen 3210 in FIG. 32C, the screen may return to the screen 1310 in FIG. 32B.

Figure 32D:
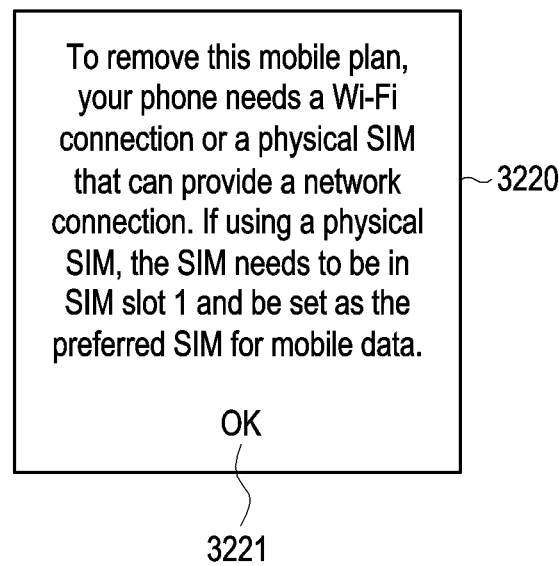
FIG. 32D is a diagram illustrating an example screen displayed in an electronic device according to various embodiments.

According to various embodiments, when a mobile plan removal icon 3212 is selected on the screen 3210 in FIG. 32C, the processor 120 may determine that a request to delete all profiles currently installed in the electronic device 101 has been received. Before deleting all profiles, the processor 120 may determine, in operation 3113, whether connection with another data communication network (e.g., a communication network based on Wi-Fi or a physical SIM), which is different from a communication network based on the profile (e.g., the first profile), is established. As a result of the determination, when the communication connection with the another data communication network is not established, the processor 120 may display, as illustrated in FIG. 32D, a screen 3220 (e.g., a pop-up window) reporting that the connection with the another data communication network is needed. Referring to FIG. 32D, the screen 3220 may report that the connection with the another data communication network is needed in order to delete all profiles, and that in order to make a connection using a physical SIM, a SIM card needs to be inserted into a SIM slot and the corresponding physical SIM needs to be set as a preferred SIM to be connected. When a deletion approval icon 3221 is selected on the screen 3220 in FIG. 32D, the electronic device 101 may stand by for a network connection.

According to various embodiments, when it is determined that the communication connection with the another data communication network is established, the processor 120 may reset, in operation 3115, a memory in which profiles are stored, thereby deleting all profiles installed in the electronic device 101, including the profile (e.g., the first profile). In operation 3117, through the connected another data communication network, the processor 120 may notify a server (e.g., the SM-DP+ server 220 in FIG. 2) of the fact that the corresponding profile has been deleted.

Figure 32E:
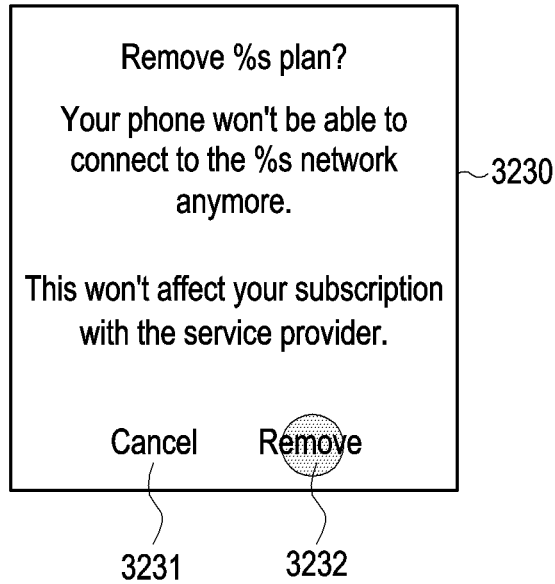
FIG. 32E is a diagram illustrating an example screen displayed in an electronic device according to various embodiments.

According to various embodiments, as a result of determining in operation in 3105 whether the PPR has been applied to the profile, the deletion of which has been requested, when it is determined in operation 3107 that the PPR has not been applied to the profile (3107-No) (e.g., when it is determined that PPR1 and/or PPR2 has not been applied to the corresponding profile), the processor 120 of the electronic device 101 may display a screen (e.g., a pop-up window) including information warning that if the profile is deleted, a communication network service using the corresponding profile cannot be provided. According to various embodiments, the screen may be displayed as illustrated in FIG. 32E. For example, referring to FIG. 32E, the electronic device 101 may report through a screen 3230 that if the profile is deleted, the corresponding communication network service will not be able to be provided. When a cancellation icon 3231 is selected on the screen 3230 in FIG. 32E, the screen may return to the screen 1310 in FIG. 32B.

Figure 32F:
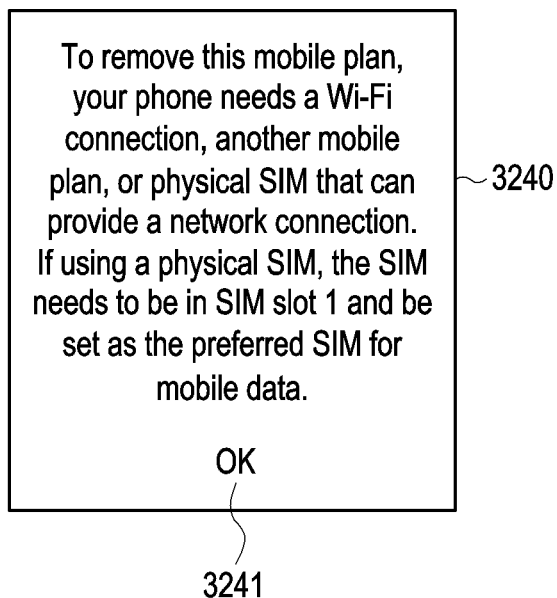
FIG. 32F is a diagram illustrating an example screen displayed in an electronic device according to various embodiments.

According to various embodiments, when a mobile plan removal icon 3232 is selected on the screen 3230 in FIG. 32E, the processor 120 may determine that the request to delete the profile has been received, and may end a network connection based on the profile, the deletion of which has been requested. Before deleting the profile, the deletion of which has been requested, the processor 120 may determine, in operation 3119, whether connection with another data communication network (e.g., a communication network based on Wi-Fi, another profile of which the deletion has not been requested, or a physical SIM), which is different from a communication network based on the profile (e.g., the first profile), is established. As a result of the determination, when the communication connection with the another data communication network is not established, the processor 120 may display, as illustrated in FIG. 32F, a screen 3240 (e.g., a pop-up window) reporting that connection with the another data communication network is needed. Referring to FIG. 32F, the screen 3240 may report that the connection with the another data communication network is needed in order to delete the profiles, the deletion of which has been requested, and that in order to make a connection using a physical SIM, a SIM card needs to be inserted into a SIM slot and the corresponding physical SIM needs to be set as a preferred SIM to be connected. When a deletion approval icon 3241 is selected on the screen 3240 in FIG. 32F, the electronic device 101 may stand by for a network connection.

According to various embodiments, when it is determined that the communication connection with the another data communication network is established, the processor 120 may delete, in operation 3121, the profile, the deletion of which has been requested. In operation 3117, through the connected another data communication network, the processor 120 may notify a server (e.g., the SM-DP+ server 220) of the fact that the corresponding profile (e.g., the first profile) has been deleted.

Figure 33A:
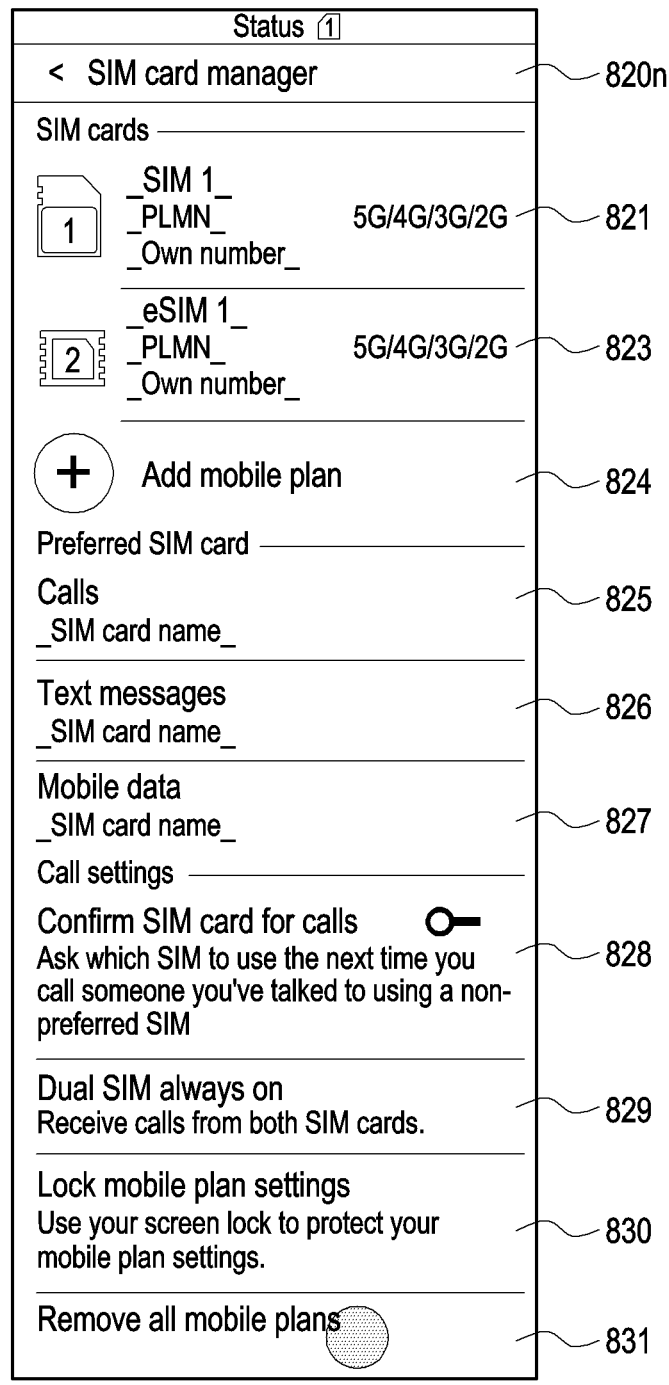
FIG. 33A is a diagram illustrating an example screen displayed in an electronic device according to various embodiments.
Figure 33B:
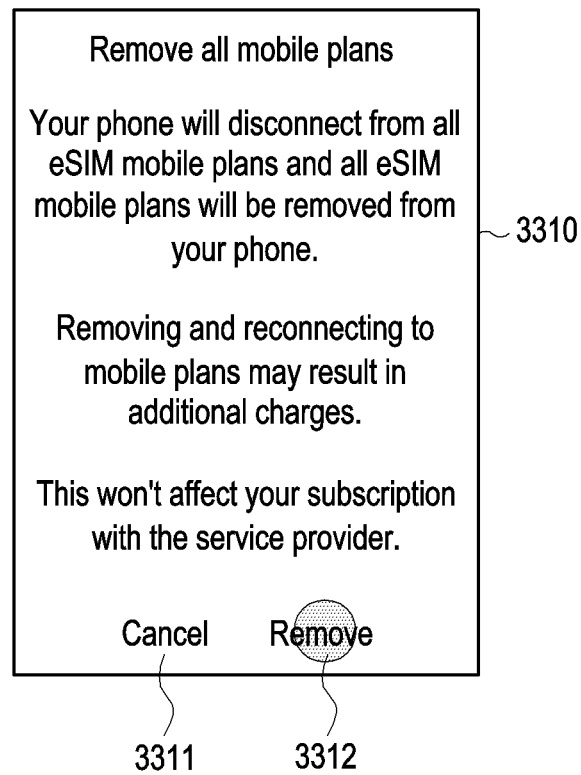
FIG. 33B is a diagram illustrating an example screen displayed in an electronic device according to various embodiments.
Figure 33C:
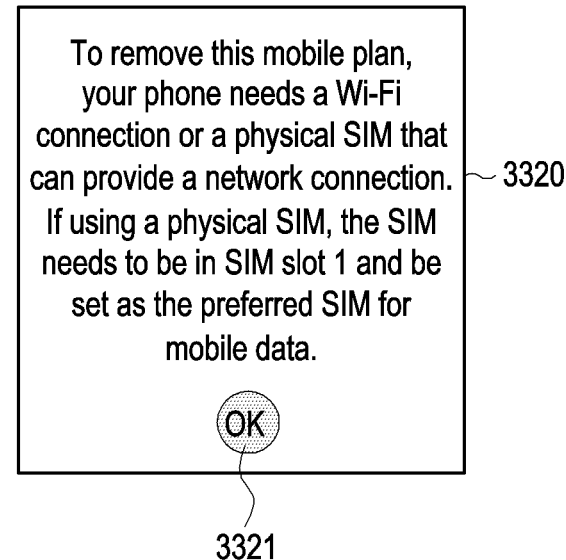
FIG. 33C is a diagram illustrating an example screen displayed in an electronic device according to various embodiments.

FIG. 33A is a diagram illustrating an example screen displayed in an electronic device according to various embodiments, FIG. 33B is a diagram illustrating an example screen displayed in an electronic device according to various embodiments, and FIG. 33C is a diagram illustrating an example screen displayed in an electronic device according to various embodiments. According to various embodiments, when a tab 831 for deleting all mobile plans is selected on the screen 820n in FIG. 33A, the processor 120 may display a screen (a pop-up window) including information indicating that communication network connection by all profiles will be terminated according to the deletion request. According to various embodiments, the screen may be displayed as illustrated in FIG. 33B. For example, referring to FIG. 33B, the electronic device 101 may warn, through a screen 3310, that if the profile is deleted, a fee may be charged for additionally downloading a profile in the future. When a cancellation icon 3311 is selected on the screen 3310 in FIG. 33B, the screen may return to the screen 1310 in FIG. 33A.

According to various embodiments, when a mobile plan removal icon 3312 is selected on the screen 3310 in FIG. 33B, the processor 120 may determine that a request to delete all profiles currently installed in the electronic device 101 has been received. Before deleting all of the profiles, the processor 120 may determine whether connection with another data communication network (e.g., a communication network based on Wi-Fi or a physical SIM) is established. As a result of the determination, when it is determined that communication connection with the another data communication network is not established, the processor 120 may display, as illustrated in FIG. 33C, a screen 3320 (e.g., a pop-up window) reporting that a connection with another data communication network is needed. Referring to FIG. 33C, the electronic device 101 may report, through the screen 3320, that connection with the another data communication network is needed in order to delete the all profiles and that, for connection using a physical SIM, a SIM card needs to be inserted into a SIM slot and the physical SIM needs to be set as a preferred SIM to be connected. When a deletion approval icon 3321 is selected on the screen 3320 in FIG. 33C, the processor 120 may determine that the request to delete all profiles has been received.

According to various embodiments, the processor 120 may reset a memory in which profiles are stored, thereby deleting all profiles installed in the electronic device 101, including the profile.

Figure 34A:
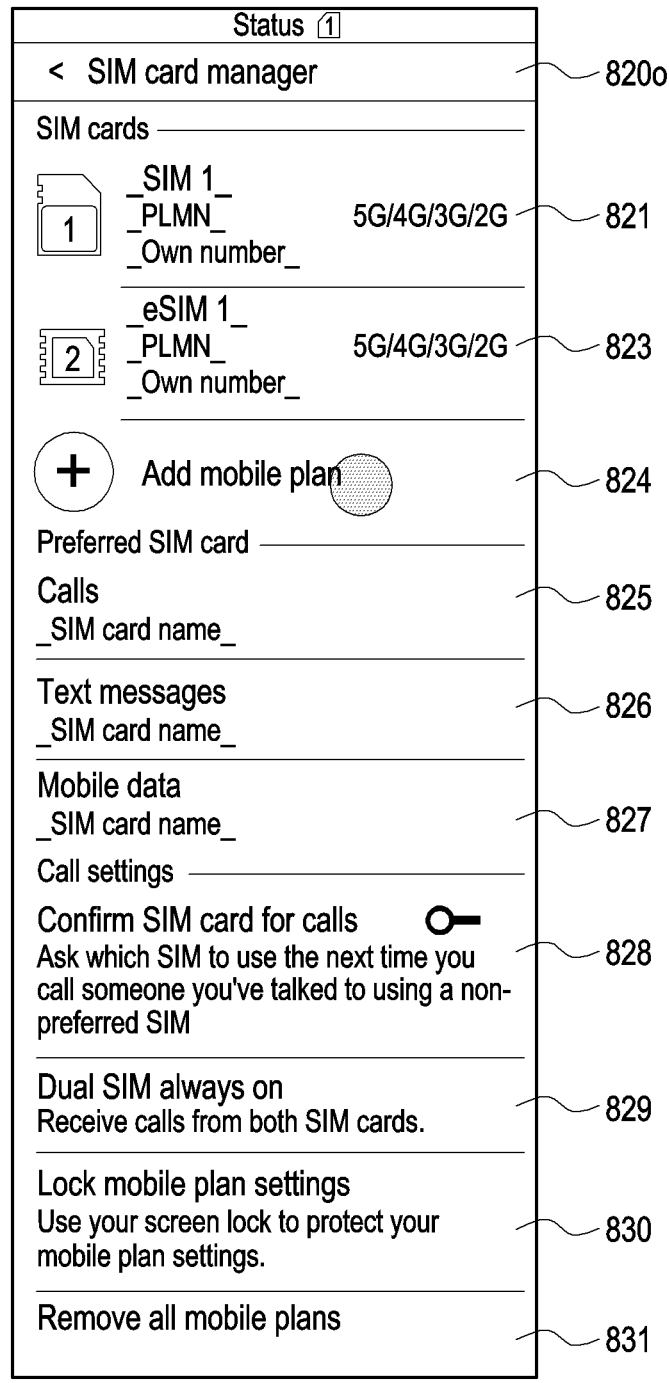
FIG. 34A is a diagram illustrating an example screen displayed in an electronic device according to various embodiments.
Figure 34B:
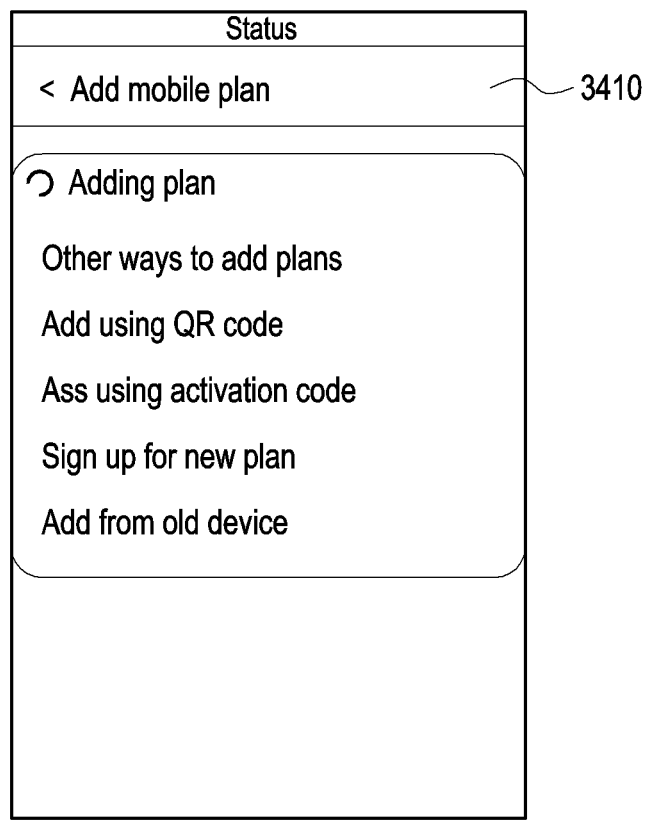
FIG. 34B is a diagram illustrating an example screen displayed in an electronic device according to various embodiments.
Figure 34C:
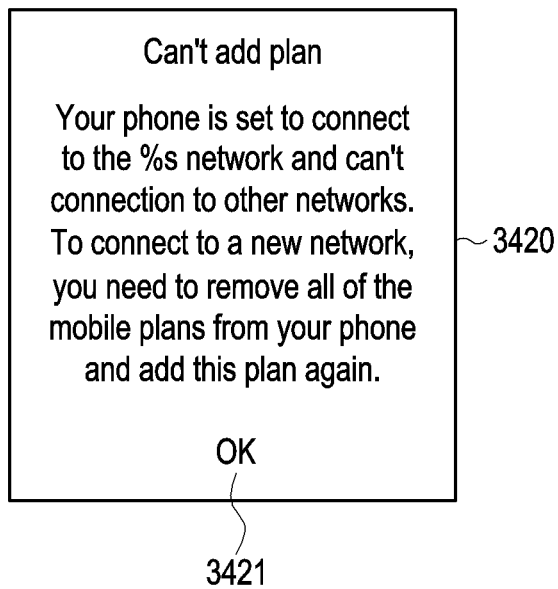
FIG. 34C is a diagram illustrating an example screen displayed in an electronic device according to various embodiments.

FIG. 34A is a diagram illustrating an example screen displayed in an electronic device according to various embodiments, FIG. 34B is a diagram illustrating an example screen displayed in an electronic device according to various embodiments, and FIG. 34C is a diagram illustrating an example screen displayed in an electronic device according to various embodiments. According to various embodiments, when a tab 824 for adding a mobile plan is selected on a screen 820o in FIG. 34A, the processor 120 may display the screen 3410 illustrated in FIG. 34B. When a specific method for adding a mobile plan is selected on the screen 3410 illustrated in FIG. 34B, the processor 120 may determine that a PPR has been applied to a preinstalled eSIM. As a result of the determination, when it is determined that there is a profile to which the PPR has been applied, among preinstalled profiles (e.g., when it is determined that PPR1 and/or PPR2 has been applied to the corresponding profile), the processor 120 may display a screen (e.g., a pop-up window) including information indicating that a new profile cannot be added. According to various embodiments, the screen may be displayed as illustrated in FIG. 34C. For example, referring to FIG. 34C, the electronic device 101 may report, through a screen 3420, that a new profile cannot be added and that, in order to add the new profile, all profiles that are currently installed therein need to be deleted. When a confirmation icon 3421 is selected on the screen 3420 in FIG. 34C, the screen may return to the screen 820o in FIG. 34A or the screen 3410 in FIG. 34B. According to various embodiments, the order in which the screens in FIGS. 34B and 34C are displayed may be changed. According to various embodiments, when the tab 824 for adding a mobile plan is selected on the screen 820o in FIG. 34A, the screen 3420 in FIG. 34C may be first displayed. Thereafter, when the confirmation icon 3421 is selected on the screen 3420 in FIG. 34C, the screen 3410 in FIG. 34B may be displayed.

Figure 35A:
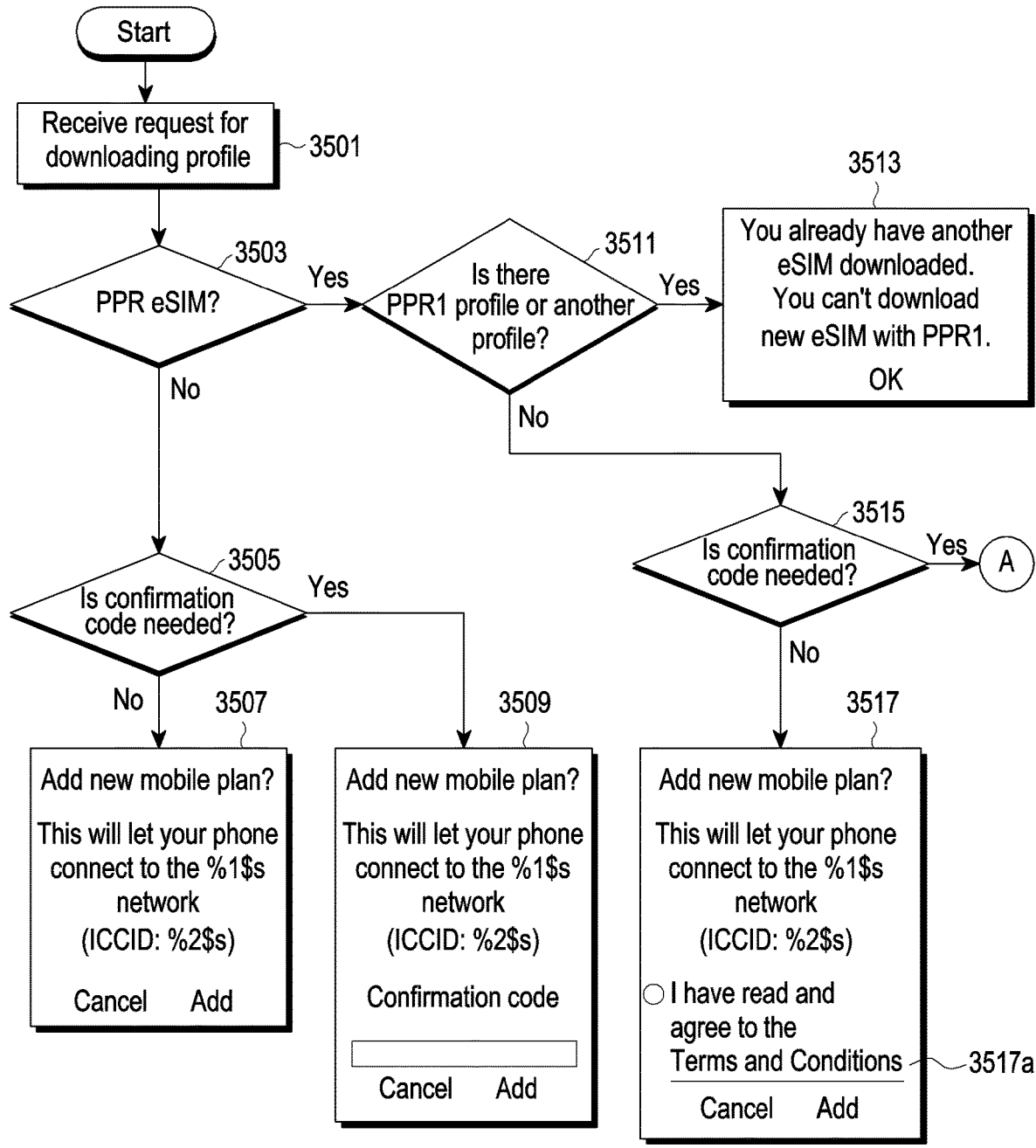
FIG. 35A is a flowchart and diagram illustrating an example method and screen displayed in an electronic device according to various embodiments.
Figure 35B:
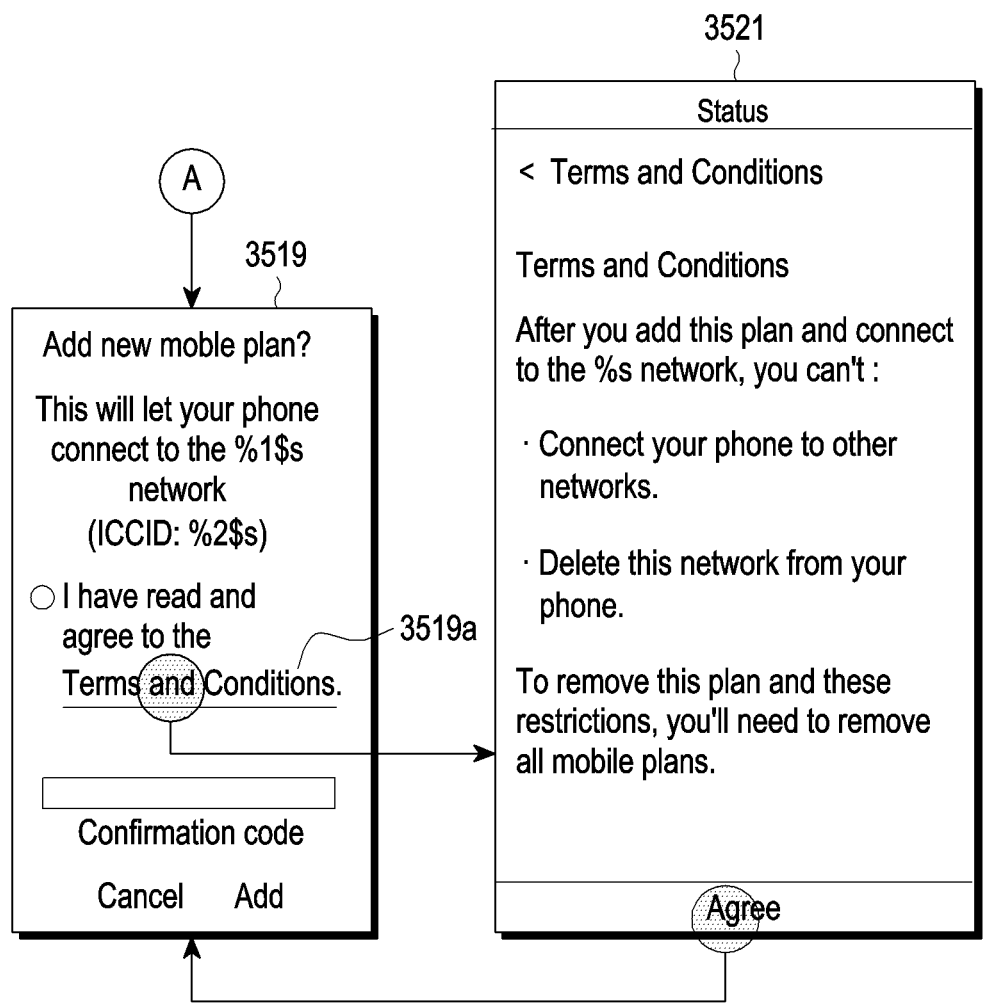
FIG. 35B is a diagram illustrating example screens displayed in an electronic device according to various embodiments.

FIG. 35A is a flowchart and diagram illustrating an example method and example screens displayed in an electronic device according to various embodiments, and FIG. 35B is a diagram illustrating example screens displayed in an electronic device according to various embodiments. Referring to FIGS. 35A and 35B, in operation 3501, the electronic device 101 may receive a request for downloading a profile.

According to various embodiments, the electronic device 101 may determine whether a PPR has been applied to the profile, the download of which has been requested. As a result of the determination, when it is determined in operation 3503 that the PPR has not been applied to the profile (3503-No), the electronic device 101 may determine whether a confirmation code is needed. According to various embodiments, in relation to the profile, the download of which has been request, the electronic device 101 may receive metadata before downloading the profile, and may then determine, based on the metadata, whether a PPR has been applied to the profile. The confirmation code is a code usable in making a request for downloading a profile, and may be provided by an SM-DP+ 220. When the request for downloading the profile is made, the SM-DP+ 220 may compare a confirmation code input by a user with a pre-stored confirmation code to perform authentication. As a result of the determination, when it is determined that a confirmation code is not needed (3505-No), the electronic device 101 may display an additional confirmation screen 3507 (e.g., a pop-up window) for downloading a new profile. As a result of the determination, when it is determined that a confirmation code is needed (3505—Yes), the electronic device 101 may display an additional confirmation and confirmation code input screen 3509 (e.g., a pop-up window) for downloading a new profile.

According to various embodiments, the electronic device 101 may determine whether a PPR has been applied to the profile, the download of which has been requested. As a result of the determination, when it is determined in operation 3503 that the profile is a profile to which the PPR has been applied (3503—Yes), the electronic device 101 may determine in operation 3511 whether the profile, the download of which has been requested, is a profile to which PPR1 has been applied and whether there is another preinstalled profile. As a result of the determination, when the profile, the download of which has been requested, is a profile to which PPR1 has been applied and there is another preinstalled profile (3511—Yes), the electronic device 101 may display a screen 3513 (e.g., a pop-up window) showing that there is already another profile, and thus it is impossible to download a new profile to which the PPR has been applied.

As a result of the determination, when the profile, the download of which has been requested, is not a profile to which PPR1 has been applied (e.g., is a profile to which PPR2 has been applied) or there are no any other preinstalled profiles (3511-No), the electronic device 101 may determine in operation 3515 whether a confirmation code is needed. As a result of the determination, when a confirmation code is not needed (3515-No), the electronic device 101 may display an additional confirmation screen 3517 (e.g., a pop-up window) for downloading a new profile, together with PPR-related link information 3517a. As a result of the determination, when a confirmation code is needed (3515—Yes), the electronic device 101 may display an additional confirmation and confirmation code input screen 3519 (e.g., a pop-up window) for downloading a new profile, together with PPR-related link information 3519a. A SIM identification number (e.g., an integrated circuit card identifier (ICCID)) may be displayed together therewith on the screen 3519.

According to various embodiments, when the PPR-related link information 3517a and 3519a is selected on the screens 3517 and 3519, detailed PPR-related information may be displayed on a screen 3521.

According to various example embodiments, the electronic device (e.g., the electronic device 101) may include: at least one processor (e.g., at least one of the processor 120 or the communication processor 510); a first slot (e.g., the first slot 530) connected to the at least one processor (e.g., at least one of the processor 120 or the communication processor 510) and configured to receive a first SIM (e.g., the first SIM 531) which is detachable; a second slot (e.g., the second slot 540) selectively connectable to the at least one processor (e.g., at least one of the processor 120 or the communication processor 510) and configured to receive a second SIM (e.g., the second SIM 541) which is detachable; an eSIM (e.g., the eSIM 550) selectively connectable to the at least one processor (e.g., at least one of the processor 120 or the communication processor 510) and included in the electronic device (e.g., the electronic device 101); and a switch (e.g., the switch 560) configured to connect one of the second slot (e.g., the second slot 540) or the eSIM (e.g., the eSIM 550) to the at least one processor (e.g., at least one of the processor 120 or the communication processor 510), wherein the at least one processor (e.g., at least one of the processor 120 or the communication processor 510) is configured to: detect an event for using the eSIM (e.g., the eSIM 550) while the at least one processor (e.g., at least one of the processor 120 or the communication processor 510) is connected to the second slot (e.g., the second slot 540) based on the switch (e.g., the switch 560) being in a first state; and based on detecting the event for using the eSIM (e.g., the eSIM 550), control the switch (e.g., the switch 560) to change from the first state to a second state, wherein the at least one processor (e.g., at least one of the processor 120 or the communication processor 510) is connected to the eSIM (e.g., the eSIM 550) based on the switch (e.g., the switch 560) being in the second state.

According to various example embodiments, the at least one processor (e.g., at least one of the processor 120 or the communication processor 510) may be further configured to: connect first network communication corresponding to the first SIM (e.g., the first SIM 531), based on information stored in the first SIM (e.g., the first SIM 531); and connect second network communication corresponding to the second SIM (e.g., the second SIM 541) while at least one processor (e.g., at least one of the processor 120 or the communication processor 510) is connected to the second slot (e.g., the second slot 540), based on the switch (e.g., the switch 560) being in the first state, wherein the second network communication is disconnected while the at least one processor (e.g., at least one of the processor 120 or the communication processor 510) is connected to the eSIM (e.g., the eSIM 550), based on the switch (e.g., the switch 560) being in the second state.

According to various example embodiments, the at least one processor (e.g., at least one of the processor 120 or the communication processor 510) may, as at least a part of the detecting of the event for using the eSIM (e.g., the eSIM 550), be configured to: detect a first event for temporarily using the eSIM (e.g., the eSIM 550). The at least one processor (e.g., at least one of the processor 120 or the communication processor 510) may be further configured to: based on detecting the first event, perform an operation associated with the eSIM (e.g., the eSIM 550) while the eSIM (e.g., the eSIM 550) is connected to the at least one processor (e.g., at least one of the processor 120 or the communication processor 510); based on performing the operation associated with the eSIM (e.g., the eSIM 550), control the switch (e.g., the switch 560) to change from the second state to the first state; and recover the second network communication corresponding to the second SIM (e.g., the second SIM 541) while the second SIM (e.g., the second SIM 541) is connected to the at least one processor (e.g., at least one of the processor 120 or the communication processor 510), based on the switch (e.g., the switch 560) being in the first state.

According to various example embodiments, the at least one processor (e.g., at least one of the processor 120 or the communication processor 510) may, as at least a part of the detecting of the first event for temporarily using the eSIM (e.g., the eSIM 550), be configured to: detect at least one of a request to delete at least one profile based on the eSIM (e.g., the eSIM 550), a request to generate a new profile based on the eSIM (e.g., the eSIM 550), a request for information about the eSIM (e.g., the eSIM 550), enabling of the eSIM (e.g., the eSIM 550), or initialization of the eSIM (e.g., the eSIM 550).

According to various example embodiments, the at least one processor (e.g., at least one of the processor 120 or the communication processor 510) may, as at least a part of the controlling of the switch (e.g., the switch 560) to change from the first state to the second state, acquire approval of disconnection of the second network communication, and based on acquiring the approval, control the switch (e.g., the switch 560) to change from the first state to the second state.

According to various example embodiments, the at least one processor (e.g., at least one of the processor 120 or the communication processor 510) may, as at least a part of the detecting of the event for using the eSIM (e.g., the eSIM 550), be configured to: detect a second event for non-temporarily using the eSIM (e.g., the eSIM 550). The at least one processor (e.g., at least one of the processor 120 or the communication processor 510) may be further configured to: based on detecting the second event, connect, based on the eSIM (e.g., the eSIM 550), a third network communication corresponding to the eSIM (e.g., the eSIM 550) while the eSIM (e.g., the eSIM 550) is connected to the at least one processor (e.g., at least one of the processor 120 or the communication processor 510).

According to various example embodiments, the at least one processor (e.g., at least one of the processor 120 or the communication processor 510) may be further configured to: acquire and store information about the second SIM (e.g., the second SIM 541) while the second SIM (e.g., the second SIM 541) is connected to the at least one processor (e.g., at least one of the processor 120 or the communication processor 510); and acquire and store information about the eSIM (e.g., the eSIM 550) while the eSIM (e.g., the eSIM 550) is connected to the at least one processor (e.g., at least one of the processor 120 or the communication processor 510).

According to various example embodiments, the at least one processor (e.g., at least one of the processor 120 or the communication processor 510) may be further configured to: provide the stored information about the second SIM (e.g., the second SIM 541) while the second SIM (e.g., the second SIM 541) is connected to the at least one processor (e.g., at least one of the processor 120 or the communication processor 510), based on the switch (e.g., the switch 560) being in the first state; and provide the stored information about the eSIM (e.g., the eSIM 550) while the eSIM (e.g., the eSIM 550) is connected to the at least one processor (e.g., at least one of the processor 120 or the communication processor 510), based on the switch (e.g., the switch 560) being in the second state.

According to various example embodiments, the at least one processor (e.g., at least one of the processor 120 or the communication processor 510) may be further configured to: detect an event for using the second SIM (e.g., the second SIM 541) while the at least one processor (e.g., at least one of the processor 120 or the communication processor 510) is connected to the eSIM (e.g., the eSIM 550), based on the switch (e.g., the switch 560) being in the second state; and based on detecting the event for using the second SIM (e.g., the second SIM 541), control the switch (e.g., the switch 560) to change from the second state to the first state.

According to various example embodiments, the at least one processor (e.g., at least one of the processor 120 or the communication processor 510) may, as at least a part of the detecting of the event for using the second SIM (e.g., the second SIM 541), be configured to: detect a third event for temporarily using the second SIM (e.g., the second SIM 541), wherein a third network communication corresponding to the eSIM (e.g., the eSIM 550) is connected while the eSIM (e.g., the eSIM 550) is connected. The at least one processor (e.g., at least one of the processor 120 or the communication processor 510) may be further configured to: based on detecting the third event, perform an operation associated with the second SIM (e.g., the second SIM 541) while the second SIM (e.g., the second SIM 541) is connected to the at least one processor (e.g., at least one of the processor 120 or the communication processor 510); based on performing the operation associated with the second SIM (e.g., the second SIM 541), control the switch (e.g., the switch 560) to change from the first state to the second state; and recover the third network communication corresponding to the eSIM (e.g., the eSIM 550) while the eSIM (e.g., the eSIM 550) is connected to the at least one processor (e.g., at least one of the processor 120 or the communication processor 510), based on the switch (e.g., the switch 560) being in the second state.

According to various example embodiments, the at least one processor (e.g., at least one of the processor 120 or the communication processor 510) may, as at least a part of the detecting of the third event for temporarily using the second SIM (e.g., the second SIM 541), be configured to: detect at least one of reception of the second SIM (e.g., the second SIM 541) into the second slot (e.g., the second slot 540), enabling of the second SIM (e.g., the second SIM 541), or initialization of the second SIM (e.g., the second SIM 541).

According to various example embodiments, the at least one processor (e.g., at least one of the processor 120 or the communication processor 510) may, as at least a part of the controlling of the switch (e.g., the switch 560) to change from the second state to the first state, be configured to: acquire approval of disconnection of the third network communication, and based on acquiring the approval, control the switch (e.g., the switch 560) to change from the second state to the first state.

According to various example embodiments, the at least one processor (e.g., at least one of the processor 120 or the communication processor 510) may, as at least a part of the detecting of the event for using the second SIM (e.g., the second SIM 541), be configured to: detect a fourth event for non-temporarily using the second SIM (e.g., the second SIM 541). The at least one processor (e.g., at least one of the processor 120 or the communication processor 510) may be further configured to: based on detecting the fourth event, connect, based on the second SIM (e.g., the second SIM 541), second network communication corresponding to the second SIM (e.g., the second SIM 541) while the second SIM (e.g., the second SIM 541) is connected to the at least one processor (e.g., at least one of the processor 120 or the communication processor 510).

According to various example embodiments, the electronic device (e.g., the electronic device 101) may include: a display (e.g., the display device 160); at least one processor (e.g., at least one of the processor 120 or the communication processor 510) connected to the display; a first slot (e.g., the first slot 530) connected to the at least one processor (e.g., at least one of the processor 120 or the communication processor 510) and configured to receive a first SIM (e.g., the first SIM 531) which is detachable; a second slot (e.g., the second slot 540) selectively connectable to the at least one processor (e.g., at least one of the processor 120 or the communication processor 510) and configured to receive a second SIM (e.g., the second SIM 541) which is detachable; an eSIM (e.g., the eSIM 550) selectively connectable to the at least one processor (e.g., at least one of the processor 120 or the communication processor 510) and included in the electronic device (e.g., the electronic device 101); and a switch (e.g., the switch 560) configured to connect one of the second slot (e.g., the second slot 540) or the eSIM (e.g., the eSIM 550) to the at least one processor (e.g., at least one of the processor 120 or the communication processor 510), wherein the at least one processor (e.g., at least one of the processor 120 or the communication processor 510) is configured to: control the display (e.g., the display device 160) to display a first screen indicating that the first SIM (e.g., the first SIM 531) and the second SIM (e.g., the second SIM 541) are enabled, while the at least one processor (e.g., at least one of the processor 120 or the communication processor 510) is connected to the second slot (e.g., the second slot 540) based on the switch (e.g., the switch 560) being in a first state; detect a first input for using the eSIM (e.g., the eSIM 550) associated with the first screen; based on the first input, control the switch (e.g., the switch 560) to change from the first state to a second state; and control the display (e.g., the display device 160) to display a second screen indicating that the first SIM (e.g., the first SIM 531) and the eSIM (e.g., the eSIM 550) are enabled, while the at least one processor (e.g., at least one of the processor 120 or the communication processor 510) is connected to the eSIM (e.g., the eSIM 550) based on the switch (e.g., the switch 560) being in the second state.

According to various example embodiments, the at least one processor (e.g., at least one of the processor 120 or the communication processor 510) may, at least a part of the controlling, based on the first input, of the switch (e.g., the switch 560) to change from the first state to a second state, be configured to: based on the first input, control the display to display a pop-up window representing that network communication corresponding to the second SIM (e.g., the second SIM 541) is to be disconnected, and based on additional input to the pop-up window, control the switch (e.g., the switch 560) to change from the first state to the second state.

According to various example embodiments, the at least one processor (e.g., at least one of the processor 120 or the communication processor 510) may, as at least a part of the detecting of the first user input, be configured to: detect at least one of a request to delete at least one profile based on the eSIM (e.g., the eSIM 550), a request to generate a new profile based on the eSIM (e.g., the eSIM 550), a request for information about the eSIM (e.g., the eSIM 550), enabling of the eSIM (e.g., the eSIM 550), or initialization of the eSIM (e.g., the eSIM 550).

According to various example embodiments, the at least one processor (e.g., at least one of the processor 120 or the communication processor 510) may be further configured to: acquire and store information about the second SIM (e.g., the second SIM 541) while the second SIM (e.g., the second SIM 541) is connected to the at least one processor (e.g., at least one of the processor 120 or the communication processor 510); and acquire and store information about the eSIM (e.g., the eSIM 550) while the eSIM (e.g., the eSIM

550) is connected to the at least one processor (e.g., at least one of the processor 120 or the communication processor 510).

According to various example embodiments, the at least one processor (e.g., at least one of the processor 120 or the communication processor 510) may be configured to: control the display to display the first screen representing that the first SIM (e.g., the first SIM 531) and the second SIM (e.g., the second SIM 541) are enabled, while the second SIM (e.g., the second SIM 541) is connected to the at least one processor (e.g., at least one of the processor 120 or the communication processor 510) based on the switch (e.g., the switch 560) being in the first state, wherein the first screen includes at least some of information about the first SIM (e.g., the first SIM 531), the information about the second SIM (e.g., the second SIM 541), or the information about the eSIM (e.g., the eSIM 550); and control the display to display the second screen representing that the first SIM (e.g., the first SIM 531) and the eSIM (e.g., the eSIM 550) are enabled, while the eSIM (e.g., the eSIM 550) is connected to the at least one processor (e.g., at least one of the processor 120 or the communication processor 510) based on the switch (e.g., the switch 560) being in the second state, wherein the second screen includes at least some of the information about the first SIM (e.g., the first SIM 531), the information about the second SIM (e.g., the second SIM 541), or the information about the eSIM (e.g., the eSIM 550).

According to various example embodiments, the at least one processor (e.g., at least one of the processor 120 or the communication processor 510) may be further configured to: detect a second input for using the second SIM (e.g., the second SIM 541) associated with the second screen; and based on the second input, control the switch (e.g., the switch 560) to change from the second state to the first state.

According to various example embodiments, a method of operating the electronic device (e.g., the electronic device 101), including: at least one processor (e.g., at least one of the processor 120 or the communication processor 510); a first slot (e.g., the first slot 530) configured to receive a first SIM (e.g., the first SIM 531) which is detachable; a second slot (e.g., the second slot 540) configured to receive a second SIM (e.g., the second SIM 541) which is detachable; an eSIM (e.g., the eSIM 550) included in the electronic device (e.g., the electronic device 101); and a switch (e.g., the switch 560) configured to connect one of the second slot (e.g., the second slot 540) or the eSIM (e.g., the eSIM 550) to the at least one processor (e.g., at least one of the processor 120 or the communication processor 510), may include: controlling a state of the switch (e.g., the switch 560) to be a first state, the at least one processor (e.g., at least one of the processor 120 or the communication processor 510) being connected to the second slot (e.g., the second slot 540) based on the switch (e.g., the switch 560) being in the first state; detecting an event for using the eSIM (e.g., the eSIM 550) while the at least one processor (e.g., at least one of the processor 120 or the communication processor 510) is connected to the second slot (e.g., the second slot 540); and based on detecting the event for using the eSIM (e.g., the eSIM 550), controlling the switch (e.g., the switch 560) to change from the first state to a second state, wherein the at least one processor (e.g., at least one of the processor 120 or the communication processor 510) is connected to the eSIM (e.g., the eSIM 550) based on the switch (e.g., the switch 560) being in the second state.

The electronic device according to an embodiment may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a cone sponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and equivalents thereof.

What is claimed is:

1. An electronic device comprising:
   at least one processor;
   a first slot connected to the at least one processor and configured to receive a first subscriber identification module (SIM) which is detachable;
   a second slot selectively connectable to the at least one processor and configured to receive a second SIM which is detachable;
   an embedded SIM (eSIM) selectively connectable to the at least one processor and included in the electronic device; and
   a switch configured to connect one of the second slot or the eSIM to the at least one processor,
   wherein the at least one processor is configured to:
   detect an event for using the eSIM while the at least one processor is connected to the second slot based on the switch being in a first state; and
   based on detecting the event for using the eSIM, control the switch to change from the first state to a second state,
   wherein the at least one processor is connected to the eSIM based on the switch being in the second state.

2. The electronic device of claim 1, wherein the at least one processor is further configured to:
   connect a first network communication corresponding to the first SIM, based on information stored in the first SIM; and
   connect a second network communication corresponding to the second SIM while the at least one processor is connected to the second slot based on the switch being in the first state,
   wherein the second network communication is disconnected while the at least one processor is connected to the eSIM based on the switch being in the second state.

3. The electronic device of claim 2,
   wherein the at least one processor, as at least a part of the detecting of the event for using the eSIM, is configured to: detect a first event for temporarily using the eSIM,
   wherein the at least one processor is further configured to:
   based on detecting the first event, perform an operation associated with the eSIM while the eSIM is connected to the at least one processor;
   based on performing the operation associated with the eSIM, control the switch to change from the second state to the first state; and
   recover the second network communication corresponding to the second SIM while the second SIM is connected to the at least one processor based on the switch being in the first state.

4. The electronic device of claim 3, wherein the at least one processor, as at least a part of the detecting of the first event for temporarily using the eSIM, is configured to: detect at least one of a request to delete at least one profile based on the eSIM, a request to generate a new profile based on the eSIM, a request for information about the eSIM, enabling of the eSIM, or initialization of the eSIM.

5. The electronic device of claim 2, wherein the at least one processor, as at least a part of the controlling of the switch to change from the first state to the second state, is configured to:
   acquire approval of disconnection of the second network communication, and
   based on acquiring the approval, control the switch to change from the first state to the second state.

6. The electronic device of claim 2,
   wherein the at least one processor, as at least a part of the detecting of the event for using the eSIM, is configured to: detect a second event for non-temporarily using the eSIM, and
   wherein the at least one processor is further configured to:
   based on detecting the second event, connect, based on the eSIM, a third network communication corresponding to the eSIM while the eSIM is connected to the at least one processor.

7. The electronic device of claim 1, wherein the at least one processor is further configured to:
   acquire and store information about the second SIM while the second SIM is connected to the at least one processor; and
   acquire and store information about the eSIM while the eSIM is connected to the at least one processor.

8. The electronic device of claim 7, wherein the at least one processor is further configured to:
   provide the stored information about the second SIM while the second SIM is connected to the at least one processor based on the switch being in the first state; and
   provide the stored information about the eSIM while the eSIM is connected to the at least one processor based on the switch being in the second state.

9. The electronic device of claim 1, wherein the at least one processor is further configured to:
   detect an event for using the second SIM while the at least one processor is connected to the eSIM based on the switch being in the second state; and
   based on detecting the event for using the second SIM, control the switch to change from the second state to the first state.

10. The electronic device of claim 9,
wherein the at least one processor, as at least a part of the detecting of the event for using the second SIM, is configured to: detect a third event for temporarily using the second SIM, wherein a third network communication corresponding to the eSIM is connected while the eSIM is connected, and
wherein the at least one processor is further configured to:
based on detecting the third event, perform an operation associated with the second SIM while the second SIM is connected to the at least one processor;
based on performing the operation associated with the second SIM, control the switch to change from the first state to the second state; and
recover the third network communication corresponding to the eSIM while the eSIM is connected to the at least one processor based on the switch being in the second state.

11. The electronic device of claim 10, wherein the at least one processor, as at least a part of the detecting of the third event for temporarily using the second SIM, is configured to:
detect at least one of reception of the second SIM into the second slot, enabling of the second SIM, or initialization of the second SIM.

12. The electronic device of claim 10, wherein the at least one processor, as at least a part of the controlling of the switch to change from the second state to the first state, is configured to:
acquire approval of disconnection of the third network communication, and
based on acquiring the approval, control the switch to change from the second state to the first state.

13. The electronic device of claim 9,
wherein the at least one processor, as at least a part of the detecting of the event for using the second SIM, is configured to: detect a fourth event for non-temporarily using the second SIM, and
wherein the at least one processor, based on detecting the fourth event, is further configured to: connect, based on the second SIM, a second network communication corresponding to the second SIM while the second SIM is connected to the at least one processor.

14. An electronic device comprising:
a display;
at least one processor connected to the display;
a first slot connected to the at least one processor and configured to receive a first subscriber identification module (SIM) which is detachable;
a second slot selectively connectable to the at least one processor and configured to receive a second SIM which is detachable;
an embedded SIM (eSIM) selectively connectable to the at least one processor and included in the electronic device; and
a switch configured to connect one of the second slot or the eSIM to the at least one processor,
wherein the at least one processor is configured to:
control the display to display a first screen indicating that the first SIM and the second SIM are enabled, while the at least one processor is connected to the second slot based on the switch being in a first state;
detect a first input for using the eSIM associated with the first screen;
based on the first input, control the switch to change from the first state to a second state; and
control the display to display a second screen indicating that the first SIM and the eSIM are enabled, while the at least one processor is connected to the eSIM based on the switch being in the second state.

15. The electronic device of claim 14, wherein the at least one processor, as at least a part of the controlling, based on the first input, the switch to change from the first state to the second state, is configured to:
based on the first input, display a pop-up window indicating that network communication corresponding to the second SIM is to be disconnected, and
based on an additional input to the pop-up window, control the switch to change from the first state to the second state.

16. The electronic device of claim 14, wherein the at least one processor, as at least a part of the detecting of the first input, is configured to:
detect at least one of a request to delete at least one profile based on the eSIM, a request to generate a new profile based on the eSIM, a request for information about the eSIM, enabling of the eSIM, or initialization of the eSIM.

17. The electronic device of claim 14, wherein the at least one processor is further configured to:
acquire and store information about the second SIM while the second SIM is connected to the at least one processor; and
acquire and store information about the eSIM while the eSIM is connected to the at least one processor.

18. The electronic device of claim 17, wherein the at least one processor is configured to:
control the display to display the first screen indicating that the first SIM and the second SIM are enabled, while the second SIM is connected to the at least one processor based on the switch being in the first state, wherein the first screen includes information about the first SIM, the information about the second SIM, or the information about the eSIM; and
control the display to display the second screen indicating that the first SIM and the eSIM are enabled, while the eSIM is connected to the at least one processor based on the switch being in the second state, wherein the second screen includes information about the first SIM, the information about the second SIM, or the information about the eSIM.

19. The electronic device of claim 14, wherein the at least one processor is further configured to:
detect a second input for using the second SIM associated with the second screen; and
based on the second input, control the switch to change from the second state to the first state.

20. A method of operating an electronic device comprising: at least one processor; a first slot configured to receive a first subscriber identification module (SIM) which is detachable; a second slot configured to receive a second SIM which is detachable; an embedded SIM (eSIM) included in the electronic device; and a switch configured to connect one of the second slot or the eSIM to the at least one processor, the method comprising:
controlling a state of the switch to be a first state, the at least one processor being connected to the second slot based on the switch being in the first state;
detecting an event for using the eSIM while the at least one processor is connected to the second slot; and
based on detecting the event for using the eSIM, controlling the switch to change from the first state to a second state, wherein the at least one processor is connected to the eSIM based on the switch being in the second state.

\* \* \* \* \*